US008000044B2

(12) United States Patent
Ono et al.

(10) Patent No.: US 8,000,044 B2
(45) Date of Patent: Aug. 16, 2011

(54) LENS HOLDER DRIVING DEVICE AND IMAGE PICKUP UNIT EMPLOYING PLANARY-DRIVEN POLYMER ACTUATOR

(75) Inventors: Atsushi Ono, Kyoto (JP); Kazuo Yokoyama, Osaka (JP); Osamu Yamada, Nara (JP); Sachio Nagamitsu, Kyoto (JP)

(73) Assignee: Panasonic Corporation, Osaka (JP)

( * ) Notice: Subject to any disclaimer, the term of this patent is extended or adjusted under 35 U.S.C. 154(b) by 175 days.

(21) Appl. No.: 12/525,597

(22) PCT Filed: Oct. 30, 2008

(86) PCT No.: PCT/JP2008/003109
§ 371 (c)(1),
(2), (4) Date: Aug. 3, 2009

(87) PCT Pub. No.: WO2009/060575
PCT Pub. Date: May 14, 2009

(65) Prior Publication Data
US 2010/0110571 A1 May 6, 2010

(30) Foreign Application Priority Data
Nov. 5, 2007 (JP) ................. 2007-287213

(51) Int. Cl.
G02B 7/02 (2006.01)
(52) U.S. Cl. ...................... 359/824; 359/823
(58) Field of Classification Search .......... 359/814, 359/819, 822–824; G9B/7.083–7.085, 7.065; 369/44.15, 44.16
See application file for complete search history.

(56) References Cited

U.S. PATENT DOCUMENTS
| | | | |
|---|---|---|---|
| 4,601,539 A | 7/1986 | Watanabe | |
| 2003/0043289 A1 | 3/2003 | Konno | |
| 2007/0280668 A1 | 12/2007 | Kubo et al. | |
| 2009/0091829 A1* | 4/2009 | Nagai et al. | 359/557 |

FOREIGN PATENT DOCUMENTS
| | | |
|---|---|---|
| JP | 60-217319 | 10/1985 |
| JP | 2002-357773 | 12/2002 |
| JP | 2006-246656 | 9/2006 |
| JP | 2007-139862 | 6/2007 |
| JP | 2007-286320 | 11/2007 |
| JP | 2008-20812 | 1/2008 |

OTHER PUBLICATIONS

International Preliminary Report on Patentability and Written Opinion of the International Searching Authority, issued Jun. 29, 2010 in PCT/JP2008/003109, including Forms PCT/IB/338, PCTIB/373 and PCT/ISA/237 (in English).
International Search Report issued Feb. 24, 2009 in International (PCT) Application No. PCT/JP2008/003109.
International Search Report issued Feb. 24, 2009 in International (PCT) Application No. PCT/JP2008/003109.
Onishi, Kazuo, "*Development of Polymer Actuator and Its Application*", Journal of the Japan Society of Mechanical Engineers, vol. 110, No. 1060, pp. 172-173, issued Mar. 2007 (with English translation).

* cited by examiner

*Primary Examiner* — Ricky L Mack
*Assistant Examiner* — Mahidere S Sahle
(74) *Attorney, Agent, or Firm* — Wenderoth, Lind & Ponack, L.L.P.

(57) ABSTRACT

There are provided a lens holder being capable of holding a lens and having flange portions at opposite end portions thereof along an optical axis, a planary-driven actuator including driving arm portions having lens holder support points for holding the outer surface of the lens holder at a plurality of opposing positions and having free-end side contact portions, a lens-holder retaining plate having spring-characteristic portions, and fixing frames which form the outer surfaces of a lens holder driving device and fix the respective components.

8 Claims, 63 Drawing Sheets

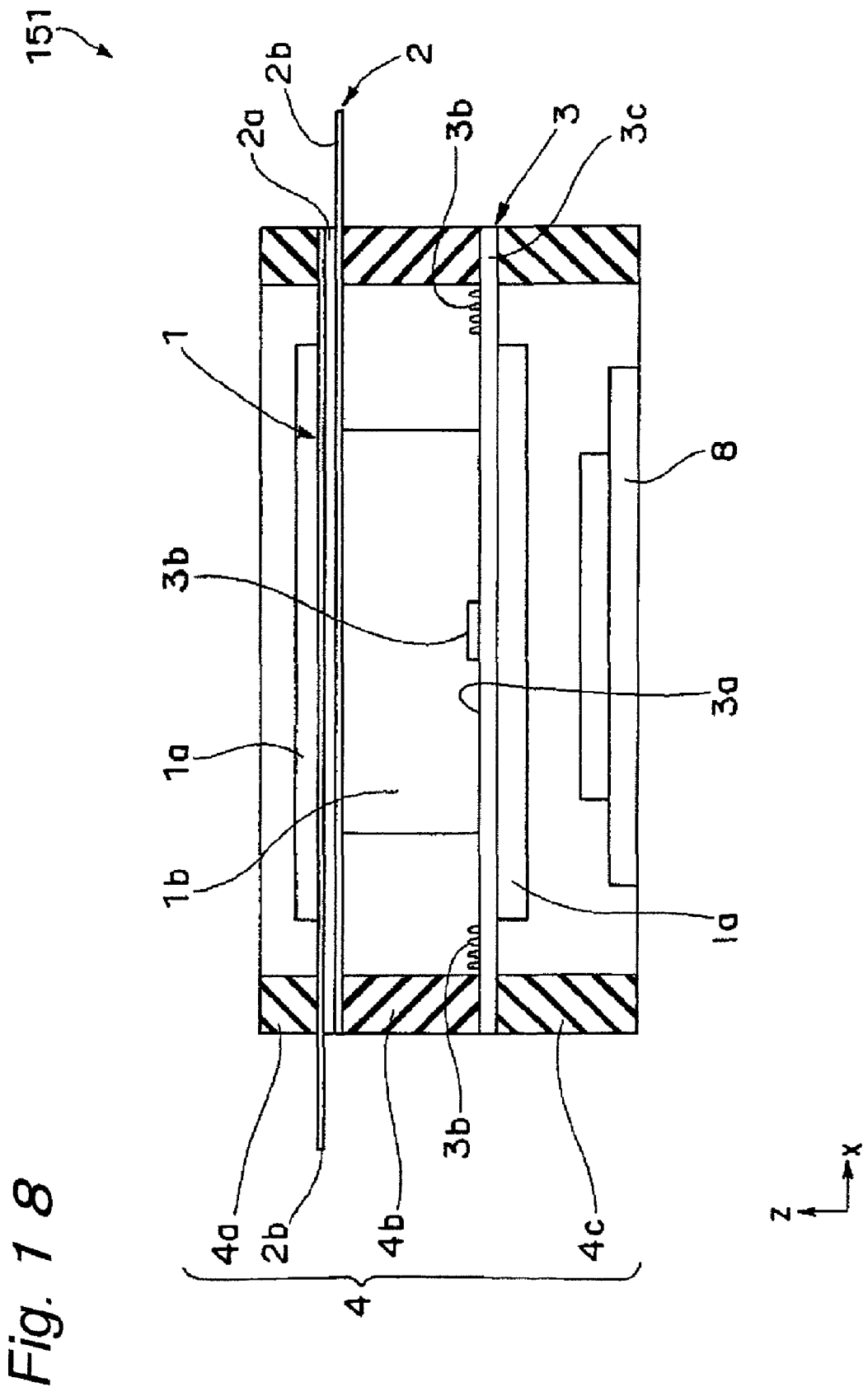

LENS HOLDER DRIVING DEVICE AND IMAGE PICKUP UNIT EMPLOYING PLANARY-DRIVEN POLYMER ACTUATOR

TECHNICAL FIELD

The present invention relates to a lens holder driving device for driving a lens holder using planary-driven actuators, and also relates to an image pickup unit employing the lens holder driving device.

BACKGROUND ART

In recent years, it has been a mainstream to mount camera modules in information terminals mainly exemplified by cellular phones. These camera modules have been required to have a simple structure enabling manual changeover between conventional two of tele and macro focal points, and also to be highly functional with the auto-focus function, the zoom function, or the like. In order to incorporate the auto focus function or the zoom function into such a camera module, there is required an actuator for moving a plurality of lenses along an optical axis with respect to an image pickup unit (such as a CCD or a CMOS), and therefore researches and developments have been made on various types of actuators.

On the other hand, such actuators for use in moving a group of lenses are required to have light weights and small sizes, along with the reduction in the sizes of information terminals. Further, these actuators are required to consume less power than the electric power necessary for main functions of the information terminals which incorporate the actuators.

Therefore, studies have been conducted, regarding the practical utility of polymer actuators as actuators which consume less power. The use of polymer actuators eliminates the necessity of components such as gears for providing operations such as linear movement and bending, and also enables extraction of outputs with a simple structure, since the actuators themselves can deform.

Non Patent Document 1 discloses a case where ion conduction actuators, which are polymer actuators of one type, are applied to drive lenses in an auto-focus camera module. This auto-focus camera module is constituted by a lens bracket housing the ion conduction actuators, an electrode plate for applying a voltage to the ion conduction actuators, and a group of lenses; an actuator fixing spring; and a case.

The group of lenses is moved along an optical axis by applying a voltage to the ion conduction actuators 110 through electrode, bending the arm-shaped portions of the actuators 110 and pushing a flange-shaped portion 111a of the lens bracket 111 upwardly, as illustrated in FIG. 57A and FIG. 57B. In this case, movement of the group of lenses along the optical axis is restricted by the outer cylindrical portion of the lens bracket 111 and the inner diameter of the case. In this case, the case is not illustrated. However, the ion conduction actuators 110 recede by δx within a plane intersecting with the direction of the optical axis, when they are bent and displaced by δz through application of a voltage thereto, as illustrated in FIG. 57C. Therefore, when the lens bracket 111 is moved along the optical axis, this induces gaps between the lens bracket 111 and the arm-shaped portions of the ion conduction actuators 110. When the auto focus camera module is used in a state of being along the horizontal direction or being inclined, the gaps induce a clearance between the lens bracket 111 and the case, and this clearance induces the issue of an inclination with respect to the optical axis of the group of lenses and the image pickup device portion.

Patent Document 1 discloses another example where a polymer actuator is applied to a lens driving mechanism. As illustrated in FIG. 58 (see FIG. 5 in Patent Document 1), the lens driving mechanism brings a tongue piece 251 formed along the circumferential direction into contact with an end surface of a lens frame 230, which deforms the tongue piece 251 for moving the lens frame 230. With this structure, the thickness of the actuator portion is added to the thickness of the lens frame 230 along the optical axis, thereby inducing the issue of increase of the thickness of the lens driving mechanism along the optical axis. Further, this structure is adapted to slide the lens frame 230 against the inner surface of the mirror tube such that the lens frame 230 moves along the optical axis, thereby inducing the issue that smooth operations become unstable due to influence of the friction.

Patent Document 2 discloses another example where a polymer actuator is applied to an optical device. As illustrated in FIG. 59 (see FIG. 1 in Patent Document 2), there is disclosed a structure which secures a plurality of actuators 501 corresponding to tongue pieces to a lens frame 300. Further, there is disclosed a method for adjusting the inclination of the lens frame 300 or adjusting the eccentricity of the lens frame 300 by displacing the plurality of actuators 501 individually. In cases where this structure is applied to an auto-focus lens holder driving device, when there are variations in amount of deformation among the plurality of actuators 501 or when some of the actuators 501 are failed to be inoperable, there is induced the issue of an inclination of the lens frame 300.

Patent Document 1: Japanese Unexamined Patent Publication No. 2007-139862

Patent Document 2: Japanese Unexamined Patent Publication No. 2007-286320

Non Patent Document 1: "Development of Polymer Actuators and Applications thereof", Journal of The Japan Society of Mechanical Engineers (Kazuo Onishi, March 2007 Vol. 110 No. 1060 p 172-173).

DISCLOSURE OF INVENTION

Issues to be Solved by the Invention

In order to overcome the issues described above, there is required a lens holder driving device capable of restricting movement of lenses only to be along an optical axis, no matter which direction an auto-focus camera module is oriented in. Namely, there is required a lens holder driving device including an actuator capable of smoothly moving lenses only along an optical axis, while restricting the position of the lens holder for holding the lenses along the optical axis, and also restricting it in a plane intersecting with the direction of the optical axis.

It is an object of the present invention to overcome the issues described above and to provide a lens holder driving device with a small thickness and an image pickup unit which include actuators capable of moving a lens holder only along an optical axis, and thus capable of driving with low power consumption.

Means for Solving the Issues

In order to achieve the above object, the present invention provides the following structures.

According to a first aspect of the present invention, there is provided a lens holder driving device comprising:

a lens holder including a cylindrical body portion for holding a lens, placed along an optical axis and, protrusion portions which are placed at opposite end portions of the body portion along the optical axis and are protruded in a direction intersecting with the optical axis;

a planary-driven actuator including a plurality of driving arm portions having respective lens holder support points which come into contact with an outer surface of the body portion of the lens holder at a plurality of opposing positions for holding the lens holder, and having respective contact portions at free-end sides thereof for coming into contact with the protrusion portion at the end portion positioned at a side of one direction along the optical axis and then moving the lens holder in the one direction along the optical axis; and a plate-shaped lens-holder restoration member for moving the lens holder in a direction opposite from the one direction along the optical axis of the lens holder in the planary-driven actuator and then restoring the lens holder to a position before being moved; wherein the protrusion portions at the opposite end portions of the lens holder are held along the optical axis of the lens holder by the free-end side contact portions of the driving arm portions of the planary-driven actuator and by the lens-holder retaining member, so that the lens holder is restricted in position along the optical axis, while the outer surface of the body portion of the lens holder is restricted in position in a plane intersecting with the direction of the optical axis by the lens holder support points of the respective driving arm portions of the planary-driven actuator, and further, the driving arm portions are bent through application of a voltage to the planary-driven actuator while the free-end side contact portions of the driving arm portions of the planary-driven actuator are contacted with the protrusion portion of the lens holder so that the lens holder is moved in the one direction along the optical axis.

According to an eighth aspect of the present invention, there is provided an image pickup unit comprising:

the lens holder driving device according to any one of the first to third and fifth aspects;

a lens held by the lens holder; and an image pickup device for capturing an image of an object formed by the lens.

EFFECTS OF THE INVENTION

According to the present invention as described above, it is possible to realize a lens holder driving device including actuators capable of smoothly moving a lens holder only along an optical axis, while restricting the position of the lens holder capable of holding a lens along the optical axis and also restricting the position thereof within a plane intersecting with the direction of the optical axis. Further, it is possible to provide a lens holder driving device with a smaller thickness which is capable of employing polymer actuators as a lens-holder driving power source for driving with less power consumption.

Further, even when there are variations in amount of deformation among a plurality of actuators or when some of the actuators are failed to be inoperable, it is possible to move the lens holder only along the optical axis.

BRIEF DESCRIPTION OF DRAWINGS

These and other aspects and features of the present invention will become clear from the following description taken in conjunction with the preferred embodiments thereof with reference to the accompanying drawings, in which:

FIG. 18 is a partial cross-sectional side view of the lens holder driving device employing the planary-driven actuator according to the first embodiment of the present invention, in a state where an image pickup device is incorporated therein;

BEST MODE FOR CARRYING OUT THE INVENTION

Figure 1:
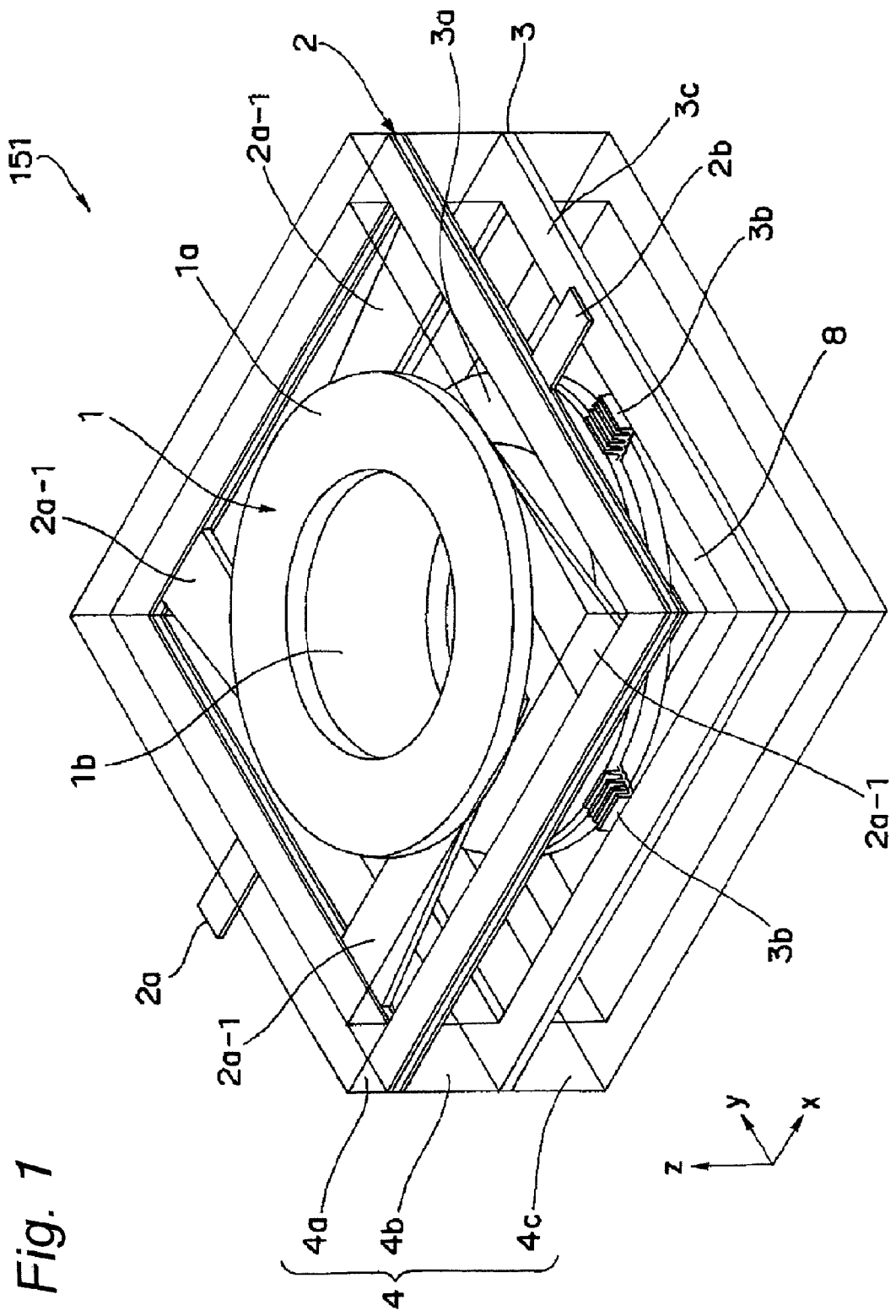
FIG. 1 is a perspective view of a lens holder driving device employing a planary-driven actuator according to a first embodiment of the present invention in a state of incorporating an image pickup device therein and being viewed only through a fixing frame member.

Hereinafter, there will be described various aspects of the present invention before proceeding to the detail description of the embodiments of the present invention with reference to the drawings.

According to a first aspect of the present invention, there is provided a lens holder driving device comprising:

a lens holder including a cylindrical body portion for holding a lens, placed along an optical axis and, protrusion portions which are placed at opposite end portions of the body portion along the optical axis and are protruded in a direction intersecting with the optical axis;

a planary-driven actuator including a plurality of driving arm portions having respective lens holder support points which come into contact with an outer surface of the body portion of the lens holder at a plurality of opposing positions for holding the lens holder, and having respective contact portions at free-end sides thereof for coming into contact with the protrusion portion at the end portion positioned at a side of one direction along the optical axis and then moving the lens holder in the one direction along the optical axis; and a plate-shaped lens-holder restoration member for moving the lens holder in a direction opposite from the one direction along the optical axis of the lens holder in the planary-driven actuator and then restoring the lens holder to a position before being moved; wherein the protrusion portions at the opposite end portions of the lens holder are held along the optical axis of the lens holder by the free-end side contact portions of the driving arm portions of the planary-driven actuator and by the lens-holder retaining member, so that the lens holder is restricted in position along the optical axis, while the outer surface of the body portion of the lens holder is restricted in position in a plane intersecting with the direction of the optical axis by the lens holder support points of the respective driving arm portions of the planary-driven actuator, and further, the driving arm portions are bent through application of a voltage to the planary-driven actuator while the free-end side contact portions of the driving arm portions of the planary-driven actuator are contacted with the protrusion portion of the lens holder so that the lens holder is moved in the one direction along the optical axis.

With this structure, it is possible to restrict the position of the lens holder within a plane intersecting with the direction of the optical axis, and also it is possible to place the planary-driven actuator and the lens-holder restoration member in parallel with each other, through the shapes of the driving arm portions of the planary-driven actuators. As a result, there is provided the advantage that the lens can be moved only along the optical axis in a state where the lens holder is restricted in position along the optical axis.

According to a second aspect of the present invention, there is provided the lens holder driving device according to the first aspect, wherein the lens-holder restoration member is a lens-holder retaining member having: a retaining portion for coming into contact with the protrusion portion of the lens holder which is positioned at a side in the direction opposite from the one direction along the optical axis of the lens holder; and spring-characteristic portions coupled to the retaining portion, for moving the lens holder in the direction opposite from the one direction along the optical axis of the lens holder in the planary-driven actuator and then restoring the lens holder to the position before being moved.

With this structure, it is possible to restrict the position of the lens holder within a plane intersecting with the direction of the optical axis, and also it is possible to place the planary-driven actuator and the lens-holder retaining plate having the spring-characteristic portions as an example of the lens-holder restoration member in parallel with each other, through the shapes of the driving arm portions of the planary-driven actuator. As a result, there is provided the advantage that the lens can be moved only along the optical axis in a state where the lens holder is restricted in position along the optical axis.

According to a third aspect of the present invention, there is provided the lens holder driving device according to the first aspect, wherein the lens-holder restoration member is a second planary-driven actuator including a plurality of driving arm portions having respective contact portions, placed at the free-end sides, for coming into contact with the protrusion portion of the lens holder which is positioned at a side in the direction opposite from the one direction along the optical axis of the lens holder and then moving the lens holder in the direction opposite from the one direction along the optical axis so as to generate a restoration force for restoring the lens holder to the position before being moved.

With the structure described above, it is possible to restrict the position of the lens holder within a plane intersecting with the direction of the optical axis, and also it is possible to place the plurality of planary-driven actuators in parallel with each other, through the shapes of the driving arm portions of the planary-driven actuators. As a result, there is provided the advantage that the lens holder can be moved only along the optical axis in a state where the lens holder is restricted in position along the optical axis. Further, it is possible to place a plurality of planary-driven actuators. As a result, there is provided the advantage of an increase of the range within which the lens holder is movable along the optical axis.

According to a fourth aspect of the present invention, there is provided the lens holder driving device according to any one of the first to third aspects, wherein the planary-driven actuator is a conductive polymer actuator, which has a three-layer structure formed by sandwiching a separator impregnated with an ionic liquid between two conductive polymer films and bonding to one another.

With the structure described above, it is possible to drive the conductive polymer actuator in the three-layer structure by a low driving voltage of 1 to 3 V, and also it is possible to keep the bending state and to maintain this state even when application of the voltage thereof is stopped. Accordingly, a voltage needs to be applied thereto only when the lens is moved, thereby offering the advantage of reduction in the power consumption of the lens holder driving device.

According to a fifth aspect of the present invention, there is provided the lens holder driving device according to the third aspect, wherein the two planary-driven actuators are conductive polymer actuators, each of which has a three-layer structure formed by sandwiching a separator impregnated with an ionic liquid between two conductive polymer films and bonding to one another, the plurality of planary-driven actuators which are the conductive polymer actuators are placed in parallel with each other, initial voltages are applied to the driving arm portions of the respective planary-driven actuators for bending and displacing the driving arm portions until the driving arm portions come into contact with the protrusion portions at the opposite end portions of the lens holder, and then application of the initial voltages is stopped for holding bending states thereof, so that the lens holder is restricted in position along the optical axis by the free-end side contact portions of the plurality of driving arm portions placed in parallel with each other, while the outer surface of the body portion of the lens holder is restrained in a plane intersecting with the direction of the optical axis by the lens holder support points of the driving arm portions of the planary-driven actuators, and further, voltages are applied to the planary-driven actuators which are the conductive polymer actuators for bending the driving arm portions from the initial application state while the free-end side contact portions of the driving arm portions of the planary-driven actuators which are the conductive polymer actuators are contacted with the protruding portions of the lens holder, so that the lens holder is respectively moved in the one direction and in the direction opposite from the one direction along the optical axis.

With the structure described above, since the conductive polymer actuators in the three-layer structure can be kept in a bending state and maintained in this bending state even when application of voltages thereto is stopped, it is possible to initially hold the lens holder with the conductive polymer actuators which have been bent in advance. This enables placing the actuators which can increase the ranges within which the driving arm portions of the actuators can bend and move, thereby offering the advantage of an increase of the amount of movement of the lens holder along the optical axis. Further, it is possible to drive the conductive polymer actuators in the three-layer structure by a low driving voltage of 1 to 3 V, and also it is possible to keep them in the bending state and to maintain this state even when application of voltages thereto is stopped. Accordingly, it is necessary only that voltages are applied thereto only when the lens is moved, thereby offering the advantage of reduction in the power consumption of the lens holder driving device.

According to a sixth aspect of the present invention, there is provided the lens holder driving device according to the third or fifth aspect, further comprising: between the two planary-driven actuators a contact prevention member having a contact prevention portion for preventing contact between the free-end side contact portions of the two planary-driven actuators.

According to a seventh aspect of the present invention, there is provided the lens holder driving device according to any one of the first to third and fifth aspects, further comprising:

a power supply for applying a voltage to the planary-driven actuator, and a control device for controlling the power supply so as to apply a voltage to the planary-driven actuator only when the driving arm portions of the planary-driven actuator are bent.

With the structure described above, there are provided the advantages that the actuator can be bent differently by the polarity of the voltage applied thereto, and also the amount of bend and displacement of the actuator can be controlled and thus the amount of movement of the lens holder along the optical axis can be controlled by controlling the applied voltage.

According to an eighth aspect of the present invention, there is provided an image pickup unit comprising:

the lens holder driving device according to any one of the first to third and fifth aspects;

a lens held by the lens holder; and an image pickup device for capturing an image of an object formed by the lens.

With the structure described above, there is provided the advantage of reduction in the power consumption of the entire image pickup unit.

Figure 56:
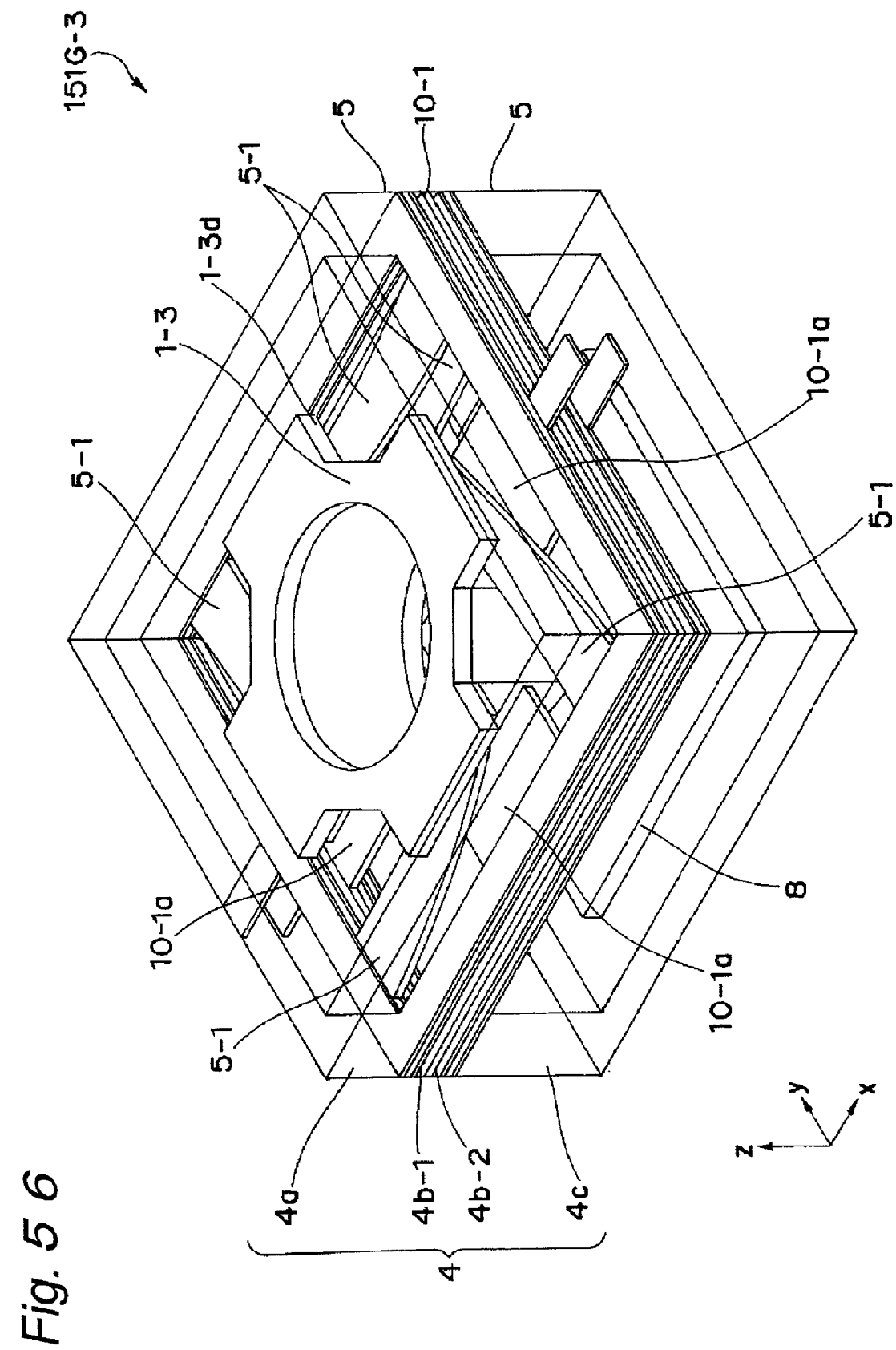
FIG. 56 is a perspective view of the lens holder driving device employing the planary-driven actuators which are the conductive polymer actuators according to the seventh embodiment of the present invention, in a state where the lens holder in FIG. 5C is applied thereto, and it incorporates an image pickup device therein and is viewed only through the fixing frame member.
Figure 57A:
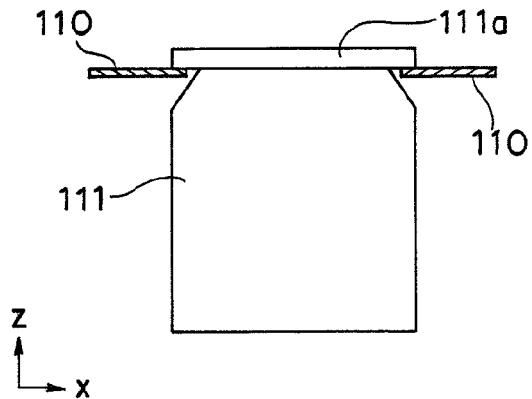
FIG. 57A is a schematic illustrative view showing the position of a lens bracket in an ion conduction actuator before driven according to the conventional example.
Figure 57B:
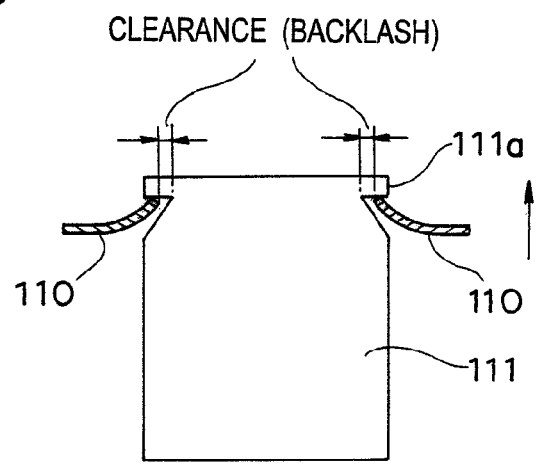
FIG. 57B is a schematic illustrative view showing displacement of the lens bracket in the ion conduction actuator after driven according to the conventional example.
Figure 57C:
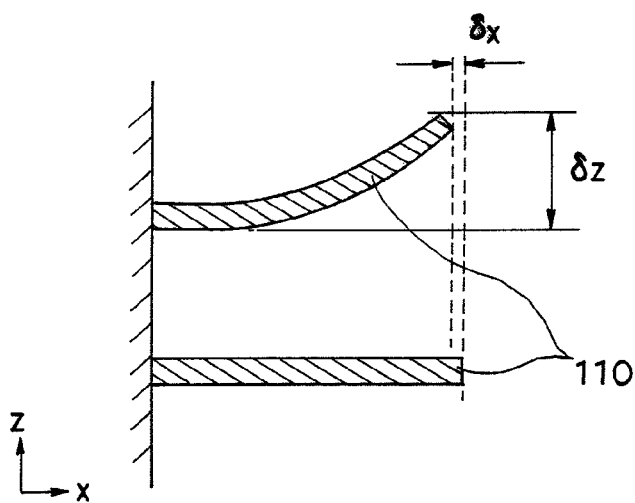
FIG. 57C is a schematic illustrative view showing the ion conduction actuator being bent according to the conventional example.
Figure 58:
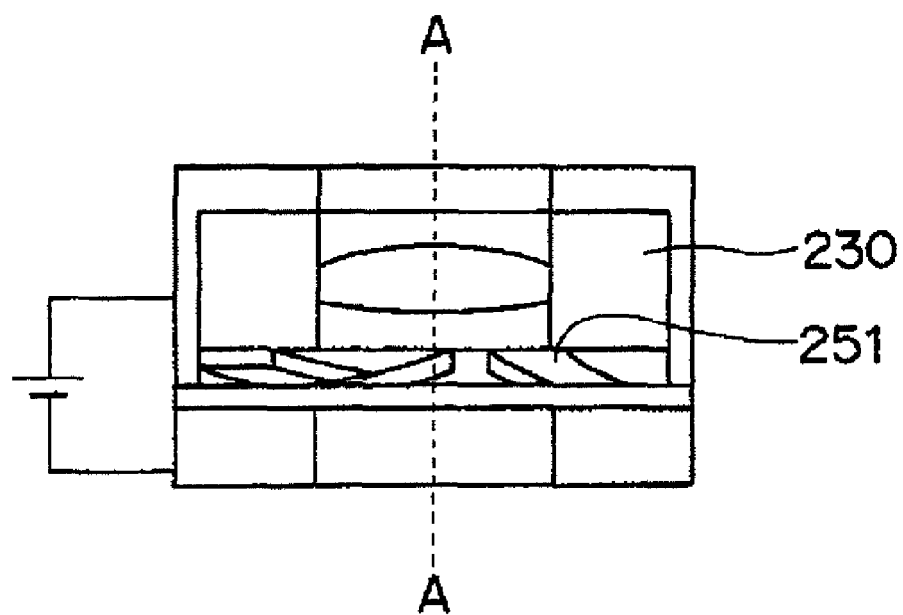
FIG. 58 is a view illustrating the cross-sectional structure of a lens driving mechanism in Patent Document 1.

With reference to FIGS. 1 to 56, various embodiments according to the present invention will be described in detail below.

First Embodiment

Figure 2:
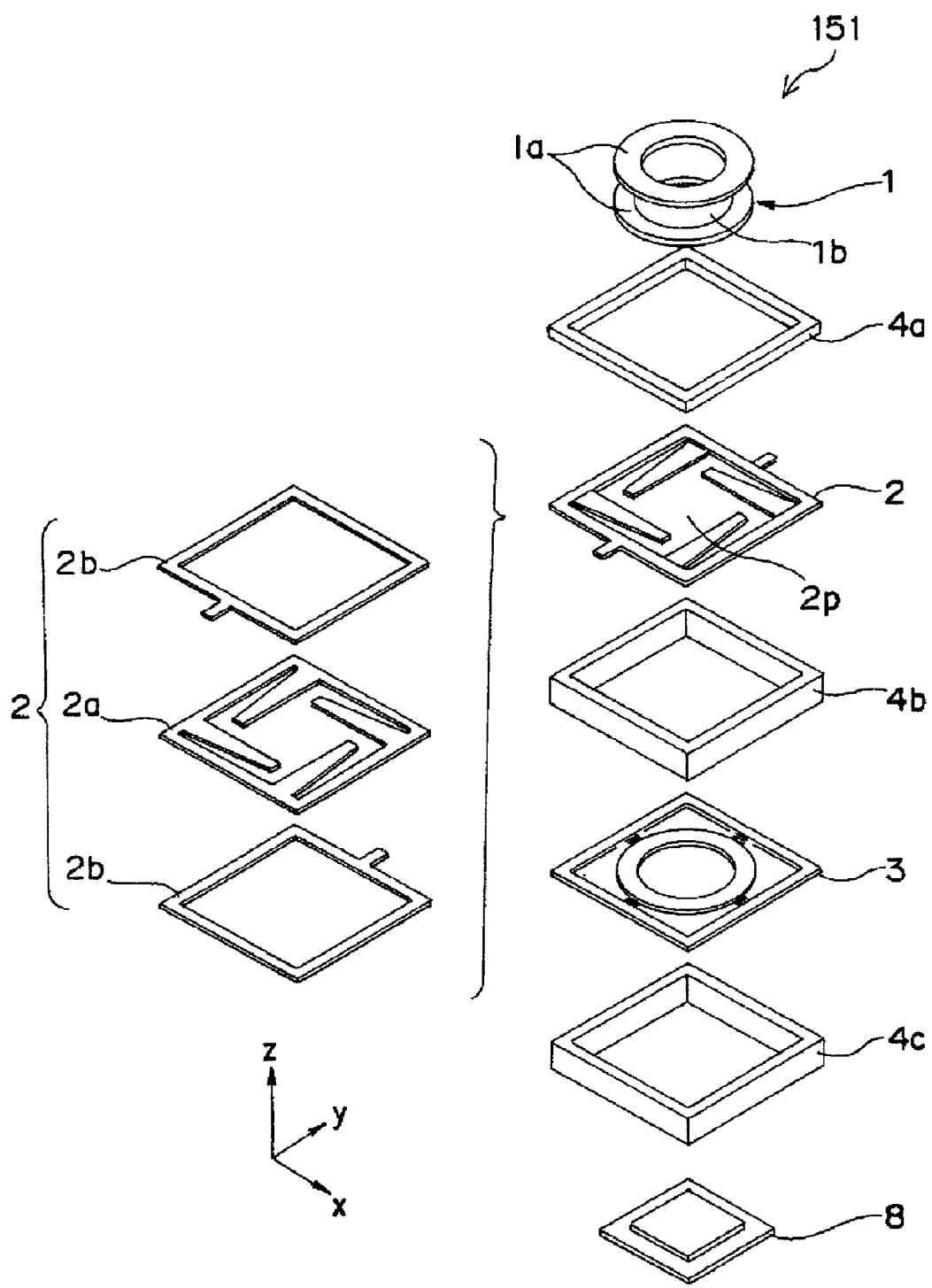
FIG. 2 is an exploded perspective view of the components of the above lens holder driving device employing the planary-driven conductive actuator according to the first embodiment of the present invention in FIG. 1 in a state where an image pickup device is incorporated therein.

FIG. 1 and FIG. 2 illustrate a perspective view and an exploded perspective view of a lens holder driving device 151 employing a planary-driven conductive actuator as an example of a planary-driven actuator according to the first embodiment of the present invention. In this case, it is assumed that an optical axis is along a z axis.

The lens holder driving device 151 illustrated in FIG. 1 and FIG. 2 is structured to include a lens holder 1, a planary-driven actuator 2, a lens-holder retaining plate 3, and a fixing frame member 4. An image pickup device 8 capable of capturing images of objects formed through a lens 9, which can be supported by the lens holder 1, can be incorporated in a lower portion of the lens holder driving device 151 within the fixing frame member 4 to form an image pickup unit. Further, the planary-driven actuator 2, the lens-holder retaining plate 3, and the fixing frame member 4, except the lens holder 1, form outer shapes with the same size and the same shape (a rectangular shape, such as a square shape, in the drawing).

Figure 3:
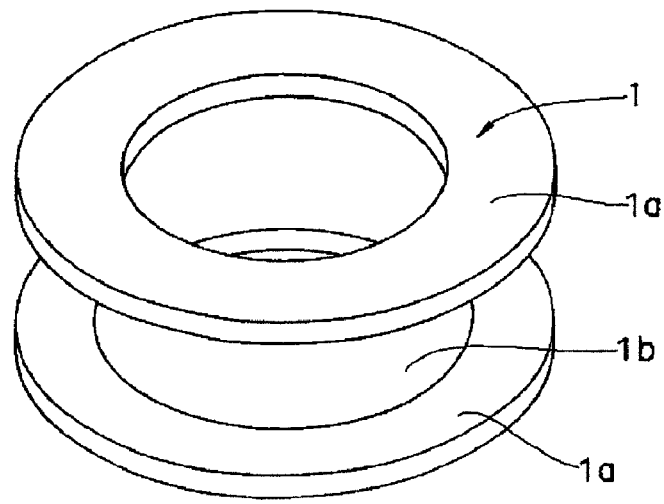
FIG. 3 is a perspective view of a lens holder in the lens holder driving device in FIG. 1.
Figure 4:
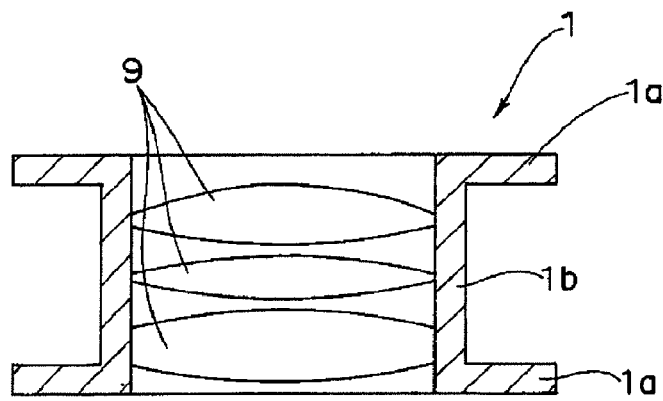
FIG. 4 is a cross-sectional view of the lens holder in the lens holder driving device in FIG. 1.

As illustrated in FIG. 3 and FIG. 4, the lens holder 1 is structured to include a cylindrical body portion 1b and annular flange portions 1a. The cylindrical body portion 1b functions as an example of the cylindrical body portion capable of holding at least a single lens 9 (see FIG. 4) for use in picking up images of objects, which is not illustrated in the drawing. The annular flange portions 1a function as an example of the protrusion portions which are placed at the opposite end portions of the cylindrical body portion 1b along the optical axis and are protruded in a direction intersecting with the direction of the optical axis (the direction orthogonal thereto, in the illustrated example). Each flange portion 1a is placed along the direction orthogonal to the axis of the cylindrical body portion 1b, and the two flange portions 1a are placed in parallel with each other.

The planary-driven actuator 2 is structured to include a film-type actuator main body 2a which is bent in response to the voltage applied thereto, and two rectangular-frame-shaped extraction electrodes 2b for supplying the applied voltage to the actuator main body 2a. Accordingly, it is structured such that the two extraction electrodes 2b sandwich, therebetween, the actuator main body 2a at its upper and lower sides.

Figure 9:
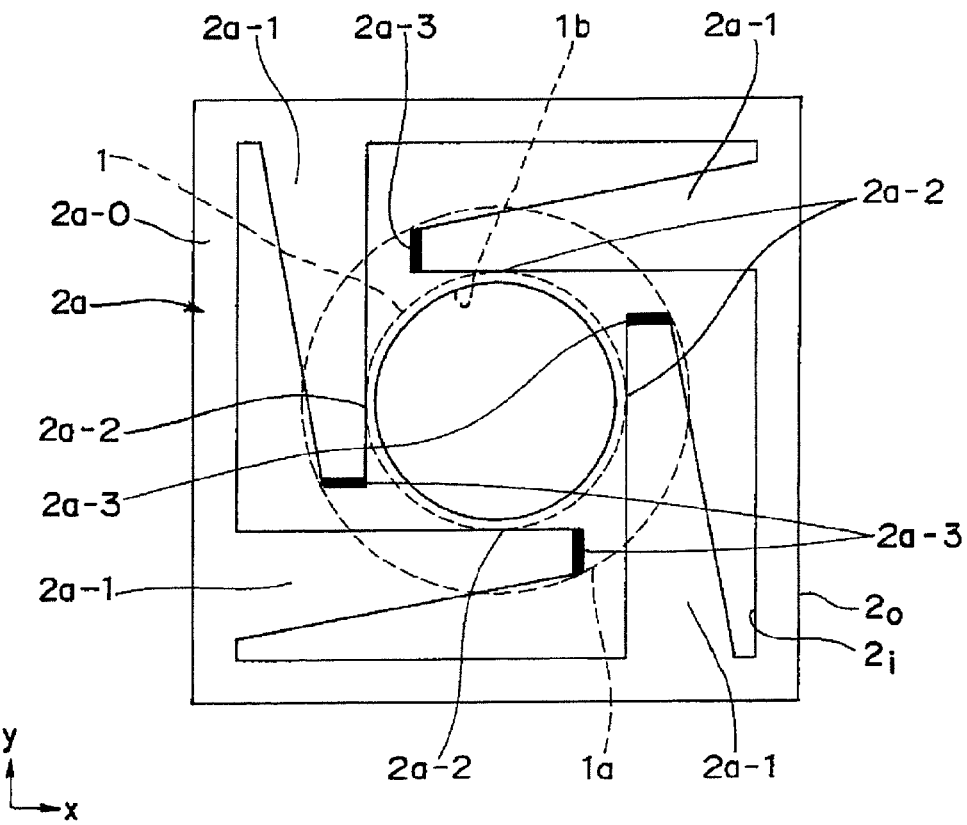
FIG. 9 is a plan view of the planary-driven actuator in the lens holder driving device according to the first embodiment of the present invention.

The actuator main body 2a is formed to have a film shape having a rectangular frame portion 2a-0 and lens-holder driving arm portions 2a-1, as illustrated by the planer shape of the actuator main body 2a in FIG. 9. The rectangular frame portion 2a-0 has an opening 2p which allows the cylindrical body portion 1b to penetrate through its center portion and also is secured to the fixing frame member 4, which will be described later. Each of the lens-holder driving arm portions 2a-1 is secured at its base end (the root portion) to the rectangular frame portion 2a-0 at the vicinity of a single corner portion thereof and also forms a free end at the other end. Each of the lens-holder driving arm portions 2a-1 is structured to include a free-end side contact portion 2a-3 and a lens-holder support point 2a-2. The free-end side contact portions 2a-3 are enabled to contact with any one of the flange portions 1a of the lens holder 1. The lens-holder support points 2a-2 contact with the outer surface of the cylindrical body portion 1b of the lens holder 1 at a plurality of positions opposing to each other (for example, a plurality of positions symmetrical with respect to a point, and more specifically, four positions at intervals of 90 degrees), at the inner edge portions near the free ends of the free-end side contact portions 2a-3, thereby holding the lens holder 1. Accordingly, when the respective lens holder driving arms 2a-1 are non-driven, and when they are driven, the lens-holder support points 2a-2 at the inner edge portions near the free-end side contact portions 2a-3 are contacted with the outer surface of the cylindrical body portion 1b of the lens holder 1, thereby holding the outer surface of the cylindrical body portion 1b. On the other hand, when the lens-holder driving arm portions 2a-1 are driven, this causes the respective free-end side contact portions 2a-3 of the lens-holder driving arm portions 2a-1 to contact with any one of the flange portions 1a of the lens holder 1, thereby moving the lens holder 1 from the initial position in any one of the directions along the optical axis. In this case, it is assumed that the planary-driven actuator 2 is a driving device which is mainly made of a polymer material, which can be formed to have a film shape, and also is capable of bending or contracting the material to generate outputs, in response to the voltage applied thereto.

Figure 12:
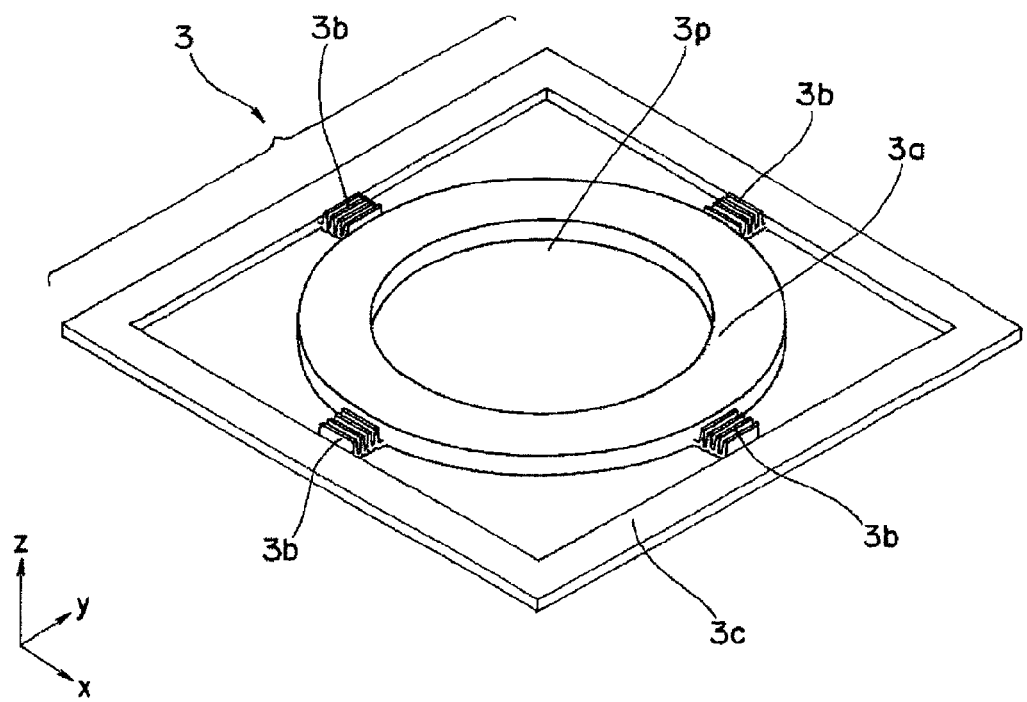
FIG. 12 is a perspective view of a lens-holder retaining plate having spring-characteristic portions, in the lens holder driving device according to the first embodiment of the present invention.

The lens-holder retaining plate 3 functions as an example of a lens-holder restoration member or a lens-holder retaining member with a thin plate shape. The lens-holder retaining plate 3 is constituted by a thin plate having a rectangular bonding portion 3c, a retaining portion 3a with a circular ring shape, and spring-characteristic portions 3b with a bellows shape, as illustrated in FIG. 12. The rectangular bonding portion 3c is secured to the fixing frame member 4 which will be described later. The retaining portion 3a with the circular ring shape has a circular opening 3p which allows the cylindrical body portion 1b of the lens holder 1 to be inserted therethrough, and also is enabled to contact with any one of the flange portions 1a. The spring-characteristic portions 3b with the bellows shape couple the respective sides of the rectangular bonding portion 3c, at their middle portions and at their inner edge portions, to the portions of the retaining portion 3a which are opposed thereto. Accordingly, the bonding portion 3c is secured to the fixing frame member 4 which will be described later, and also the cylindrical body portion 1b of the lens holder 1 is inserted into the retaining portion 3a, when they are assembled. In this state, when the respective driving arm portions 2a-1 of the planary-driven actuator 2 are driven to be bent and displaced substantially at the same time, the spring-characteristic portions 3b are flexibly deformed along therewith, thereby allowing the retaining portion 3a to move together with the cylindrical body portion 1b with respect to the bonding portion 3c. On the other hand, upon stop of driving the respective driving arm portions 2a-1, a restoration force is exerted on the flange portions 1a through the retaining portion 3a due to the spring force of the spring-characteristic portions 3b, thereby offering the function of restoring the lens holder 1 to the position before being moved.

The fixing frame member 4 forms the outer surfaces of the lens holder driving device 151 and is constituted by rectangular members having the same size. The fixing frame member 4 is constituted by an upper fixing frame 4a with a rectangular frame shape, a middle fixing frame 4b with a rectangular frame shape, and a lower fixing frame 4c with a rectangular frame shape for fixing the respective components. The planary-driven actuator 2 is sandwiched between the upper fixing frame 4a and the middle fixing frame 4b, so that the planary-driven actuator 2 is fixed thereby. The lens-holder retaining plate 3 is sandwiched between the middle fixing frame 4b and the lower fixing frame 4c, so that the lens-holder retaining plate 3 is fixed thereby. The above image pickup device 8 can be assembled into the lower fixing frame 4c to form an image pickup unit.

FIG. 2 illustrates an exploded perspective view of the components of the lens holder driving device 151 employing the above planary-driven conductive actuator according to the first embodiment of the present invention.

Hereinafter, the respective components will be described in more detail.

FIG. 3 illustrates an external perspective view of the lens holder 1 having the flange portions 1a at the opposite end portions of the cylindrical body portion 1b, and FIG. 4 illustrates a cross sectional view of the same. The cylindrical body portion 1b of the lens holder 1 having the flange portions 1a at the opposite end portions of the cylindrical body portion 1b has an inner diameter and a thickness which enable holding at least a single lens 9. Accordingly, the cylindrical body portion 1b includes the flange portions 1a having an outer shape which can be surely contacted by the free-end side contact portions 2a-3 of the respective lens-holder driving arm portions 2a-1 of the planary-driven actuator 2. In this case, it is desirable that the lens holder 1 has a light weight enough to be capable of being moved by the driving force generated by bending the respective lens-holder driving arm portions 2a of the planary-driven actuator 2, and it is preferable to employ a resin material. This resin material can be, for example, an ABS resin or a polyvinyl chloride, because of the ease of processing thereof, but is not limited thereto. As illustrated in FIG. 4, for example, three lenses 9 are mounted in the lens holder 1 to form a group of lenses 9. This enables changing the focal point from macro to infinity for introducing images of objects formed by the group of lenses 9 into the image pickup device 8, by moving the group of lenses 9 along the optical axis with respect to the image pickup device 8. As an concrete example, the lens holder 1 is sized such that, for example, the cylindrical body portion 1b has an outer diameter of 7 mm, an inner diameter of 6 mm and a height of 7 mm along the optical axis, and the flange portions 1*a* at the opposite end portions have an outer diameter of 10 mm and a thickness of 0.5 mm.

The two extraction electrodes 2*b* in the planary-driven actuator 2 are used for supplying a voltage to the actuator main body 2*a*, and therefore are required to be made of a conductive material, and desirably are made of a metal material with excellent conductivity. Further, the material for the extraction electrodes 2*h* is desirably a material with a low ionization tendency which does not induce electrolytic corrosion thereof with the ionic liquid used in driving the planary-driven actuator 2. As the material for the extraction electrodes 2*b*, it is possible to employ, for example, Pt or Au sputtered on the surface of Pt, Au, SUS, Cu, or the like; or Au formed, through plating, on the surface of Pt, Au, SUS, Cu or the like. As a concrete example, the extraction electrodes 2*b* have a thickness of 0.1 mm, their square outer shape (the outer edge) has a size of 14 mm at each single side, and their square inner shape (the inner edge) has a size of 12 mm at each single side.

The actuator main body 2*a* is characterized in that the respective driving arm portions 2*a*-1 are bent and displaced substantially at the same time along the optical axis, in response to the voltage applied thereto from the extraction electrodes 2*b* according to the direction of application of the voltage as described above. Further, as a result, the free-end side contact portions 2*a*-3 of the respective driving arm portions 2*a*-1 move the lens holder 1 along the optical axis, while contacting with the flange portions 1*a* of the lens holder 1. The lens-holder support points 2*a*-2 placed at the plurality of opposing positions restrain the outer surface of the cylindrical body portion 1*b* of the lens holder 1 in a plane intersecting with the direction of the optical axis (for example, a plane about the optical axis, and more specifically, a plane which is about the optical axis and also is orthogonal to the optical axis). As a concrete example, the actuator main body 2*a* is sized such that, for example, its thickness is 0.1 mm, its square outer shape has a size of 14 mm at each single side 2*o*, and its portion sandwiched between the two electrodes 2*b* is the portion with a width of 1 mm from the outer shape. In this case, the square inner edge of the portion other than the driving arm portions 2*a*-1 has a size of 12 mm at each single side 2*i*, and the portion sandwiched between the two extraction electrodes 2*b* (the rectangular frame portion 2*a*-0) (the pressing margin) has a width of 1 mm. Each driving arm portion 2*a*-1 has a trapezoid shape, such that each driving arm portion 2*a*-1 has a length of 8 mm, a width of 2 mm at its root portion (the base end), and a width of 1 mm at its tip end portion (the free-end side contact portion 2*a*-3).

On the other hand, the spring characteristic-portions 3*b* of the lens-holder retaining plate 3 illustrated in FIG. 12 are required to deform flexibly according to the bending and displacement of the respective driving arm portions 2*a*-1 of the planary-driven actuator 2, and therefore it is preferable to employ, therefor, a resin material, a spring material, a rubber, or the like. An example of the resin material is polypropylene. Polypropylene has an excellent cyclic bending strength, and also enables integrally forming the respective components of the lens-holder retaining plate 3. As a concrete example, the lens-holder retaining plate 3 is sized such that, for example, its thickness is 0.3 mm, the outer shape of the square frame portion has a size of 14 mm at each single side, the inner edge of the square frame portion has a size of 12 mm at each single side, and its portion (the retaining portion 3*a*) for retaining the lens holder 1 has an inner diameter of 7 mm. For example, the retaining portion 3*a* has an outer diameter of 10 mm, which is the same as that of the flange portions 1*a* of the lens holder 1.

The fixing frame member 4 having the upper fixing frame 4*a*, the middle fixing frame 4*b*, and the lower fixing frame 4*c* is for fixing the positions of the planary-driven actuator 2 and the lens-holder retaining plate 3, which are components. The middle fixing frame 4*b* has a thickness necessary for placing the driving arm portions 2*a*-1 of the planary-driven actuator 2 and the lens retaining plate 3 having the spring-characteristic portions 3*b* in parallel with each other so as to come into contact with the upper and lower flange portions 1*a* of the lens holder 1, respectively. The upper and middle fixing frames 4*a* and 4*b* are for sandwiching the planary-driven actuator 2 therebetween for fixing the planary-driven actuator 2, while the lower fixing frame 4*c* is for installing the lens holder driving device 151. Therefore, they are required to be made of an insulation material. This insulation material can be, for example, an ABS resin or polyvinyl chloride because of the ease of processing thereof, but is not limited thereto.

As described above, the upper fixing frame 4*a*, the middle fixing frame 4*b*, and the lower fixing frame 4*c* are for retaining and fixing the planary-driven actuator 2 and the lens-holder retaining plate 3 which are constituents of the lens holder driving device 151. The respective components of the upper fixing frame 4*a*, the middle fixing frame 4*b*, and the lower fixing frame 4*c* have thicknesses determined by the thickness of the lens holder 1 which is determined by the number and size of lenses 9 incorporated in the lens holder driving device 151. As a concrete example, the upper fixing frame 4*a*, the middle fixing frame 4*b*, and the lower fixing frame 4*c* are sized such that, for example, their thicknesses are 1 mm, 2.5 mm, and 2.35 mm in the mentioned order, and their square outer shape has a size of 14 mm at each single side, and their square inner edge has a size of 12 mm at each single side.

With lens holder driving devices which have been conventionally developed, even when the numbers and the sizes of lenses used therein are changed to reduce the sizes of the lens holders, there has been a limit on the reduction in the thicknesses of the actuators for moving the lens holders in the directions of the optical axes.

However, with the structure of the lens holder driving device 151 according to the present embodiment, when the number and the size of the lenses 9 are changed, and thus the size of the lens holder 1 is reduced, the thickness of the lens holder 1 is reduced, and also the thicknesses of the upper fixing frame 4*a*, the middle fixing frame 4*b*, and the lower fixing frame 4*c* are reduced. It is thus possible to cope with the reduction in the size and the thickness of the entire lens holder driving device 151, thereby offering the advantage that the lens holder driving device 151 with a reduced thickness can be easily realized. The lens holder 1 having the flange portions 1*a* is sandwiched between the planary-driven actuator 2 and the lens-holder retaining plate 3 having the spring-characteristic portions 3*b*, and the respective components are bonded to one another with the upper fixing frame 4*a*, the middle fixing frame 4*b*, and the lower fixing frame 4*c*. It is thus possible to realize the lens holder driving device 151. An image pickup device 8 can be incorporated in the lowermost portion of the lens holder driving device 151 to form an image pickup unit.

FIG. 18 illustrates a side view of the lens holder driving device 151 employing the above planary-driven actuator according to the first embodiment of the present invention (a cross sectional view of only the fixing frame member). In this case, the planary-driven actuator 2 and the lens retaining plate 3 are placed in parallel with each other, such that the respective driving arm portions 2*a*-1 (particularly, the free-end side contact portions 2*a*-3 at their free ends) of the planary-driven actuator 2 at a non-driven state are contacted with the lower surface 1a of the upper flange portion 1a of the lens holder 1, and also the lower surface of the retaining portion 3a of the lens retaining plate 3 is contacted with the upper surface of the lower flange portion 1a of the lens holder 1. With this placement, the upper and lower flange portions 1a of the lens holder 1 are held between the planary-driven actuator 2 and the lens retaining plate 3 through the middle fixing frame 4b, which restricts (defines) an initial position of the lens holder 1 along the optical axis.

Figure 19A:
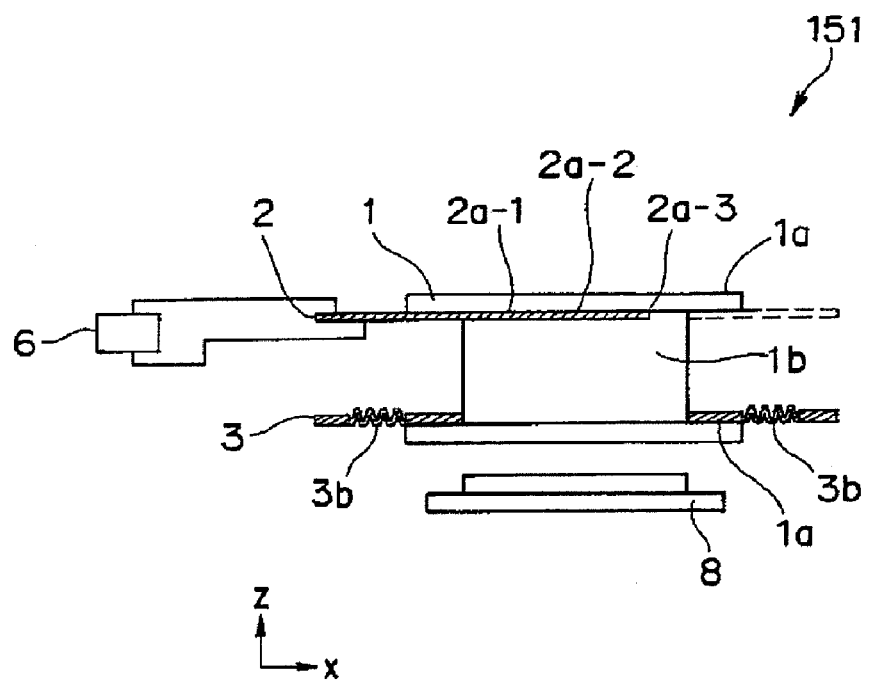
FIG. 19A is a side view schematically illustrating the lens holder driving device employing the planary-driven actuator in FIG. 18 according to the first embodiment of the present invention, with the position of an image pickup device being illustrated for the purpose of reference, and also illustrating a state where no voltage is applied from a power supply to the planary-driven actuator.
Figure 19B:
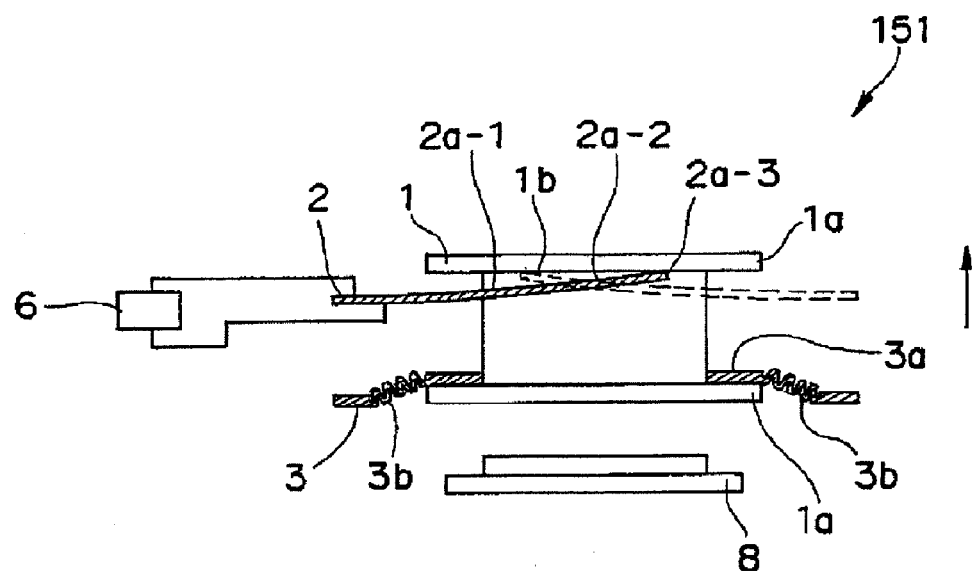
FIG. 19B is a side view schematically illustrating the lens holder driving device employing the planary-driven actuator in FIG. 18 according to the first embodiment of the present invention, with the position of an image pickup device being illustrated for the purpose of reference, and also illustrating a state where a voltage is applied from the power supply to the planary-driven actuator, and thus the lens holder has been displaced along a +z axis.

FIG. 19A and FIG. 19B are side views schematically illustrating a method for driving the lens holder driving device 151 employing the planary-driven actuator 2 according to the first embodiment of the present invention.

FIG. 19A illustrates a state where no voltage is applied to the planary-driven actuator 2 from a power supply 6, and thus the planary-driven actuator 2 is at the initial position. In this case, the lens holder 1 is restricted in position in a plane intersecting with the direction of the optical axis, by the lens holder support point 2a-2 of the respective driving arm portions 2a-1 of the planary-driven actuator 2 and by the retaining portion 3a of the lens retaining plate 3. Further, the initial position of the lens holder 1 is restricted along the optical axis of the lens holder 1, by the free-end side contact portions 2a-3 of the respective driving arm portions 2a-1 in the planary-driven actuator 2 and by the retaining portion 3a in a state where the spring-characteristic portions 3b of the lens retaining plate 3 are not bent. Accordingly, the lens holder 1 is kept in a looseness-free state. In the first embodiment, the flange portions 1a of the lens holder 1 are not coupled and secured to the free-end side contact portions 2a-3 of the respective driving arm portions 2a-1 of the planary-driven actuator 2. This enables utilizing to a maximum extent the bend and displacement of the respective driving arm portions 2a-1 of the planary-driven actuator 2 for moving the lens holder 1 along the optical axis. This enables increasing the ranges within which the respective driving arm portions 2a-1 are movable, in comparison with cases where the respective free-end side contact portions 2a-3 of the planary-driven actuator 2 are coupled and secured to the flange portions 1a of the lens holder 1. This is considered to be because the bending of the free-end sides of the driving arm portions 2a-1 can be utilized for moving the lens holder 1 along the optical axis to a maximum extent, since the driving arm portions 2a-1 have free ends at their one sides. On the other hand, when the driving arm portions 2a-1 have fixed ends at their opposite end portions, the driving arm portions 2a-1 do not bend only in a single direction, and the bending direction thereof is changed halfway therethrough to such a direction as to obstruct movement of the lens holder 1 along the optical axis. As a result, the amount of bend and displacement of the driving arm portions 2a-1 is restricted, thereby reducing the amount of movement of the lens holder 1. Therefore, it is possible to increase, more largely, the ranges within which the driving arm portions 2a-1 are movable, in the case where the driving arm portions 2a-1 have free ends at their one sides.

FIG. 19B illustrates a state where a voltage is applied to the planary-driven actuator 2 from the power supply 6. Due to the applied voltage, the respective driving arm portions 2a-1 of the planary-driven actuator 2 are bent and displaced substantially at the same time along a +z axis (upwardly in FIG. 19B). This causes the free-end side contact portions 2a-3 of the respective driving arm portions 2a-1 to move the lens holder 1 from the initial position along the +z axis (along an arrow), while contacting with the bottom surface of the upper flange portion 1a of the lens holder 1. Along with this movement, the respective spring-characteristic portions 3b of the lens retaining plate 3 support the lens holder 1 while bending substantially at the same time. Accordingly, in this state, the lens holder 1 is restricted in position in a plane intersecting with the direction of the optical axis, by the lens holder support point 2a-2 of the respective driving arm portions 2a-1 of the planary-driven actuator 2 and by the retaining portion 3a of the lens retaining plate 3 having the spring-characteristic portions 3b. Further, in the lens holder 1, along the optical axis, the free-end side contact portions 2a-3 of the respective driving arm portions 2a-1 contact with the bottom surface of the upper flange portion 1a of the lens holder 1, and also the retaining portion 3a of the lens retaining plate 3 contacts with the upper surface of the lower flange portion 1a of the lens holder 1 due to the biasing forces from the respective spring-characteristic portions 3b. Thus, the lens holder 1 is restricted in position. Accordingly, along the optical axis and along a direction intersecting with the direction of the optical axis, the lens holder 1 is restricted in position and is kept in a looseness-free state.

Next, application of the voltage from the power supply 6 is stopped or a voltage with a different polarity is applied thereto. This causes the respective driving arm portions 2a-1 of the planary-driven actuator 2 to be bent and displaced substantially at the same time along a −z axis (downwardly in FIG. 19B). Then, further, due to the spring forces from the respective spring-characteristic portions 3b of the lens retaining plate 3, the lens holder 1 is moved along the −z axis and is displaced to the above initial position, while the respective free-end side contact portions 2a-3 of the planary-driven actuator 2 contact with the bottom surface of the upper flange portion is of the lens holder 1. After restoring to the above initial position, the lens holder 1 is restricted in position and is kept in a looseness-free state, again, along the optical axis and along the direction intersecting with the direction of the optical axis, as described above.

With the above structure according to the first embodiment, it is possible to move the lens holder 1 only along the optical axis, while restricting the position of the lens holder 1 in a plane intersecting with the direction of the optical axis of the lens holder 1, due to the shape of the planary-driven actuator 2.

The lens holder 1 is fixed in position in a plane intersecting with the direction of the optical axis of the lens holder 1, through the lens holder support points 2a-2. Further, the lens holder 1 is moved along the optical axis, through the free-end side contact portions 2a-3. As described above, the lens holder support points 2a-2 and the free-end side contact portions 2a-3, which are the portions of the planary-driven actuator 2 which come into contact with the lens holder 1, play different roles, which is one of the characteristics.

Therefore, according to the present embodiment employing the plurality of planary-driven actuators, it is possible to move the lens holder 1 along the optical axis, while fixing the position of the lens holder 1 in the plane intersecting with the direction of the axis, even when there are variations in amount of deformation among the plurality of actuators.

For example, in cases of ion conduction actuators which are displaced by movements of ions, even when the same voltage is applied to the plurality of actuators to be used, ions may not move in completely the same manner, thereby inducing variations in amount of displacement thereamong.

Figure 59:
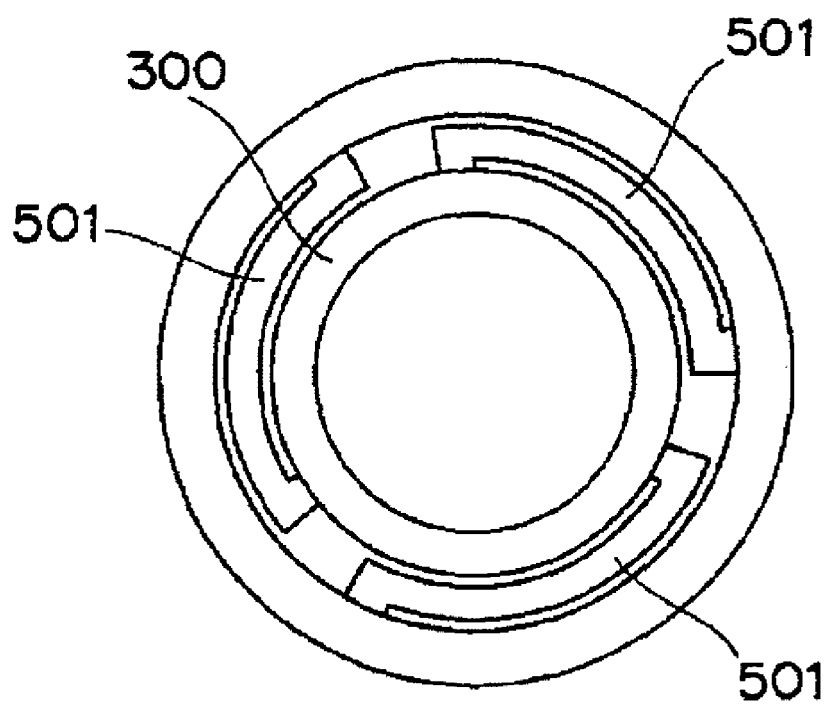
FIG. 59 is a front view of an optical device in Patent Document 2.

As in the conventional example illustrated in FIG. 59, when the lens frame 300 and each actuator 501 contact with each other at only a single point, when there is induced a variation in amount of displacement among the three actuators 501, this induces an inclination of the lens 200 with respect to a place intersecting with the axial direction. In such a case, the position thereof is not fixed in the plane intersecting with the axial direction. Particularly, in cases where this structure is used in a small-sized camera module to be incorporated in a mobile terminal or the like, the actuators are required to have excellent accuracy in amount of displacement.

In the present embodiment, even when there are variations in amount of displacement among the plurality of actuators, it is possible to move the lens holder 1 along the optical axis through the free-end side contact portion 2a-3 in the actuator which is displaced by a largest amount, while fixing the position thereof in a plane intersecting with the direction of the axis through the lens holder support points 2a-2. As described above, the lens holder support points 2a-2 and the free-end side contact portions 2a-3, which are the portions of the planary-driven actuator 2 which come into contact with the lens holder 1, play different roles, which enables moving the lens holder 1 along the optical axis, while fixing the position thereof in the plane intersecting with the axial direction.

Further, when there is a faulty actuator out of the plurality of actuators, as well as when there are variations in amount of displacement among the actuators, similarly, it is possible to move the lens holder 1 along the optical axis, while fixing the position thereof in a plane intersecting with the axial direction.

Further, since the upper and lower flange portions 1a of the lens holder 1 are not coupled and secured to the respective free-end side contact portions 2a-3 of the planary-driven actuator 2, it is possible to utilize to a maximum extent the bend and displacement of the respective driving arm portions 2a-1 of the planary-driven actuator 2 for moving the lens holder 1 along the optical axis, thereby realizing the lens holder driving device 151 capable of moving the lens holder 1 along the optical axis by an amount.

With the above structure according to the first embodiment, it is possible to move the lens holder 1 only along the optical axis while restricting the position of the lens holder 1 in a plane intersecting with the direction of the optical axis, through the shape of the planary-driven actuator 2. Further, since the upper and lower flange portions 1a of the lens holder 1 are not coupled and secured to the respective free-end side contact portions 2a-3 of the planary-driven actuator 2, it is possible to utilize to a maximum extent the bend and displacement of the respective driving arm portions 2a-1 of the planary-driven actuator 2 for moving the lens holder 1 along the optical axis. This realizes the lens holder driving device 151 capable of moving the lens holder 1 along the optical axis by an amount.

Further, the present invention is not limited to the first embodiment and can be implemented in other various aspects.

For example, FIGS. 5A to 5D illustrate various examples of modifications of the shape of a lens holder 1 having flange portions 1a. Further, their portions having the same functions will be designated by the same reference characters as those for the portions of the lens holder 1, and therefore will not be described.

Figure 5A:
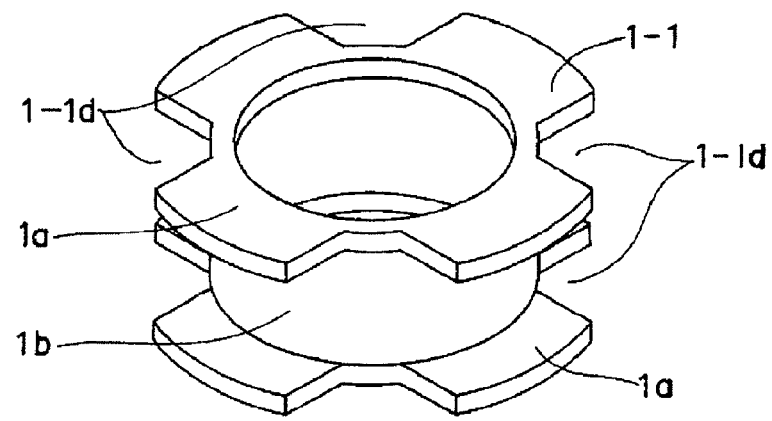
FIG. 5A is a perspective view of an example of modification the lens holder in the lens holder driving device in FIG. 1.

FIG. 5A illustrates an example of a lens holder 1-1 having flange portions 1a provided with cutout portions 1-1d for removing other portions of the flange portions 1a which function as an example of the protrusion portions than the portions which are contacted by the free-end side contact portions 2a-3 of the planary-driven actuator 2. Since portions of the flange portions 1a other than their portions which are contacted by the free-end side contact portions 2a-3 of the planary-driven actuator 2 are removed, as described above, there is provided the advantage that the weight of the lens holder 1-1 can be reduced. Further, when the driving arm portions 2a-1 of the planary-driven actuator 2 are bent, the driving arm portions 2a-1 interfere with the flange portions 1a of the lens holder 1 at their portions other than the free-end side contact portions 2a-3. Accordingly, there is provided the advantage that it is possible to prevent reduction in the amount of bend and displacement of the driving arm portions 2a-1 of the planary-driven actuator 2.

Figure 5B:
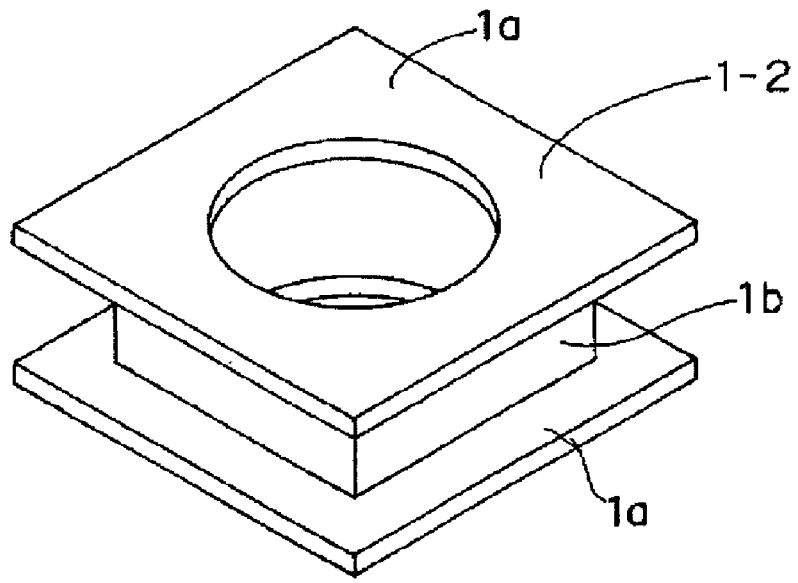
FIG. 5B is a perspective view of another example of modification of the lens holder in the lens holder driving device in FIG. 1.

Further, FIG. 5B illustrates a lens holder 1-2 adapted such that its outer shape, namely the outer shapes of a cylindrical body portion 1b and flange portions 1a which function as an example of the protrusion portions therein, is a rectangular shape, rather than a circular outer shape. Accordingly, there is provided the advantage that the lens holder 1 is prevented from rotating in a plane intersecting with the direction of the optical axis (for example, a plane about the optical axis), due to the bending of the driving arm portions 2a-1 of the planary-driven actuator 2.

Figure 5C:
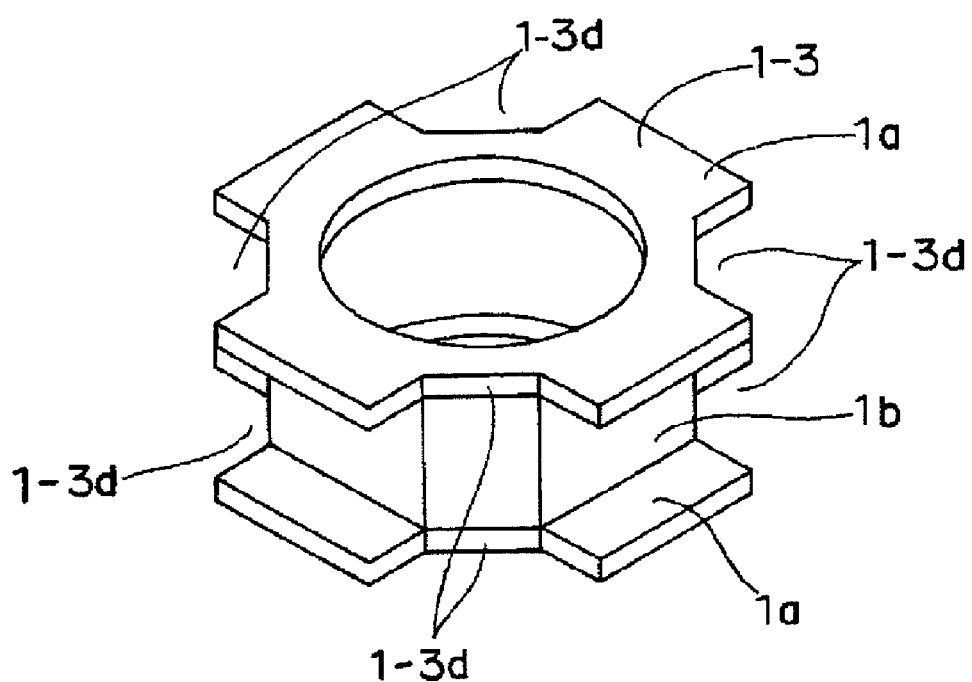
FIG. 5C is a perspective view of yet another example of modification of the lens holder in the lens holder driving device in FIG. 1.

FIG. 5C illustrates an example of a lens holder 1-3 having flange portions 1a provided with cutout portions 1-3d for removing other portions of the flange portions 1a which function as an example of the protrusion portions than the portions which are contacted by the free-end side contact portions 2a-3 of the planary-driven actuator 2, similarly to in FIG. 5A, in addition to the rectangular lens holder 1-2 in FIG. 5B. Since portions of the flange portions 1a other than their portions which are contacted by the free-end side contact portions 2a-3 of the planary-driven actuator 2 are removed, as described above, there is provided the advantage that the weight of the lens holder 1-3 can be reduced. Further, when the driving arm portions 2a-1 of the planary-driven actuator 2 are bent, the driving arm portions 2a-1 interfere with the flange portions 1a of the lens holder 1-3 at their portions other than the free-end side contact portions 2a-3. Accordingly, there is further provided the advantage that it is possible to prevent reduction in the amount of bend and displacement of the driving arm portions 2a-1 of the planary-driven actuator 2. Further, there is provided the advantage that the lens holder 1-3 is prevented from rotating in a plane intersecting with the direction of the optical axis (for example, a plane about the optical axis).

Figure 5D:
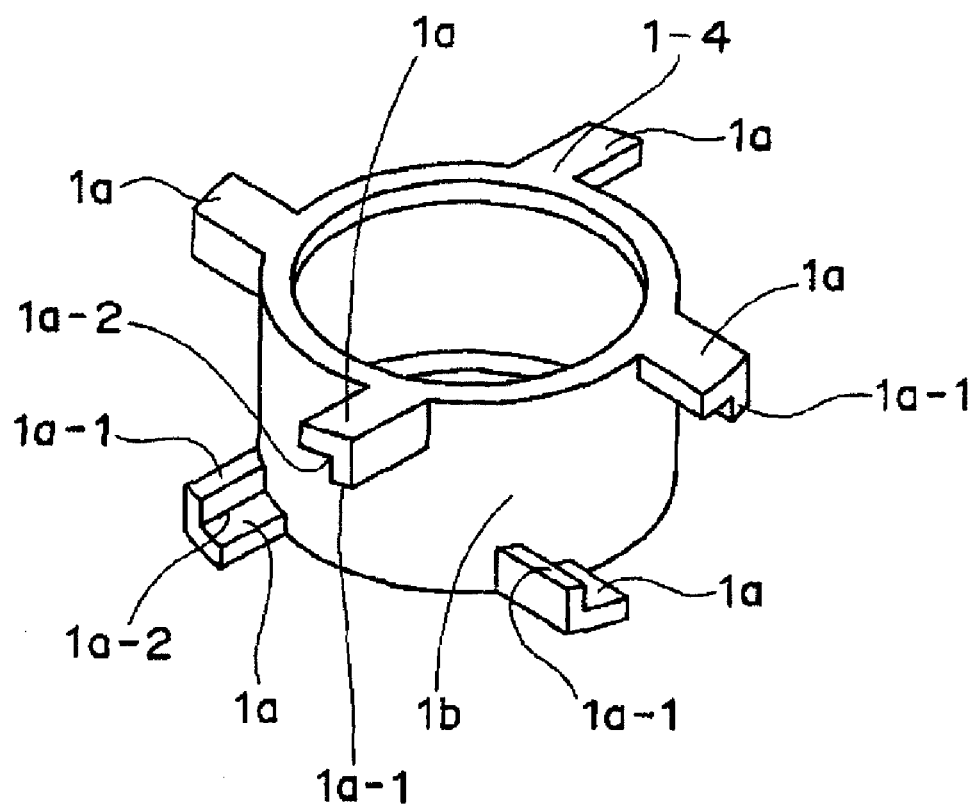
FIG. 5D is a perspective view of yet another example of modification of the lens holder in the lens holder driving device in FIG. 1.

Further, FIG. 5D illustrates a lens holder 1-4 having flange portions 1a which are provided, at their upper and lower sides, with inner protrusion portions 1a-1, at four positions evenly spaced apart from one another in the circumferential direction, in addition to the flange portions 1a of the lens holder 1. The upper flange portion 1a of the cylindrical body portion 1b in FIG. 5D and the lower flange portion 1a of the cylindrical body portion 1b in FIG. 5D are opposed to each other, and also are placed in a point-symmetrical relationship at 180 degrees about a midpoint therebetween. As illustrated in FIG. 21B, the respective free-end side contact portions 2a-3 of an upper first planary-driven actuator 2 are placed so as to be opposed to the corner portions 1a-2 of the respective upper inner protrusion portions 1a-1 on the flange portions 1a. Further, the respective free-end side contact portions 2a-3 of the lower second planary-driven actuator 92 are placed so as to be opposed to the corner portions 1a-2 of the respective lower inner protrusion portions 1a-1 on the flange portions 1a. Accordingly, the corner portions 1a-2 of the upper inner protrusion portions 1a-1 of the flange portions 1a are engaged with the free-end side contact portions 2a-3 of the upper first planary-driven actuator 2 to prevent rotation of the lens holder 1-4, while the corner portions 1a-2 of the lower inner protrusion portions 1a-1 of the flange portions 1a are engaged with the free-end side contact portions 2a-3 of the lower second planary-driven actuator 92 to prevent rotation of the lens holder 1-4. The corner portions 1a-2 of the inner protrusion portions 1a-1 can play a role in preventing rotation of the lens holder 1-4.

Figure 6:
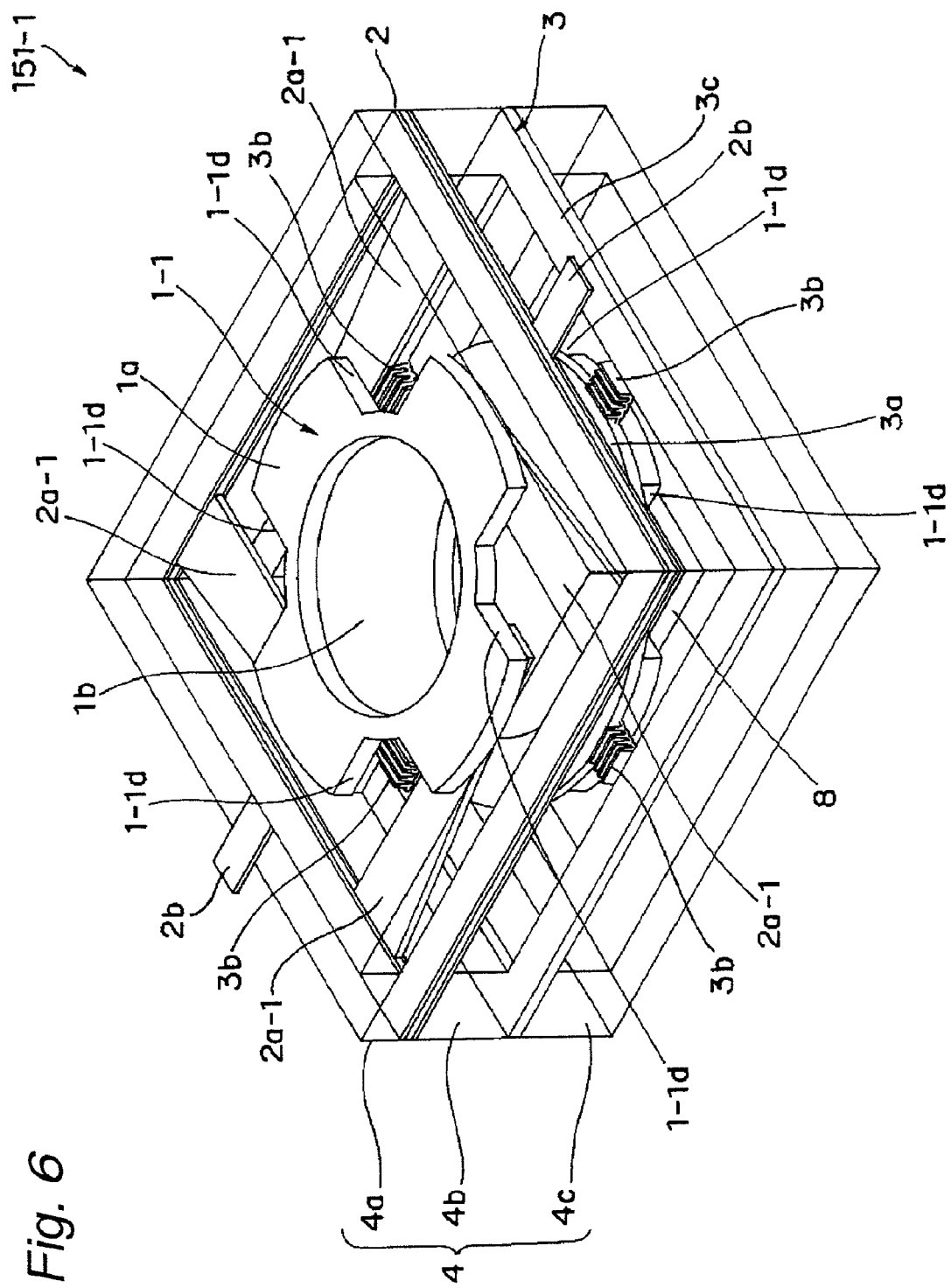
FIG. 6 is a perspective view of the lens holder driving device employing the planary-driven actuator according to the first embodiment of the present invention, in a state where the lens holder in FIG. 5A is applied thereto, an image pickup device is incorporated therein, and the lens holder driving device is viewed only through the fixing frame member.

Further, FIG. 6 illustrates a perspective view of a lens holder driving device 151-1 incorporating the lens holder 1-1 in FIG. 5A according to an example of modification of the first embodiment. The lens holder driving device 151-1 is structured to include the lens holder 1-1 in FIG. 5A, the planary-driven actuator 2, the lens-holder retaining plate 3, and the fixing frame member 4. The planary-driven actuator 2 includes driving arm portions 2a-1 having free-end side contact portions 2a-3 and lens holder support points 2a-2 which come into contact with the outer surface of the cylindrical body portion 1b of the lens holder 1-1 at a plurality of opposing positions (for example, a plurality of positions symmetrical about a point, and more specifically, four positions at 90-degrees intervals) for holding the lens holder 1-1. The lens-holder retaining plate 3 has spring-characteristic portions 3b and the like. The fixing frame member 4 has an upper fixing frame 4a, a middle fixing frame 4b, and a lower fixing frame 4c which form the outer surfaces of the lens holder driving device 151-1 and fix the respective components.

With this structure, the entire lens holder driving device 151-1 according to the above example of modification can have a reduced weight, and also the respective driving arm portions 2a-1 of the planary-driven actuator 2 are not coupled and secured to the flange portions 1a of the lens holder 1. Accordingly, there is provided the advantage of an increase of the ranges within which the driving arm portions 2a-1 of the planary-driven actuator 2 are movable, thereby increasing the amount of movement of the lens holder 1-1 along the optical axis.

Figure 7:
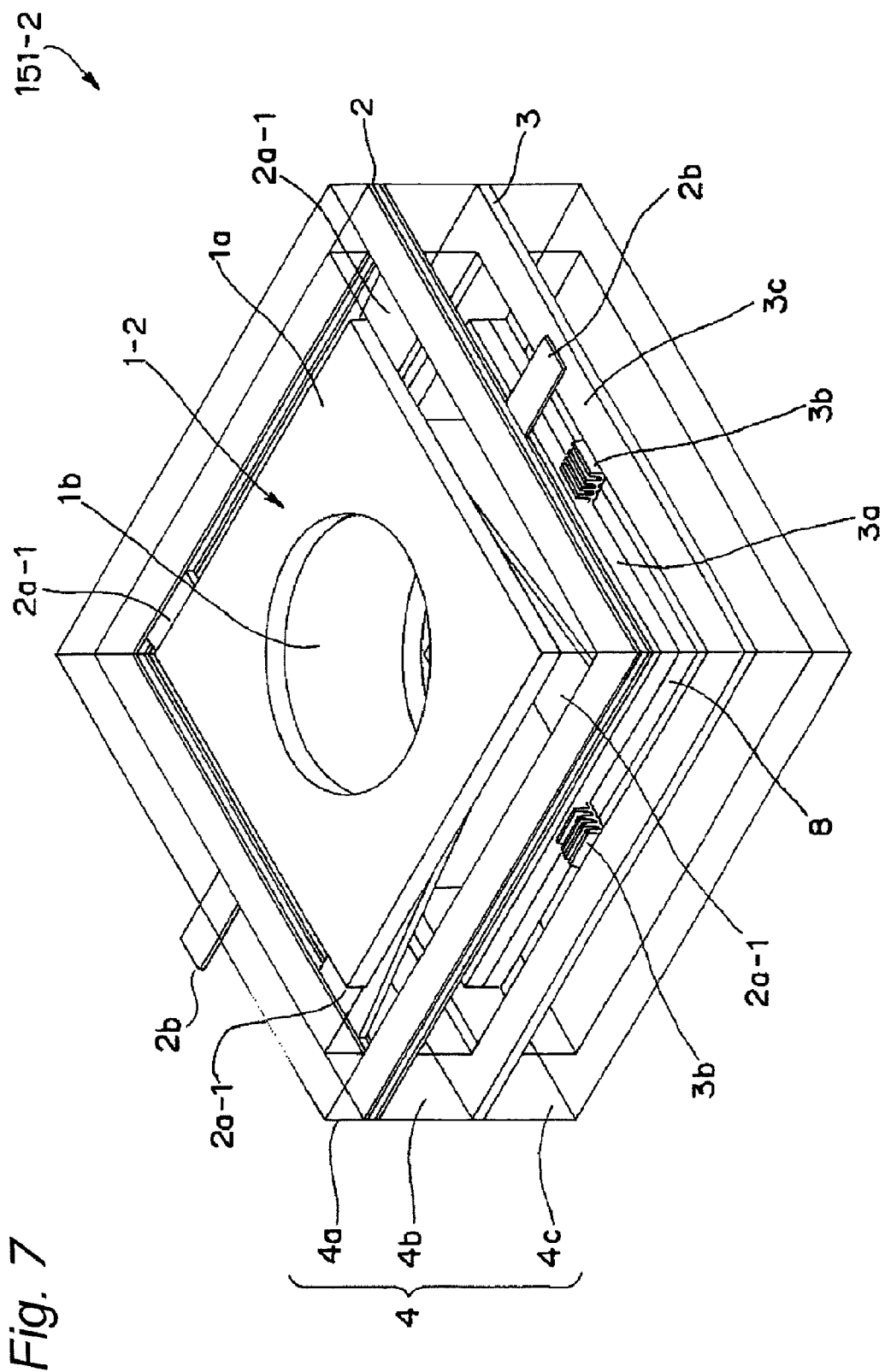
FIG. 7 is a perspective view of the lens holder driving device employing the planary-driven actuator according to the first embodiment of the present invention, in a state where the lens holder in FIG. 5B is applied thereto, an image pickup device is incorporated therein, and the lens holder driving device is viewed only through the fixing frame member.

FIG. 7 is a perspective view of a lens holder driving device 151-2 incorporating the lens holder 1-2 in FIG. 5B according to another example of modification of the first embodiment. The lens holder driving device 151-2 is structured to include the lens holder 1-2 in FIG. 5B, the planary-driven actuator 2, the lens-holder retaining plate 3, and the fixing frame member 4. The planary-driven actuator 2 includes driving arm portions 2a-1 having free-end side contact portions 2a-3 and lens holder support points 2a-2 which come into contact with the outer surface of the cylindrical body portion 1b of the lens holder 1-2 at a plurality of opposing positions (for example, a plurality of positions symmetrical about a point, and more specifically, four positions at 90-degrees intervals) for holding the lens holder 1-2. The lens-holder retaining plate 3 has spring-characteristic portions 3b and the like. The fixing frame member 4 has an upper fixing frame 4a, a middle fixing frame 4b, and a lower fixing frame 4c which form the outer surfaces of the lens holder driving device 151-2 and fixing the respective components.

With this structure, even when the lens holder 1-2 tries to rotate in a plane intersecting with the direction of the optical axis within the fixing frame member 4 due to variations of the timings of driving the driving arm portions 2a-1, the lens holder 1-2 is restricted in rotation by contacting with the fixing frame member 4, since the lens holder 1-2 has the rectangular shape. As a result, there is provided the advantage that the lens holder 1-2 is allowed to move only along the optical axis.

Figure 8:
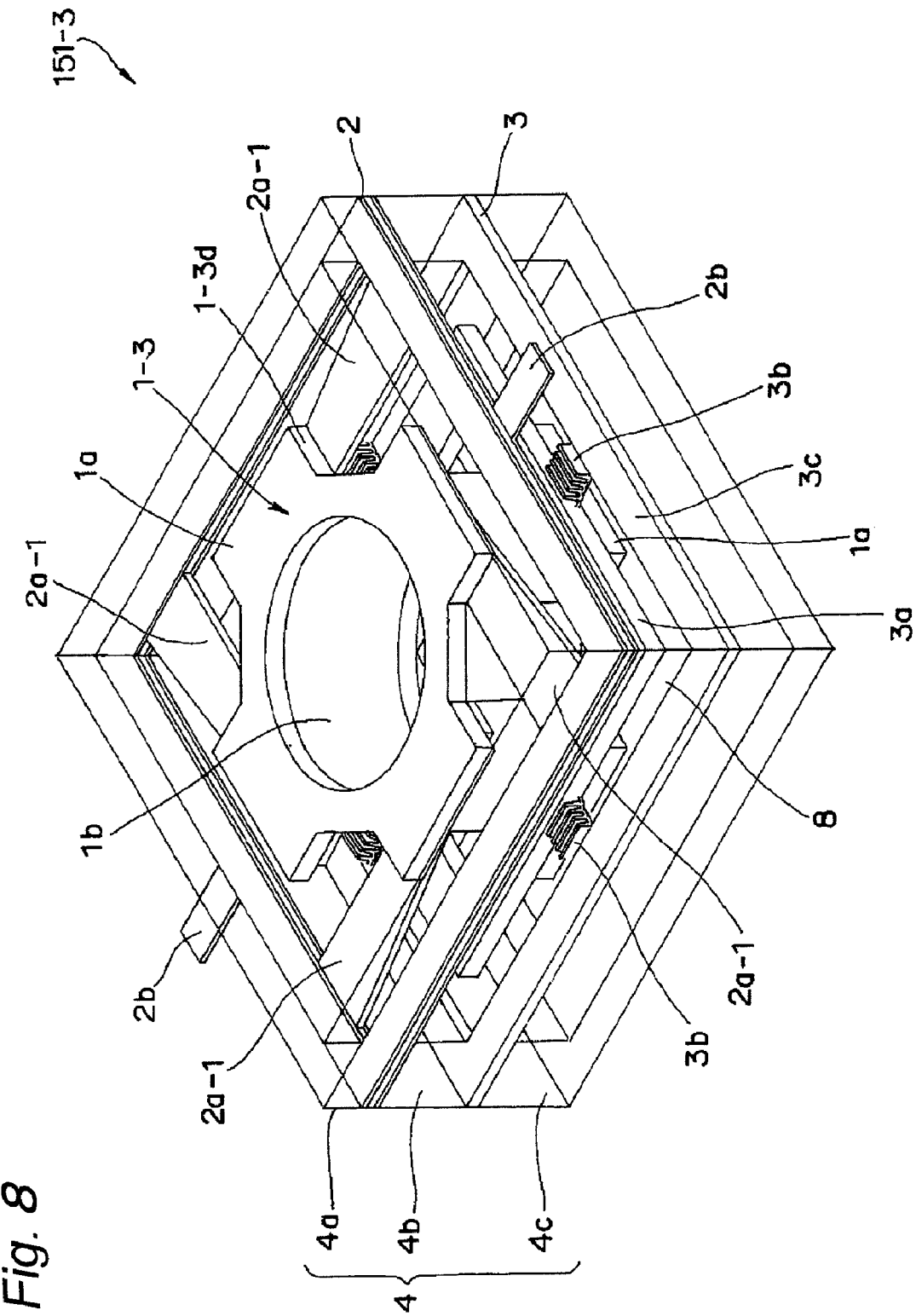
FIG. 8 is a perspective view of the lens holder driving device employing the planary-driven actuator according to the first embodiment of the present invention, in a state where the lens holder in FIG. 5C is applied thereto, an image pickup device is incorporated therein, and the lens holder driving device is viewed only through the fixing frame member.
Figure 50:
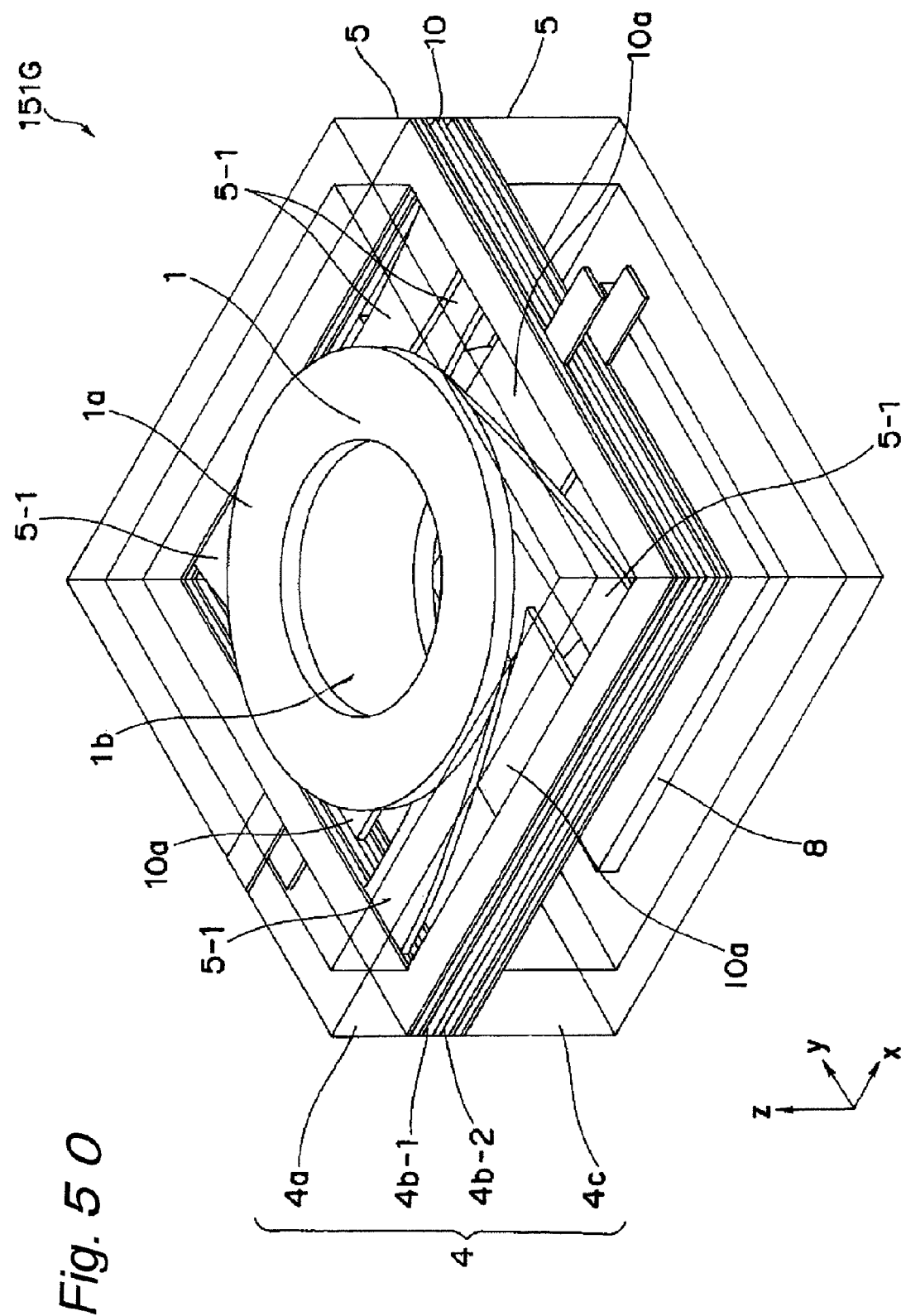
FIG. 50 is a perspective view of a lens holder driving device employing planary-driven actuators which are conductive polymer actuators in a state of incorporating an image pickup device therein and being viewed only through a fixing frame member, according to a seventh embodiment of the present invention.

FIG. 8 is a perspective view of a lens holder driving device 151-3 incorporating the lens holder 1-3 in FIG. 50 according to another example of modification of the first embodiment. The lens holder driving device 151-3 is structured to include the lens holder 1-3 in FIG. 5B, the planary-driven actuator 2, the lens-holder retaining plate 3, and the fixing frame member 4. The planary-driven actuator 2 includes driving arm portions 2a-1 having free-end side contact portions 2a-3 and lens holder support points 2a-2 which come into contact with the outer surface of the cylindrical body portion 1b of the lens holder 1-3 at a plurality of opposing positions (for example, a plurality of positions symmetrical about a point, and more specifically, four positions at 90-degrees intervals) for holding the lens holder 1-3. The lens-holder retaining plate 3 has spring-characteristic portions 3b and the like. The fixing frame member 4 has an upper fixing frame 4a, a middle fixing frame 4b, and a lower fixing frame 4c which form the outer surfaces of the lens holder driving device 151-3 and fixes the respective components.

With this structure, there is provided the advantage of reduction in the weight of the entire lens holder driving device 151-3 according to the above example of modification, and also there is provided the advantage of an increase of the ranges within which the driving arm portions 2a-1 of the planary-driven actuator 2 are movable, thereby increasing the amount of movement of the lens holder 1-3 along the optical axis. Further, even when the lens holder 1-3 tries to rotate in a plane intersecting with the direction of the optical axis within the fixing frame member 4 due to variations of the timings of driving the driving arm portions 2a-1, the lens holder 1-3 is restricted in rotation by contacting with the fixing frame member 4, since the lens holder 1-3 has the rectangular shape. As a result, there is provided the advantage that the lens holder 1-3 is allowed to move only along the optical axis.

Figure 10A:
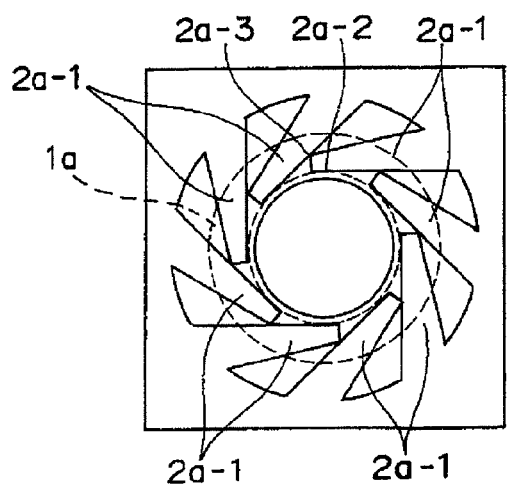
FIG. 10A is a plan view illustrating another shape of a planary-driven actuator having eight driving arm portions, as an example of modification of the planary-driven actuator in the lens holder driving device according to the first embodiment of the present invention.
Figure 10B:
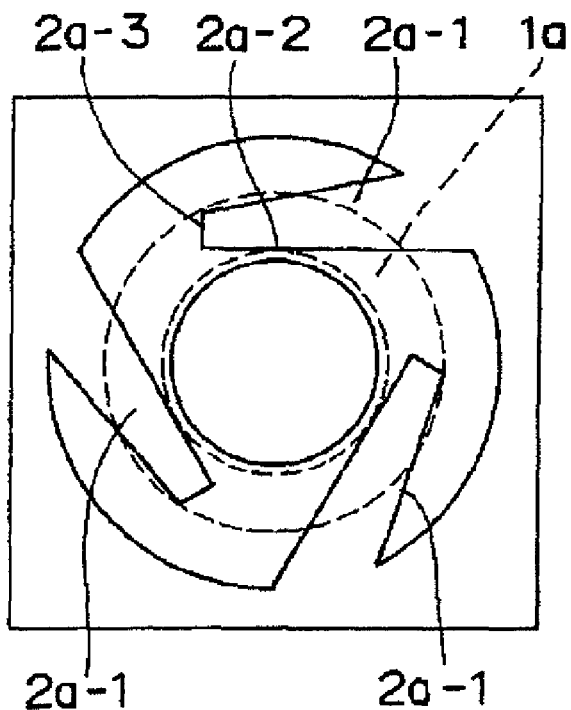
FIG. 10B is a plan view of a planary-driven actuator having three driving arm portions, as an example of modification of the planary-driven actuator in the lens holder driving device according to the first embodiment of the present invention.
Figure 10C:
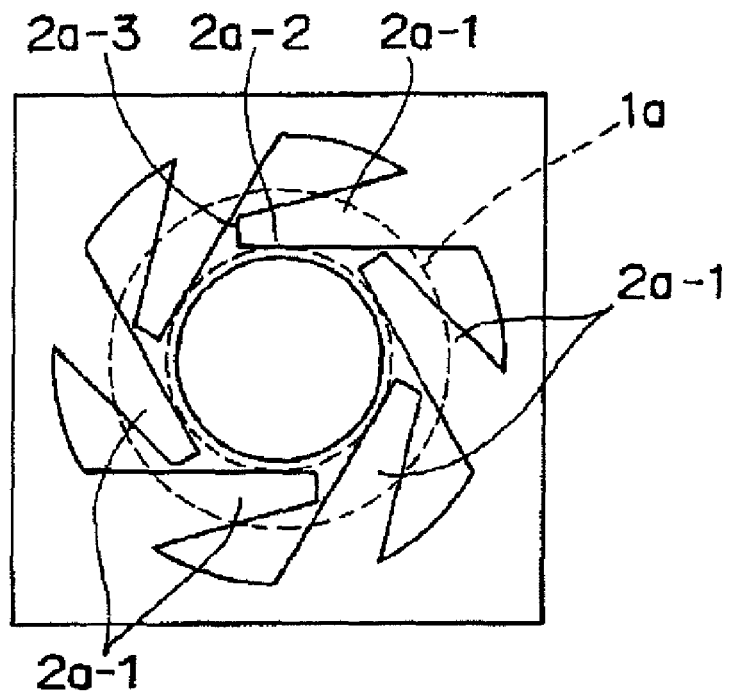
FIG. 10C is a plan view of a planary-driven actuator having six driving arm portions, as an example of modification of the planary-driven actuator in the lens holder driving device according to the first embodiment of the present invention.

Further, the number of the plurality of driving arm portions 2a-1 of the actuator main body 2a is not limited to four shown in FIG. 9. For example, as partially illustrated in FIGS. 10A to 10C, it is necessary only that each of the plurality of driving arm portions 2a-1 has a lens holder support point 2a-2 and a free-end side contact portion 2a-3, each lens holder support point 2a-2 is placed at a position to contact with the outer surface of the cylindrical body portion 1b of the lens holder 1, and each free-end side contact portion 2a-3 is placed so as to contact with the flange portions 1a of the lens holder 1. For example, there are provided eight driving arm portions 2a-1 in FIG. 10A, there are provided three driving arm portions 2a-1 in FIG. 10B, and there are provided six driving arm portions 2a-1 in FIG. 10C.

The material for the film-type actuator main body 2a is not limited provided that the material is capable of changing the shape of the actuator main body 2a itself so as to be bent in response to the applied voltage from the power supply 6. For example, it is possible to employ an ion-exchange resin material as the material for the film of the actuator main body 2a. Such an ion-exchange resin material has a property of moving positive ions within the film toward a cathode to induce unevenness of the degree of swell of the ion-exchange resin film and thus induce bending and displacement thereof when the film is impregnated with an ionic liquid and a voltage is applied to the film, and also has a property of inducing bending and displacement thereof in the opposite direction when the polarity of the applied voltage is reversed.

Figure 11A:
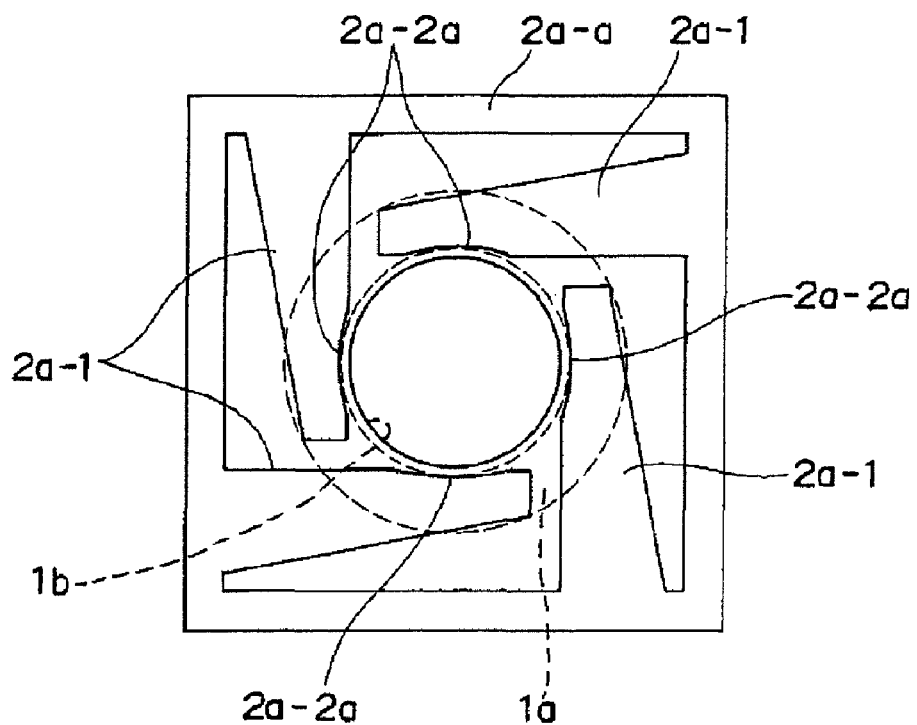
FIG. 11A is a plan view illustrating an example of modification of the driving arm portions of the planary-driven actuator in the lens holder driving device according to the first embodiment of the present invention.
Figure 11B:
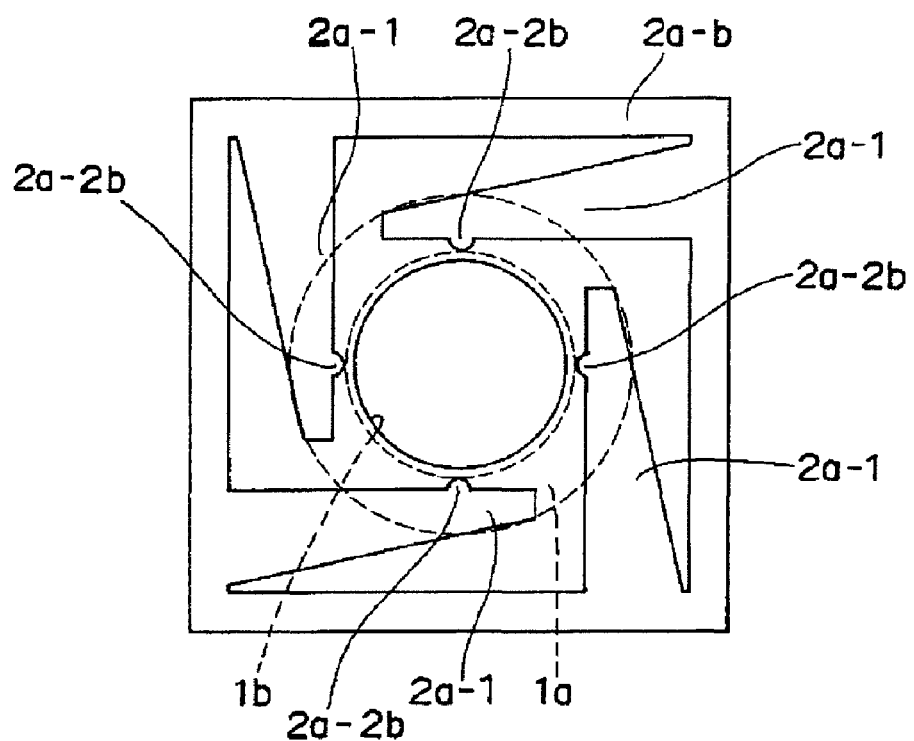
FIG. 11B is a plan view illustrating an example of modification of the driving arm portions of the planary-driven actuator in the lens holder driving device according to the first embodiment of the present invention.

FIG. 11A and FIG. 11B illustrate various examples of modifications of the shape of the actuator main body 2a.

FIG. 11A illustrates an actuator main body 2a-a having curved surface shapes with a certain curvature, in other words, curved concave portions, which are formed at the lens holder support points 2a-2a of the driving arm portions 2a-1. Accordingly, the lens holder support points 2a-2a having the curved concave portions increase the force for restraining the outer surface of the cylindrical body portion 1b of the lens holder 1. However, the curved concave portions at the lens holder support points 2a-2a are required to have a curvature which does not obstruct movement of the lens holder 1 along the optical axis, when the driving arm portions 2a-1 are bent. In this case, in order to prevent movement thereof from being obstructed, it is preferable that the curved concave portions at the lens holder support points 2a-2a have at least a curvature larger than the curvature of the cylindrical body portion 1b of the lens holder 1.

Further, FIG. 11B illustrates an actuator main body 2a-b which is shaped to have curved protrusions at the lens holder support points 2a-2b of the driving arm portions 2a-1, in order to bring the lens holder support points 2a-2b having the protrusion shapes into a point-to-point contact with the outer surface of the cylindrical body portion 1b of the lens holder 1, thereby reducing the contact resistance between the lens holder 1 and the driving arm portions 2a-1. Further, it is necessary to determine the shape of the protrusion portions in the actuator main body 2a-b, such that the lens holder support points 2a-2 surely hold the lens holder 1 at symmetrical positions in a plane intersecting with the direction of the optical axis, when the respective driving arm portions 2a-1 are bent substantially at the same time.

Figure 13:
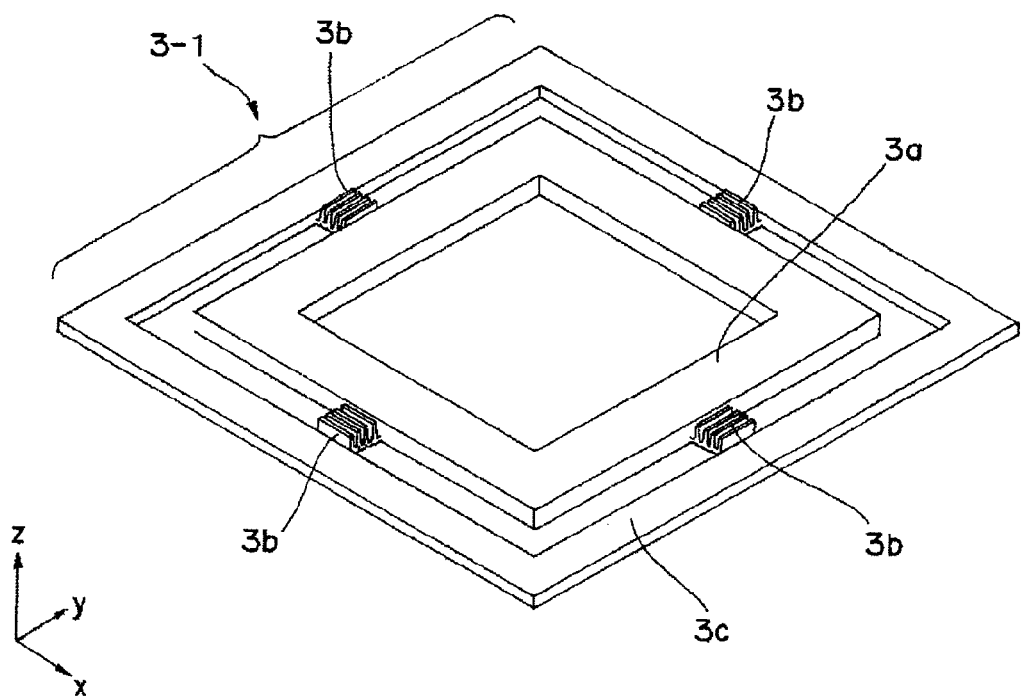
FIG. 13 is a perspective view of an example of modification of the lens-holder retaining plate having the spring-characteristic portions, in the lens holder driving device according to the first embodiment of the present invention.

Further, FIG. 13 illustrates a perspective view of an example, of modification of the lens-holder retaining plate 3 having the spring-characteristic portions 3b. The lens-holder retaining plate 3-1 is also constituted by a retaining portion 3a with a rectangular-frame shape capable of holding the outer surface of the cylindrical body portion 1b of the lens holder, spring-characteristic portions 3b, and a bonding portion 3c with a rectangular-frame shape which is secured to a fixing frame member 4, similarly to the lens-holder retaining plate 3. The lens-holder retaining plate 3-1 can be preferably used in cases where the lens holder 1 has a rectangular outer shape (for example, the lens holder 1-2 or 1-3 in FIG. 5B or FIG. 5C). Exemplary sizes thereof are similar to those of the lens-holder retaining plate 3.

Figure 14:
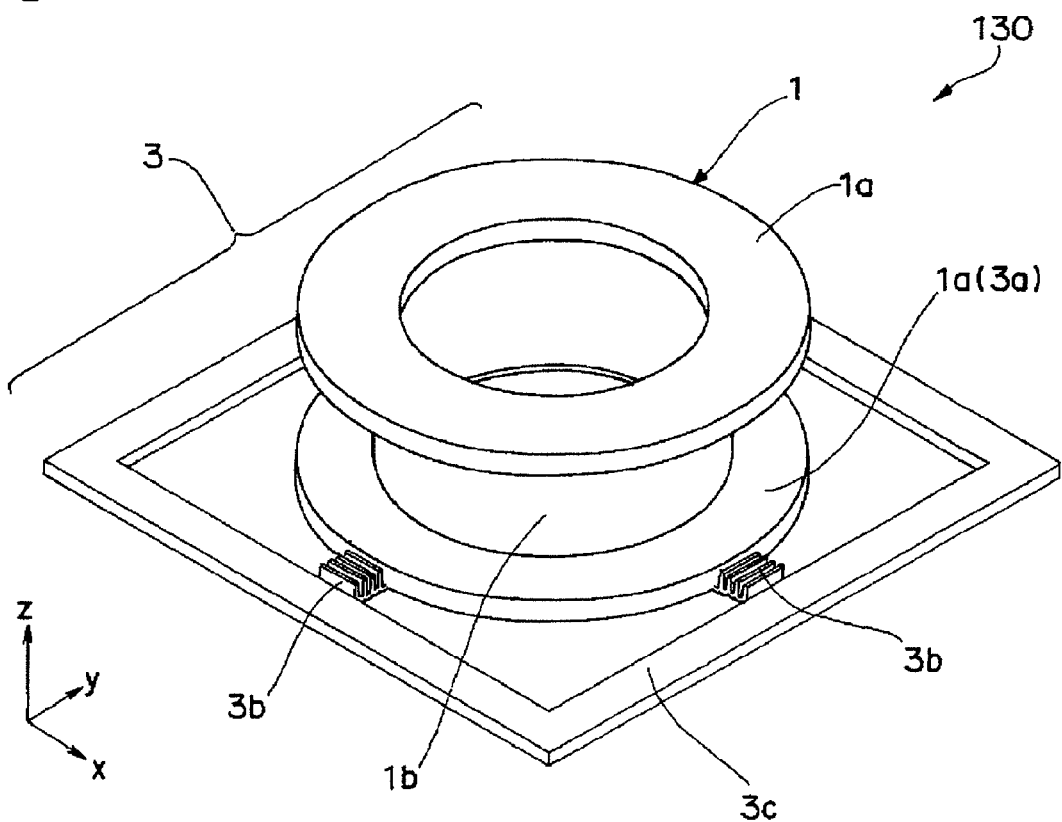
FIG. 14 is a perspective view of an integrated component member formed by integrating the lens holder and the lens-holder fixing plate in the lens holder driving device according to the first embodiment of the present invention.

Further, FIG. 14 is a perspective view of an integral component member formed by integrating a lens holder 1 and a lens-holder retaining plate 3 with each other as an integrated single component, rather than separated components. Any one of the flange portions 1a (for example, the lower flange portion 1a in FIG. 14) of the lens holder 1 serves as the retaining portion 3a, which enables forming, through resin molding or the like, an integrated component member 130 with an integrated configuration which forms the lens holder 1 and the lens-holder retaining plate 3. By using such an integrated configuration, it is possible to reduce the number of members, thereby reducing the weight of the entire lens holder driving device 151.

Figure 15A:
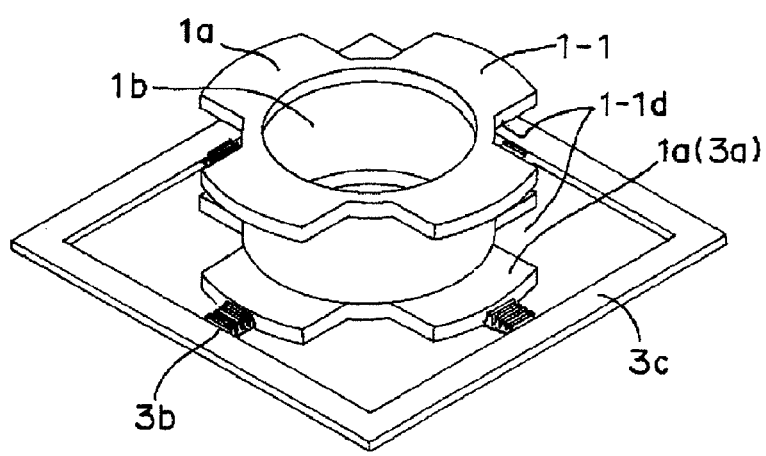
FIG. 15A is a perspective view of an example of modification of an integrated component member formed by integrating the lens holder in FIG. 5A and the lens-holder retaining plate, in the lens holder driving device according to the first embodiment of the present invention.
Figure 15B:
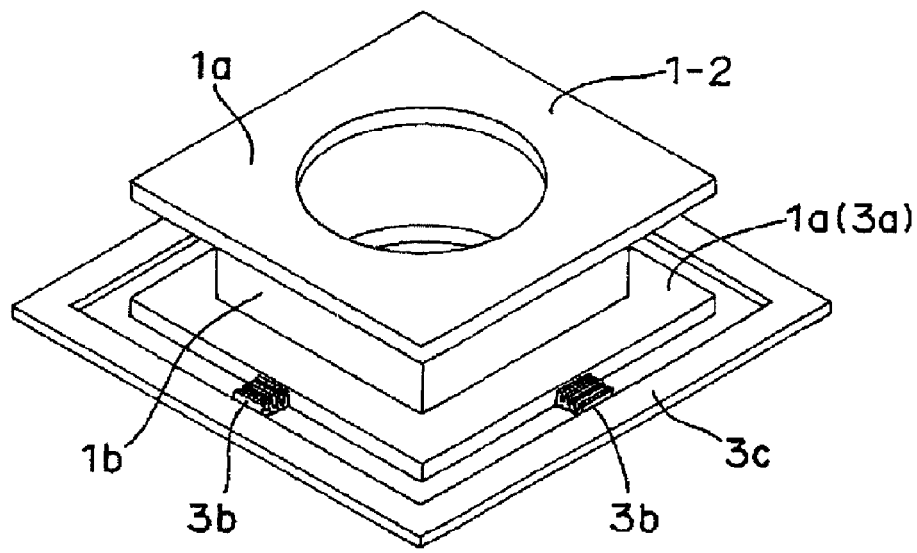
FIG. 15B is a perspective view of an example of modification of an integrated component member formed by integrating the lens holder in FIG. 5B and the lens-holder retaining plate, in the lens holder driving device according to the first embodiment of the present invention.
Figure 15C:
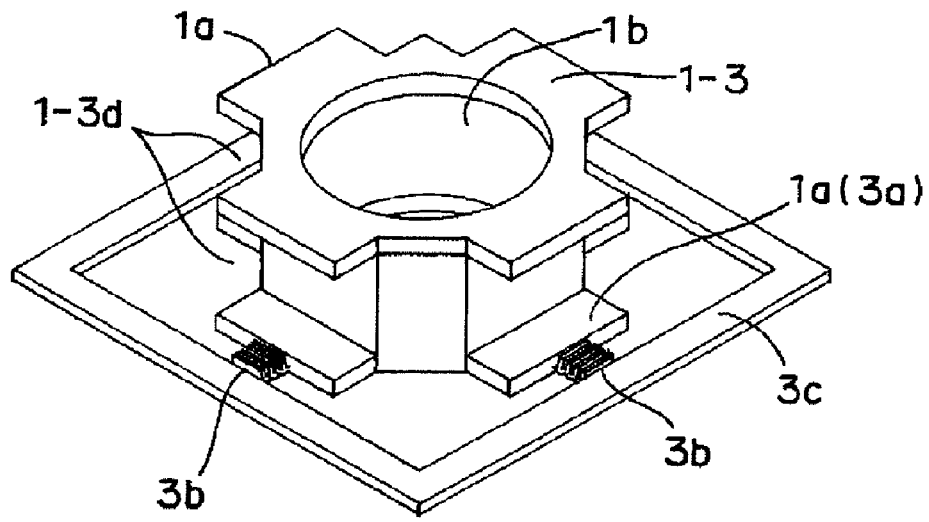
FIG. 15C is a perspective view of an example of Modification of an integrated component member formed by integrating the lens holder in FIG. 5C and the lens-holder retaining plate, in the lens holder driving device according to the first embodiment of the present invention.

Further, FIGS. 15A to 15C illustrate various examples of modifications of the integral component member 130. FIG. 15A illustrates a case where the lens holder 1-1 in FIG. 5A and the lens-holder retaining plate 3 are formed integrally with each other. FIG. 15B illustrates a case where the lens holder 1-2 in FIG. 5B and the lens-holder retaining plate 3 are formed integrally with each other. FIG. 15C illustrates a case where the lens holder 1-3 in FIG. 5C and the lens-holder retaining plate 3 are formed integrally with each other. As described above, the lens holder 1 and the lens-holder retaining plate 3 having the spring-characteristic portions 3b can be formed to have an integrated configuration, regardless of the shape of the lens holder 1.

Figure 16:
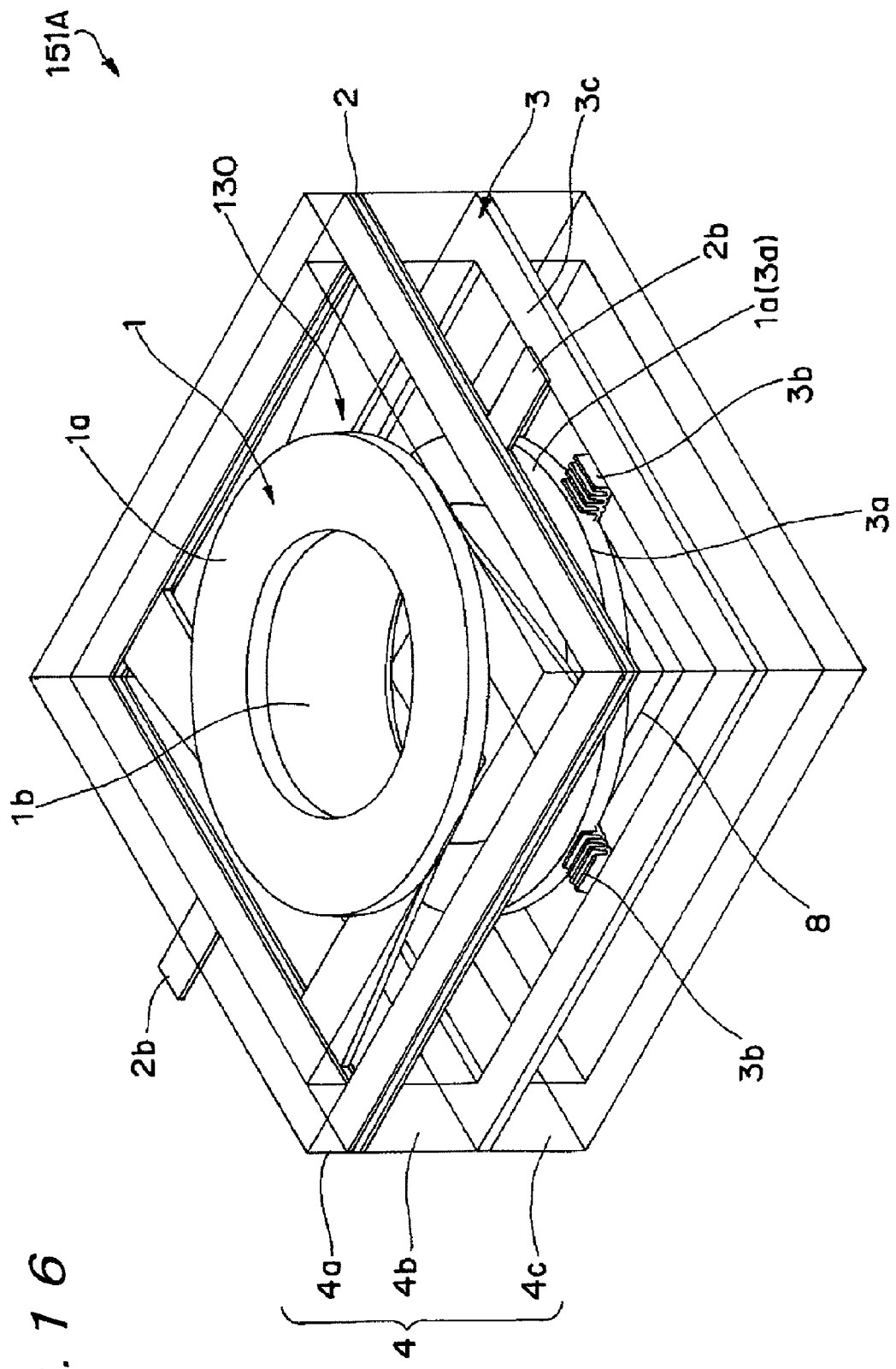
FIG. 16 is a perspective view of the lens holder driving device employing the planary-driven actuator according to the first embodiment of the present invention, in a state where an integrated component formed by integrating the lens holder and the lens-holder retaining plate with each other is applied thereto, an image pickup device is incorporated therein, and the lens holder driving device is viewed only through the fixing frame member.

Further, FIG. 16 is a perspective view of an image pickup unit formed by incorporating an image pickup device 8 into a lens holder driving device 151A, wherein the lens holder driving device 151A is formed by assembling the integral component member 130 constituted by the lens holder 1 and the lens-holder retaining plate 3 integrated with each other, the planary-driven actuator 2, and a fixing frame member 4.

Figure 17:
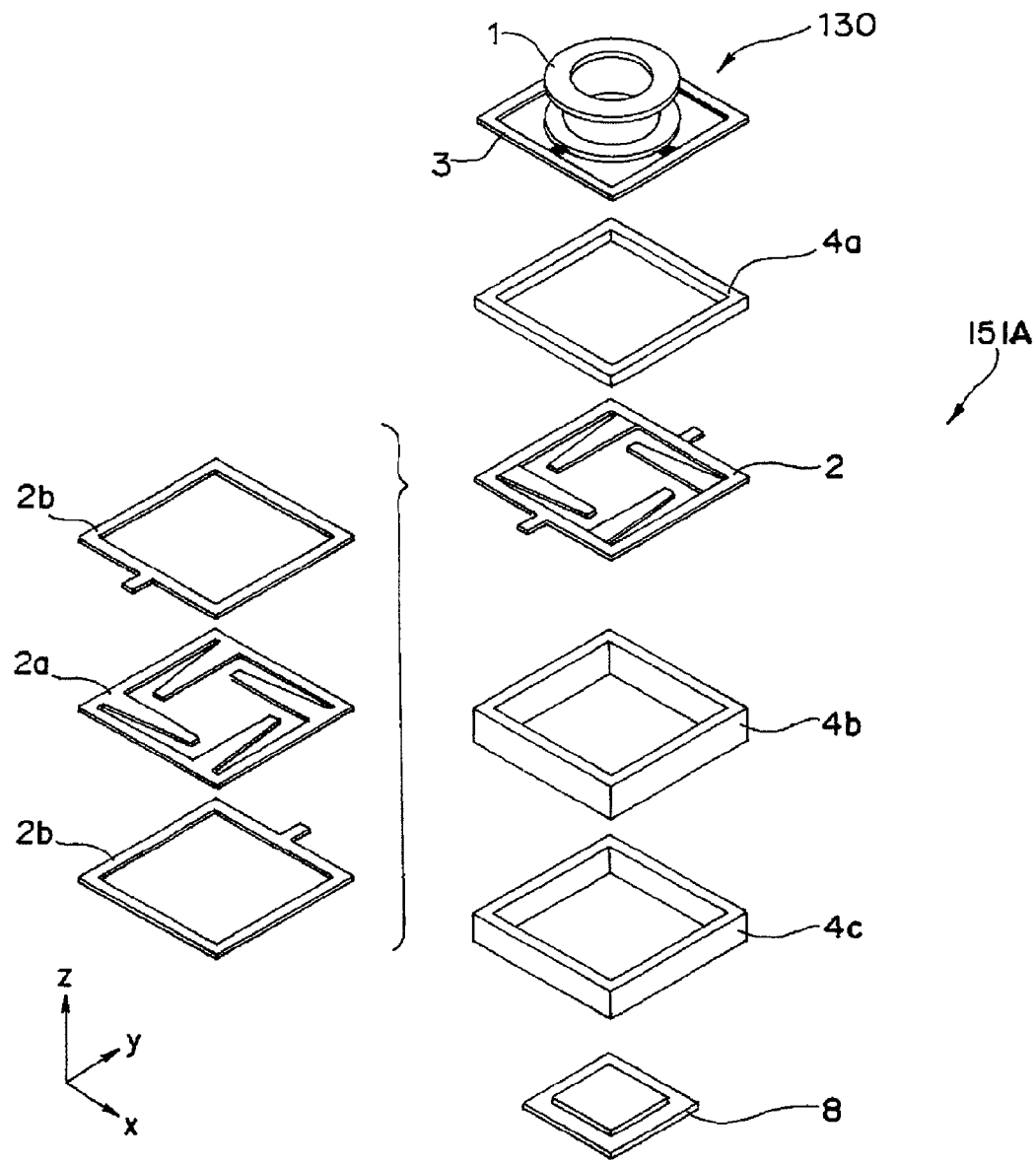
FIG. 17 is an exploded perspective view of the components the lens holder driving device employing the planary-driven actuator in FIG. 16 according to the first embodiment of the present invention, in a state where an integrated component formed by integrating the lens holder and the lens-holder retaining plate with each other is applied thereto, and an image pickup device is incorporated therein.

Further, FIG. 17 illustrates an exploded perspective view of the components of the lens holder driving device 151A employing the planary-driven conductive actuator according to the first embodiment of FIG. 16.

With this structure, it is possible to provide the advantage of reduction in the number of members, and along therewith, reduction in the weight of the entire lens holder driving device.

Second Embodiment

Figure 20:
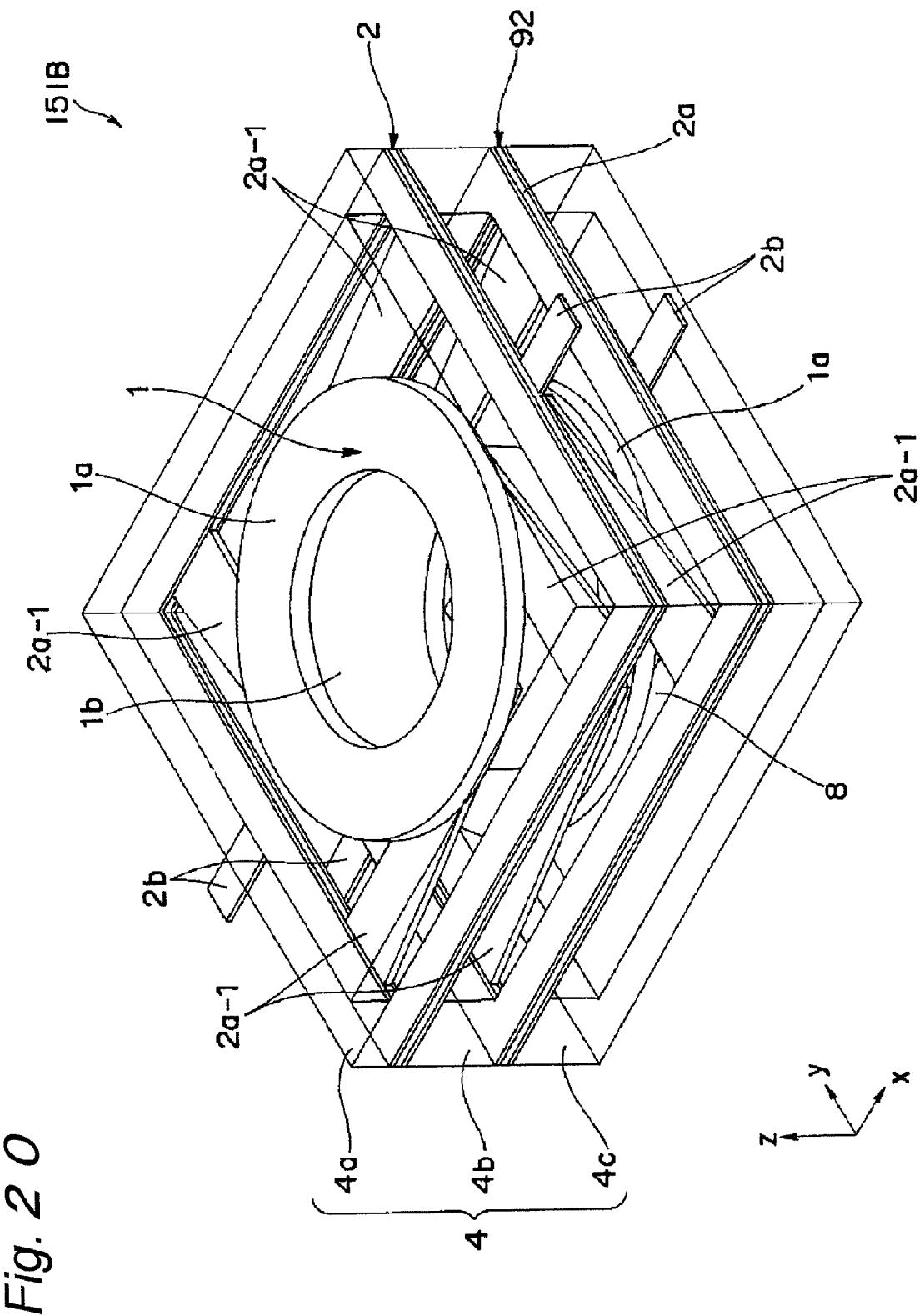
FIG. 20 is a perspective view of a lens holder driving device employing planary-driven actuators according to a second embodiment of the present invention in a state of incorporating an image pickup device therein and being viewed only through a fixing frame member.
Figure 21A:
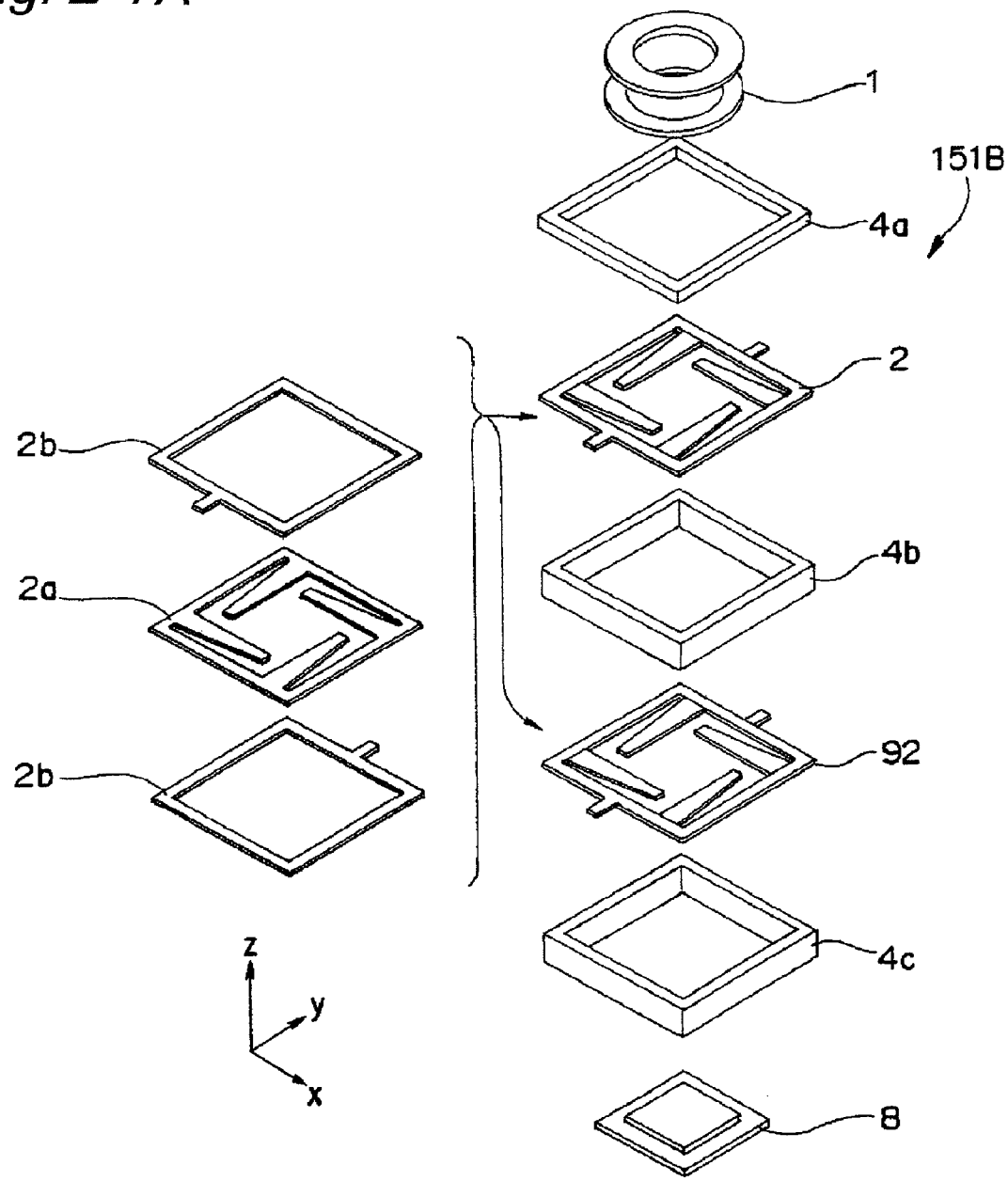
FIG. 21A is an exploded perspective view of the components of the above lens holder driving device employing the planary-driven conductive actuators in FIG. 20 according to the second embodiment of the present invention, in a state where an image pickup device is incorporated therein.
Figure 21B:
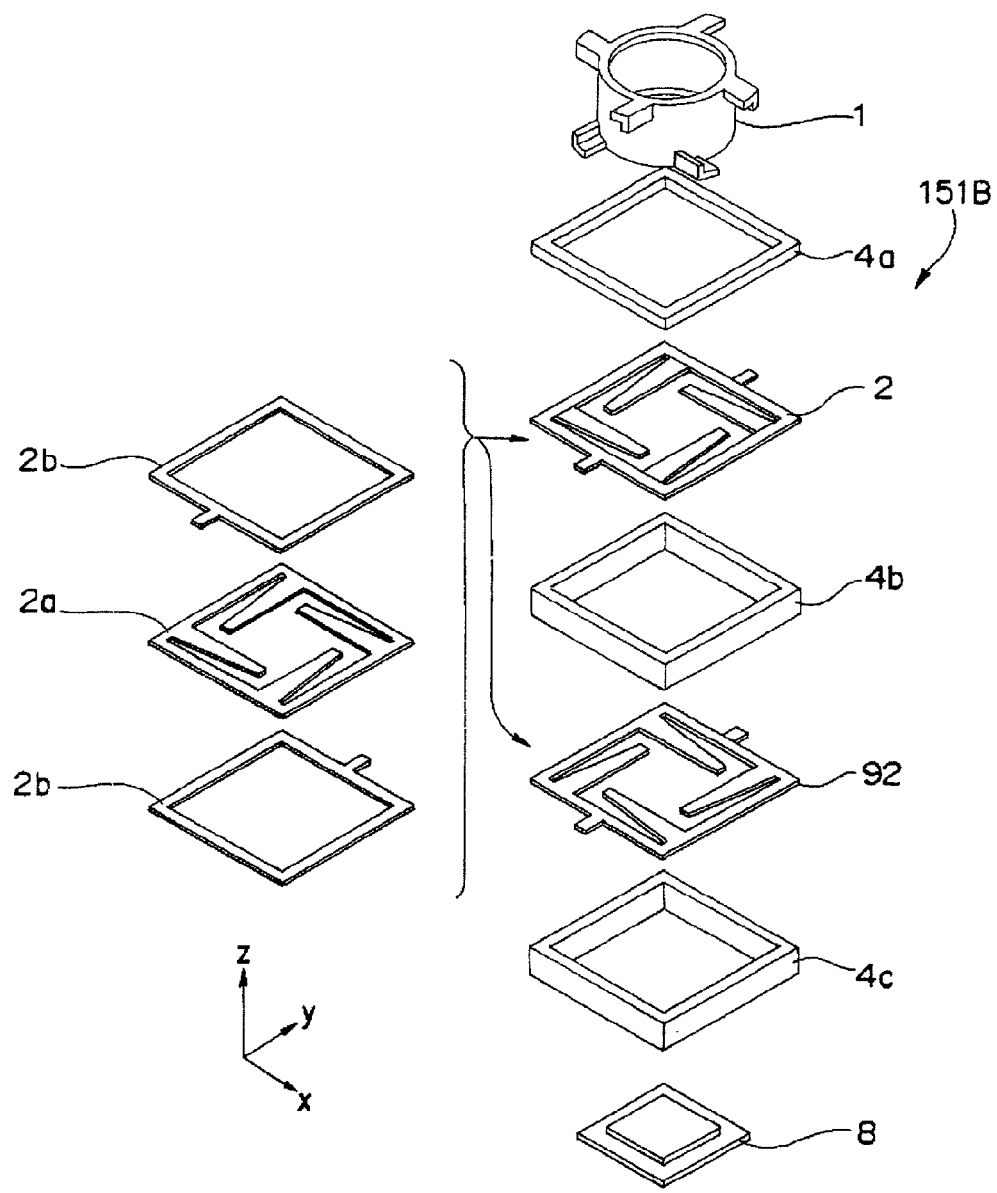
FIG. 21B is an exploded perspective view of the components of the lens holder driving device employing the planary-driven conductive actuators according to the second embodiment of the present invention in FIG. 20, in a state where the lens holder 1-4 illustrated in FIG. 5D is employed therein.

FIG. 20, FIG. 21A and FIG. 21B illustrate a perspective view of a lens holder driving device 151B employing planary-driven actuators according to the second embodiment of the present invention, and exploded perspective views of the components thereof. The lens holder driving device 151B illustrated in FIG. 20 is adapted such that another planary-driven actuator, or a second planary-driven actuator 92 having the same structure and functions as those of the planary-driven actuator 2, is placed as another example of the lens-holder restoration member with a thin plate shape, instead of the lens-holder retaining plate 3, in the lens holder driving device 151 according to the first embodiment. Accordingly, according to the second embodiment, the two planary-driven actuators, which are the upper planary-driven actuator 2 placed similarly to in the first embodiment (hereinafter, referred to as a first planary-driven actuator 2) and the second planary-driven actuator 92 placed at the position of the lens-holder retaining plate 3, are placed in parallel to each other. With this structure, the first and second planary-driven actuators 2 and 92 move the lens holder 1 forwardly and rearwardly along the z axis in cooperation with each other.

Further, the same components and the same portions as those of the first embodiment, out of the respective components and portions of the second embodiment, will be designated by the same reference characters as those of the first embodiment and will not be described.

In this case, the actuator main body 2a and the extraction electrodes 2b in the second planary-driven actuator 92 have the same structures and the same functions as those of the actuator main body 2a and the extraction electrodes 2b in the planary-driven actuators 2 described in the first embodiment. Namely, the actuator main body 2a in the second planary-driven actuator 92 also has the same structure and the same functions as those of the actuator main body 2a in the planary-driven actuator 2 and includes a rectangular frame portion 2a-0 and lens-holder driving arm portions 2a-1 having free-end side contact portions 2a-3 and lens holder support points 2a-2. FIG. 21B is an exploded perspective view of components in the case of employing the lens holder 1-4 illustrated in FIG. 5D. By employing the planary-driven actuator 92 in a state of being reversed with respect to the planary-driven actuator 2, the corner portions 1a-2 of the inner protrusion portions 1a-1 of the flange portions 1a of the lens holder 1-4 are engaged with the respective free-end side contact portions 2a-3 in the second planary-driven actuator 92, thereby playing a role in preventing rotation of the lens holder 1-4.

By placing the first and second planary-driven actuators 2 and 92 in parallel with each other so as to come into contact with the upper and lower flange portions 1a of the lens holder 1, it is possible to restrict the initial position of the lens holder 1 along the optical axis. More specifically, the free-end side contact portions 2a-3 of the respective driving arm portions 2a-1 in the first planary-driven actuator 2 are contacted with the lower surface of the upper flange portion 1a of the lens holder 1 without being coupled and secured thereto. Further, the free-end side contact portions 2a-3 of the respective driving arm portions 2a-1 in the second planary-driven actuator 92 are contacted with the upper surface of the lower flange portion 1a of the lens holder 1 without being coupled and secured thereto. Through the lens holder support points 2a-2 of the respective driving arm portions 2a-1 in the first and second planary-driven actuators 2 and 92, the outer surface of the cylindrical body portion 1b of the lens holder 1 is restrained in a plane intersecting with the direction of the optical axis. Further, the respective actuator main bodies 2a of the first and second planary-driven actuators 2 and 92 are bent and displaced at their respective driving arm portions 2a-1 substantially at the same time, along the optical axis, in response to the voltages applied thereto through the extraction electrodes 2b from the power supply 6 according to the direction of application of the voltages from the power supply 6. Further, the free-end side contact portions 2a-3 of the respective driving arm portions 2a-1 in one of the first and second planary-driven actuators 2 and 92 move the lens holder 1 along the optical axis, while contacting with the upper flange portion 1a or the lower flange portion 1a of the lens holder 1. The first and second planary-driven actuators 2 and 92 have the characteristics described above.

An example of the sizes of the respective components are the same as those of the first embodiment, but an example of the sizes of only the fixing frame member 4 are different. Accordingly, the upper fixing frame 4a, the middle fixing frame 4b, and the lower fixing frame 4c are sized such that, for example, their thicknesses are 1 mm, 2.6 mm, and 2.35 mm in the mentioned order, and in the case where their square outer shape has a size of 14 mm at each single side, and their portions sandwiched between the two electrodes 2b are the portions with a width of 1 mm from their outer shape, the square inner edges of their portions other than the driving arm portions 2a-1 have a size of 12 mm at each single side.

Figure 22:
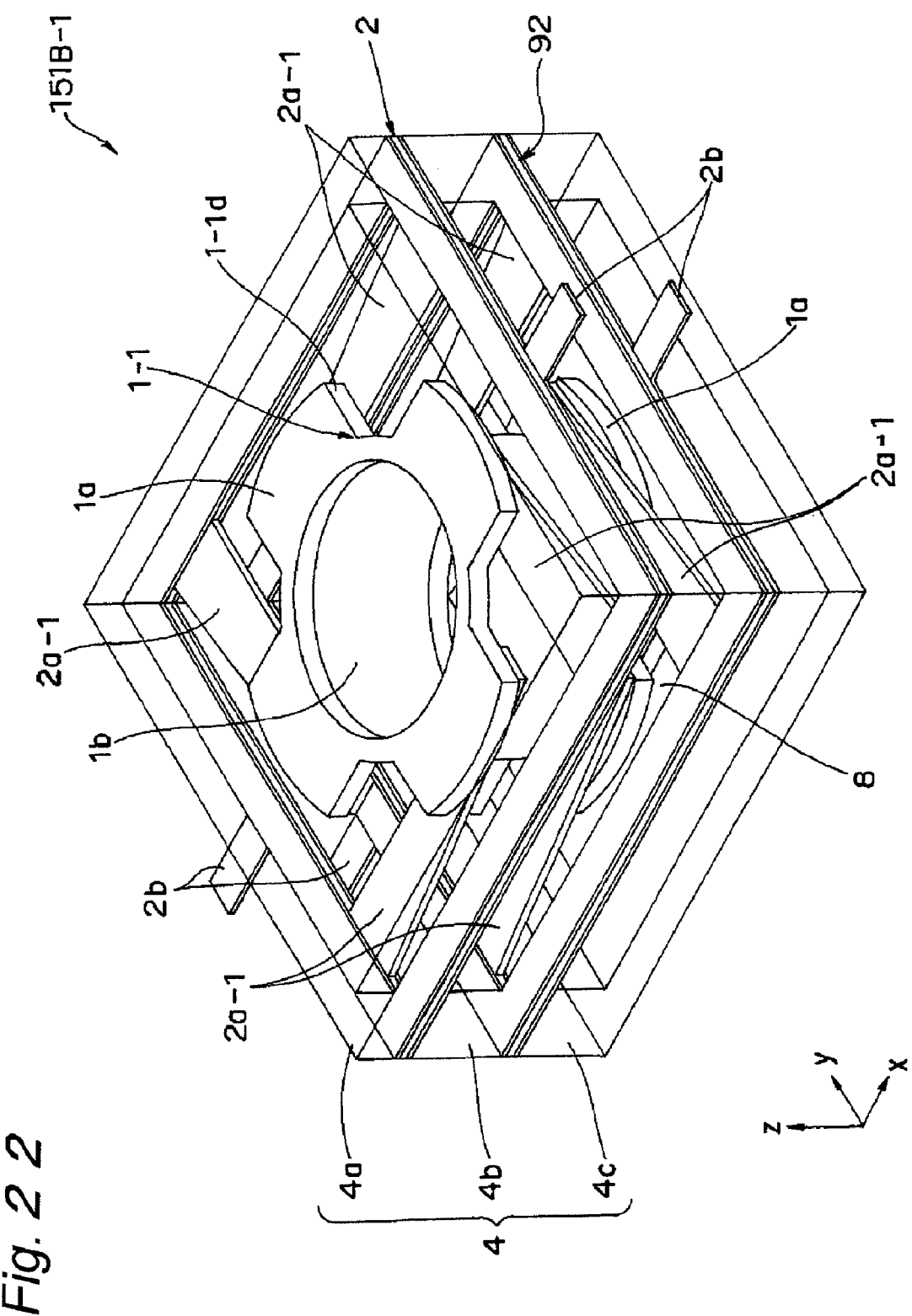
FIG. 22 is a perspective view of the lens holder driving device employing the planary-driven actuators according to the second embodiment of the present invention, in a state where the lens holder in FIG. 5A is applied thereto, an image pickup device is incorporated therein, and the lens holder driving device is viewed only through the fixing frame member.

FIG. 22 is a perspective view of a lens holder driving device 151B-1 incorporating the lens holder 1-1 in FIG. 5A according to an example of modification of the second embodiment.

With this structure employing the lens holder 1-1, the respective driving arm portions 2a-1 of the first and second planary-driven actuators 2 and 92 are not coupled and secured to the flange portions 1a of the lens holder 1. Accordingly, when the respective driving arm portions 2a-1 of the first and second planary-driven actuators 2 and 92 are bent, it is possible to reduce the interference thereof with the flange portions 1a of the lens holder 1. Further, there is provided the advantage of an increase of the ranges within which the respective driving arm portions 2a-1 of the first and second planary-driven actuators 2 and 92 are movable.

Figure 23:
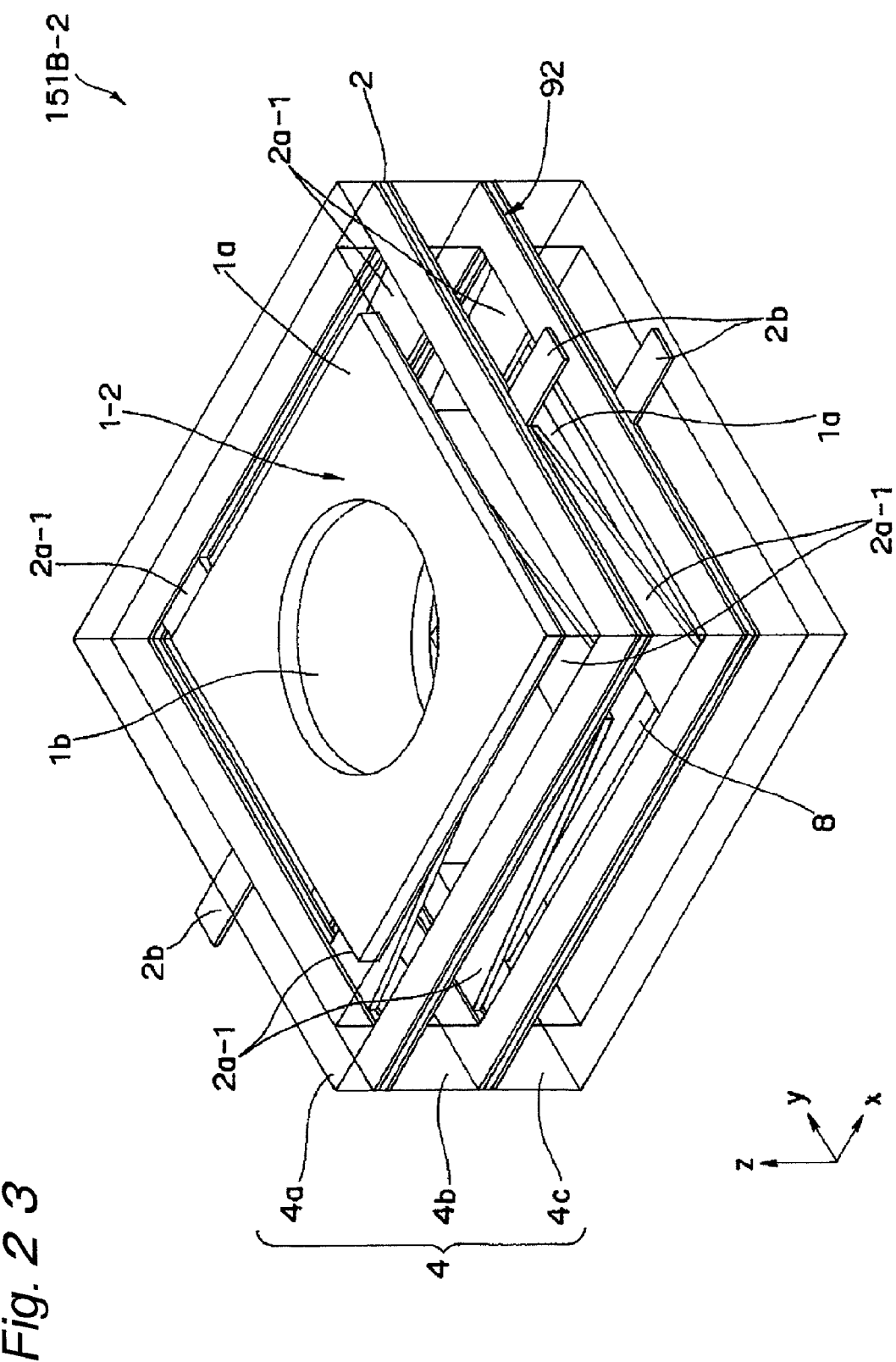
FIG. 23 is a perspective view of the lens holder driving device employing the planary-driven actuators according to the second embodiment of the present invention, in a state where the lens holder in FIG. 5B is applied thereto, an image pickup device is incorporated therein, and the lens holder driving device is viewed only through the fixing frame member.

FIG. 23 is a perspective view of a lens holder driving device 151B-2 incorporating the lens holder 1-2 in FIG. 5B according to an example of modification of the second embodiment.

With this structure, there is provided the advantage that the lens holder 1-2 is allowed to move only along the optical axis, while being prevented from rotating in a plane intersecting with the direction of the optical axis.

Figure 24:
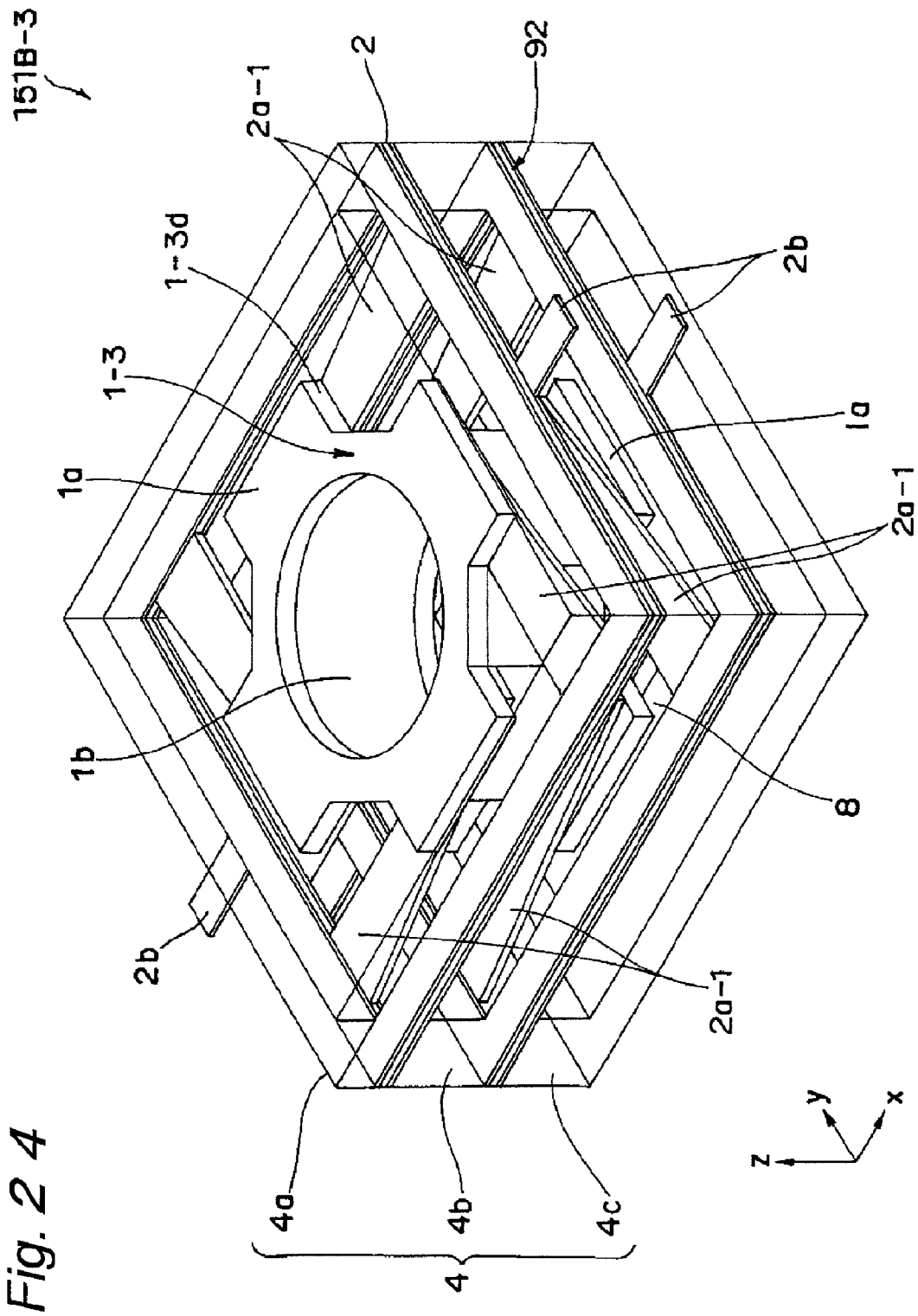
FIG. 24 is a perspective view of the lens holder driving device employing the planary-driven actuators according to the second embodiment of the present invention, in a state where the lens holder in FIG. 5C is applied thereto, an image pickup device is incorporated therein, and the lens holder driving device is viewed only through the fixing frame member.

FIG. 24 is a perspective view of a lens holder driving device 151B-3 incorporating the lens holder 1-3 in FIG. 5C according to an example of modification of the second embodiment.

With this structure, since this structure employs the lens holder 1-3, when the respective driving arm portions 2a-1 of the first and second planary-driven actuators 2 and 92 are bent, it is possible to reduce the interference thereof with the flange portions 1a of the lens holder 1. Further, there is provided the advantage of an increase of the ranges within which the respective driving arm portions 2a-1 of the first and second planary-driven actuators 2 and 92 are movable. Further, there is provided the advantage that the lens holder 1-3 is allowed to move only along the optical axis, while being prevented from rotating in a plane intersecting with the direction of the optical axis.

Figure 25:
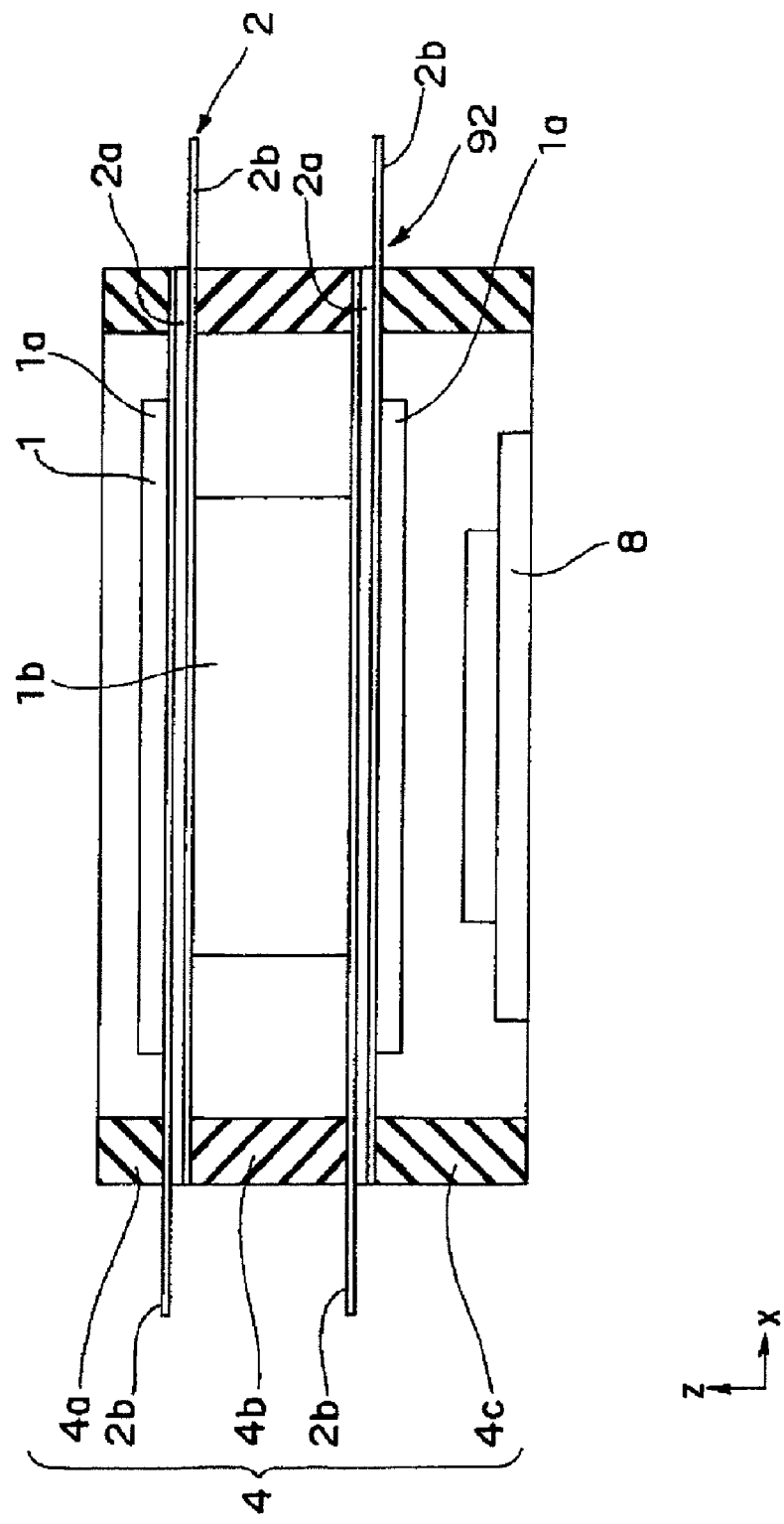
FIG. 25 is a partial cross-sectional side view of the lens holder driving device employing the planary-driven actuators according to the second embodiment of the present invention, in a state where an image pickup device is incorporated therein.

FIG. 25 illustrates a side view of a lens holder driving device 151B employing the above planary-driven actuators according to the second embodiment of the present invention (a cross sectional view of only the fixing frame member). In this case, as described above, the first and second planary-driven actuators 2 and 92 are placed in parallel with each other so as to come into contact with the upper and lower flange portions 1a of the lens holder 1, thereby restricting the initial position of the lens holder 1 along the optical axis. Namely, the lens holder 1 having the flange portions 1a is sandwiched between the first and second planary-driven actuators 2 and 92, and the respective components are bonded to one another through the upper fixing frame 4a, the middle fixing frame 4b, and the lower fixing frame 4c for realizing the lens holder driving device 151B. An image pickup device 8 can be incorporated in the lower portion of the lens holder driving device 151B within the fixing frame member 4 to form an image pickup unit. In this state, the free-end side contact portions 2a-3 of the respective driving arm portions 2a-1 of the first planary-driven actuator 2 are contacted with the lower surface of the upper flange portion 1a of the lens holder 1, and also the respective driving arm portions 2a-1 of the second planary-driven actuator 92 are contacted with the upper surface of the lower flange portion 1a of the lens holder 1, thereby restricting the position of the lens holder 1 along the optical axis. At the same time, through the lens holder support points 2a-2 of the respective driving arm portions 2a-1 of the first and second planary-driven actuators 2 and 92, the outer surface of the cylindrical body portion 1b of the lens holder 1 is restrained in a plane intersecting with the direction of the optical axis. Therefore, the lens holder 1 is kept in a looseness-free state.

Figure 26A:
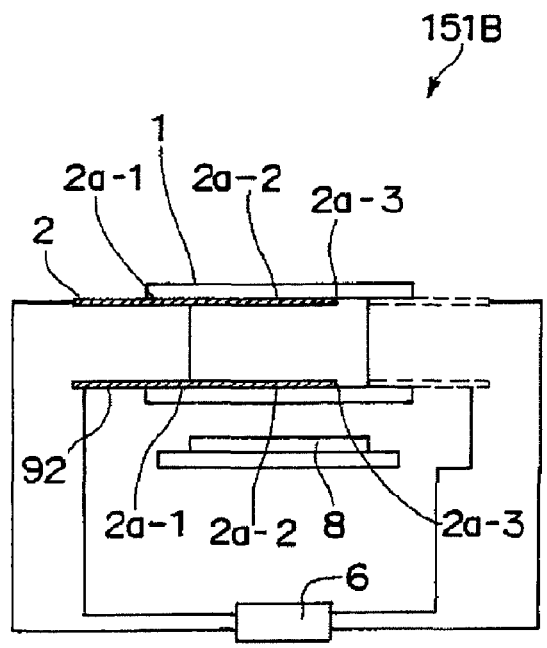
FIG. 26A is a side view schematically illustrating the lens holder driving device employing the planary-driven actuators in FIG. 25 according to the second embodiment of the present invention, with the position of an image pickup device being illustrated for the purpose of reference, and also illustrating a state where no voltage is applied from a power supply to the planary-driven actuators.
Figure 26B:
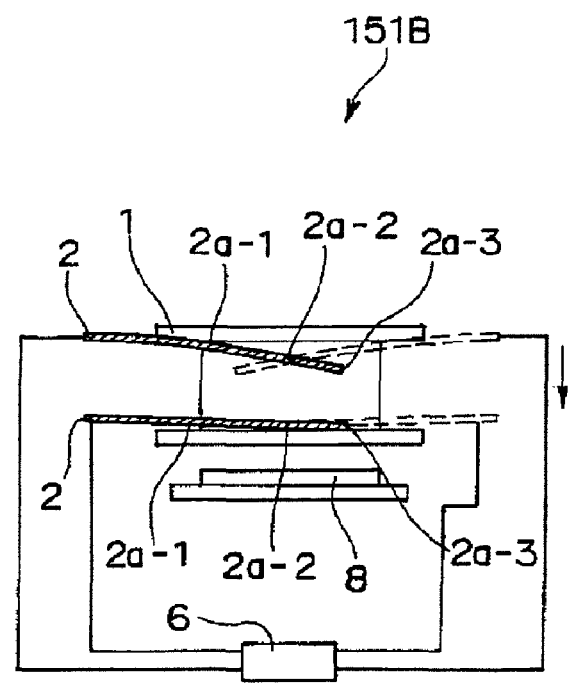
FIG. 26B is a side view schematically illustrating the lens holder driving device employing the planary-driven actuators in FIG. 25 according to the second embodiment of the present invention, with the position of the image pickup device being illustrated for the purpose of reference, and also illustrating a state where voltages are applied from the power supply to the planary-driven actuators, and thus the lens holder has been displaced along a −z axis.
Figure 26C:
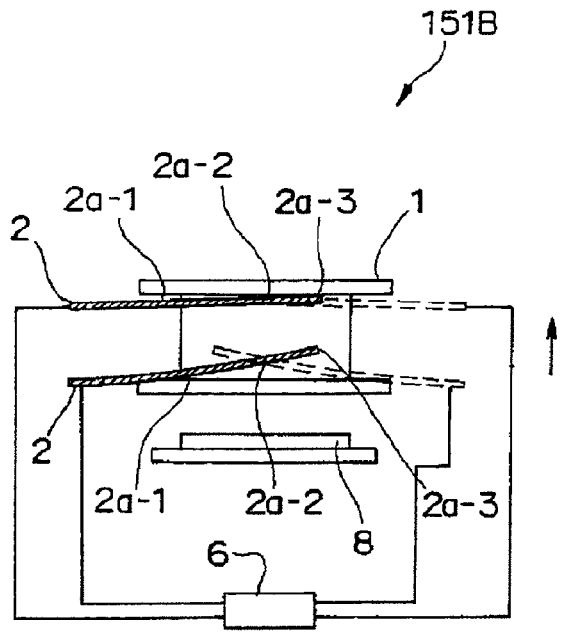
FIG. 26C is a side view schematically illustrating the lens holder driving device employing the planary-driven actuators in FIG. 25 according to the second embodiment of the present invention, with the position of the image pickup device being illustrated for the purpose of reference, and also illustrating a state where voltages are applied from the power supply to the planary-driven actuators, and thus the lens holder has been displaced along the +z axis.

FIG. 26A to FIG. 26C are side views schematically illustrating a method for driving the lens holder driving device 151B employing the above planary-driven actuators according to the second embodiment of the present invention.

FIG. 26A illustrates a state where no voltage is applied to the two planary-driven actuators 2 and 92 from a power supply 6, and thus the planary-driven actuators 2 and 92 are at the initial position. In this case, the lens holder 1 is restricted in position in a plane intersecting with the direction of the optical axis, by the lens holder support point 2a-2 of the respective driving arm portions 2a-1 of the plurality of or the first and second planary-driven actuators 2 and 92 placed in parallel with each other. Further, the lens holder 1 is restricted in its initial position along the optical axis, by the free-end side contact portions 2a-3 of the respective driving arm portions 2a-1 in the plurality of or the first and second planary-driven actuator 2 and 92 placed in parallel with each other. Accordingly, the lens holder 1 is kept in a state of being not fluctuated. In this case, the upper and lower flange portions 1a of the lens holder 1 are not coupled and secured to the free-end side contact portions 2a-3 in the first and second planary-driven actuators 2 and 92 which are placed in parallel with each other at the upper and lower portions. This enables utilizing to a maximum extent the bend and displacement of the respective driving arm portions 2a-1 of the first and second planary-driven actuators 2 and 92 for moving the lens holder 1 along the optical axis. This can increase the ranges within which the respective driving arm portions 2a-1 are movable, in comparison with cases where the respective free-end side contact portions 2a-3 in the first and second planary-driven actuators 2 and 92 are coupled and secured to the upper and lower flange portions 1a of the lens holder 1.

FIG. 26B illustrates a state where respective voltages are applied from the power supply 6 to the first and second planary-driven actuators 2 and 92 placed in parallel with each other at the upper and lower portions, and thus the lens holder 1 has been moved along the −z axis (along a downward arrow in FIG. 26B). Due to the applied voltage from the power supply 6, the free-end side contact portions 2a-3 of the respective driving arm portions 2a-1 in the second planary-driven actuator 92 placed at the lower portion in the drawing move the lens holder 1 along the −z axis while contacting with the upper surface of the lower flange portion 1a of the lens holder 1. In this case, the respective driving arm portions 2a-1 of the first planary-driven actuator 2 placed at the upper portion are required to be bent and displaced such that contact of their base-end side portions with the edge of the upper flange portion 1a of the lens holder 1 is a lower limit and also the contact thereof with the second planary-driven actuator 92 placed at the lower portion is an upper limit. Therefore, voltages having different values are applied from the power supply 6 to the first and second planary-driven actuators 2 and 92 placed at the upper and lower portions. Alternatively, the following is possible. Namely, a voltage can be applied from the power supply 6 only to the second planary-driven actuator 92 at the lower portion for causing the free-end side contact portions 2a-3 of the respective driving arm portions 2a-1 of the second planary-driven actuator 92 to push downwardly the lower flange portion 1a of the lens holder 1. On the other hand, the respective driving arm portions 2a-1 of the first planary-driven actuator 2 at the upper portion are forcibly bent so as to follow movement of the lens holder 1 along the −z axis, without applying a voltage from the power supply 6 to the first planary-driven actuator 2 at the upper portion. In this case, even in a state where the lens holder 1 has been displaced along the −z axis, the lens holder 1 is restricted in position in a plane intersecting with the direction of the optical axis by the lens holder support points 2a-2 of the respective driving arm portions 2a-1 of the plurality of or the first and second planary-driven actuators 2 and 92 which are placed in parallel with each other. When application of the voltages to the first and second planary-driven actuators 2 and 92 placed in parallel with each other is stopped, bending and displacement of the respective driving arm portions 2a-1 of the first and second planary-driven actuators 2 and 92 is eliminated, thereby causing the lens holder 1 to be displaced to the above initial position state (the state of the position in FIG. 26A) and to be kept at this position state.

FIG. 26C illustrates a state where respective voltages are applied from the power supply 6 to the first and second planary-driven actuators 2 and 92 placed in parallel with each other at the upper and lower portions, and thus the lens holder 1 has been moved along the +z axis (along an upward arrow in FIG. 26C). Due to the applied voltage from the power supply 6, the free-end side contact portions 2a-3 of the respective driving arm portions 2a-1 in the first planary-driven actuator 2 placed at the upper portion in the drawing move the lens holder 1 along the +z axis, while contacting with the bottom surface of the upper flange portion 1a of the lens holder 1. The respective driving arm portions 2a-1 of the second planary-driven actuator 92 placed at the lower portion are required to be bent and displaced such that contact of their base-end side portions with the edge of the lower flange portion 1a of the lens holder 1 is a lower limit and also the contact thereof with the first planary-driven actuator 2 placed at the upper portion is an upper limit. Therefore, voltages having different values are applied from the power supply 6 to the first and second planary-driven actuators 2 and 92 placed at the upper and lower portions. Alternatively, the following is possible. Namely, a voltage is applied from the power supply 6 only to the first planary-driven actuator 2 at the upper portion for causing the free-end side contact portions 2a-3 of the respective driving arm portions 2a-1 of the first planary-driven actuator 2 to push upwardly the upper flange portion 1a of the lens holder 1. On the other hand, the respective driving arm portions 2a-1 of the second planary-driven actuator 92 at the lower portion is forcibly bent so as to follow movement of the lens holder 1 along the +z axis, without applying a voltage from the power supply 6 to the second planary-driven actuator 92 at the lower portion. In this case, even in a state where the lens holder 1 has been displaced along the +z axis, the lens holder 1 is restricted in position in a plane intersecting with the direction of the optical axis by the lens holder support points 2a-2 of the respective driving arm portions 2a-1 of the plurality of or the first and second planary-driven actuators 2 and 92 placed in parallel with each other. When application of the voltages to the plurality of or the first and second planary-driven actuators 2 and 92 placed in parallel with each other is stopped, the bending and displacement of the respective driving arm portions 2a-1 of the first and second planary-driven actuators 2 and 92 is eliminated, thereby causing the lens holder 1 to be displaced to the above initial position state (the state of the position in FIG. 26A) and to be kept at this position state.

With the structure described above, the upper and lower flange portions 1a of the lens holder 1 are not coupled and secured to the free-end side contact portions 2a-3 of the first and second planary-driven actuators 2 and 92. This enables utilizing to a maximum extent the bend and displacement of the respective driving arm portions 2a-1 of the first and second planary-driven actuators 2 and 92 for moving the lens holder 1 along the optical axis, thereby increasing the amount of movement of the lens holder 1 along the optical axis. Further, the lens holder 1 is restricted in position in a plane intersecting with the direction of the optical axis, and also the plurality of planary-driven actuators 2 are placed in parallel with each other, through the shapes of the first and second planary-driven actuators 2 and 92. This realizes the lens holder driving device 151B capable of restricting movement of the lens holder 1 only along the optical axis, and also capable of increasing the amount of movement of the lens holder 1 along the optical axis.

Accordingly, in the second embodiment, since there are provided the two planary-driven actuators 2 and 92, it is possible to position the lens holder 1 at three positions, which are the initial position of the lens holder 1, a position displaced therefrom along the +z axis, and a position displaced therefrom along the −z axis, thereby further increasing the range within which the lens holder 1 is movable. Further, according to the second embodiment, there are also provided the following advantages. Namely, in comparison with the second embodiment, when the lens-holder retaining plate 3 according to the first embodiment is employed as an example of the lens-older restoration member, a restoration force is kept applied, when the planary-driven actuator 2 is driven to be displaced in the upward direction, since the lens-holder retaining plate 3 generates a constant spring force. Namely, when the planary-driven actuator 2 ascends the lens holder 1 in the upward direction, the spring force from the lens-holder retaining plate 3 can form a resistance component which reduces the amount of the upward movement thereof, for the planary-driven actuator 2 placed at the upper portion. However, in the case where the planary-driven actuator 92 is employed as the member which functions as an example of the lens-holder restoration member as employed in the second embodiment, when the lens holder 1 is moved upwardly along the optical axis, a voltage is applied to the planary-driven actuator 92 placed at the lower portion so as to be bent in the same direction as that of the planary-driven actuator 2 placed at the upper portion (in the upward direction along the optical axis). It is thus possible to control so as to prevent reduction in the amount of movement of the planary-driven actuator 2 placed at the upper portion. This applies to cases where the lens holder 1 is moved downwardly along the optical axis. Namely, by controlling the voltage applied to the planary-driven actuator 92, it is possible to realize a lens-holder restoration member capable of generating a variable spring force and a variable restoration force. Particularly, when the planary-driven actuator 2 generates non-large outputs, it may be difficult to displace the lens holder 1 to a desired position (upwardly along the optical axis) through simple restoration using a spring force. When the planary-driven actuator 2 generates large outputs, the structure according to the first embodiment is more simple and effective. However, it is also effective to employ the planary-driven actuator 92 as a lens-holder restoration member at a lower portion for reducing the resistance component against movement of the lens holder 1, as described above.

Third Embodiment

Figure 27A:
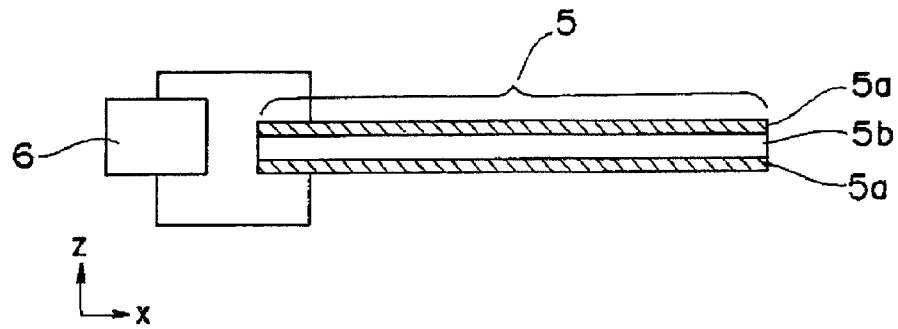
FIG. 27A is a cross-sectional view of a conductive polymer actuator in a state where no voltage is applied thereto, wherein the conductive polymer actuator is characterized in having a three-layer structure formed by sandwiching a separator impregnated with an ionic liquid between two conductive polymer films for bonding, as an example of a planary-driven actuator in a lens holder driving device employing planary-driven actuators according to a third embodiment of the present invention.
Figure 27B:
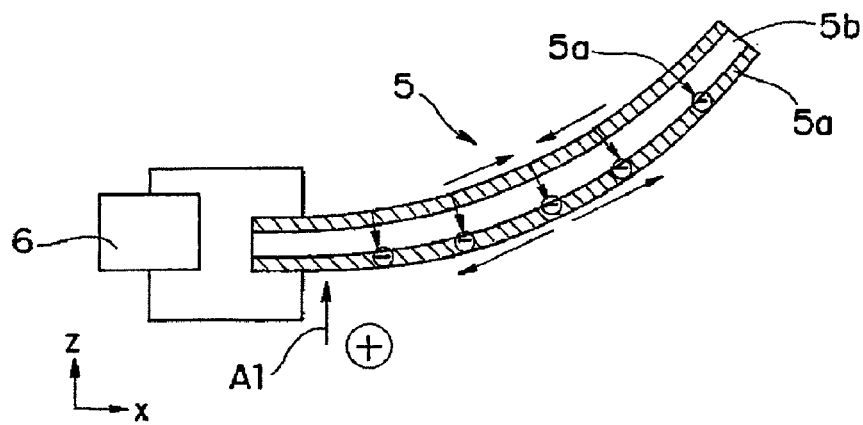
FIG. 27B is a cross-sectional view of the conductive polymer actuator in FIG. 27A, in a state where a voltage is applied thereto.
Figure 27C:
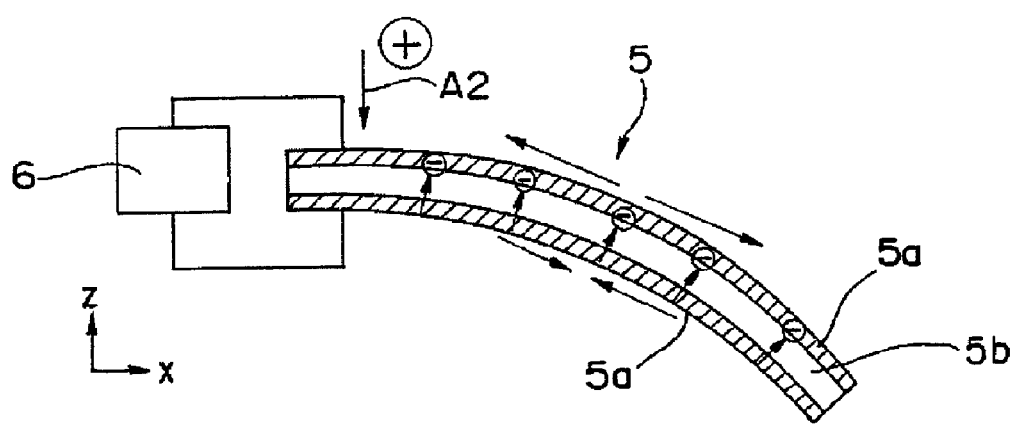
FIG. 27C is a cross sectional view of the conductive polymer actuator in FIG. 27A, in a state where a voltage with a different polarity is applied thereto.

FIGS. 27A to 27C illustrate cross-sectional views of a conductive polymer actuator according to the third embodiment of the present invention. In the third embodiment, each of the two planary-driven actuators 2 and 92 according to the second embodiment is constituted by a conductive polymer actuator (an example of the planary-driven conductive actuator) 5. Further, they have a three-layer structure formed by sandwiching a separator 5b impregnated with an ionic liquid between two conductive polymer films 5a and then bonding them to one another through a gelated ionic liquid.

The conductive polymer actuator 5 characterized in having the three-layer structure illustrated in FIG. 27A is formed by bonding the separator 5b impregnated with the ionic liquid to the two conductive polymer films 5a therebetween through the gelated ionic liquid, and then thermally and compressively attaching them to one another on a flat surface. Alternatively, the respective members can be thermally and compressively attached to one another in bonding in a state of being provided with a certain curvature, so as to provide a conductive polymer actuator 5 which is bent with a desired curvature. In this case, the conductive polymer films 5a have a property of swelling and expanding by taking in negative ions, when a positive voltage from the power supply 6 is applied thereto, and also have a property of contracting by discharging negative ions, when a negative voltage from the power supply 6 is applied thereto. As the conductive polymer films 5a, it is possible to employ films formed by applying electropolymerization to a polymer material such as polypyrrole $((C_4H_3N)_n)$. The separator 5b is required to be made of a porous material capable of being impregnated with an ionic liquid containing negative ions to be supplied to the conductive polymer films 5a. As such a porous material, to employ a cellulose or porous polyvinylidene fluoride film $((CH_2CF_2)_n)$, which has been used as a separator in an electric two-layer condenser (capacitor).

As the ionic liquid, it is possible to employ, for example, EMI-TFSI (1-ethyl-3-methylimidazoliumbis (trifluoromethane-sulfonyl)imide). Such an ionic liquid is a liquid made of only ions and has properties of exhibiting nonvolatility, noncombustibility and excellent ion conductivity and the like. By dissolving a monomer of a certain type in such an ionic liquid to polymerizing them, it is possible to provide a gel containing the ionic liquid confined within the meshes of the polymer. The gelated ionic liquid has a viscosity. This enables bonding the two conductive polymer films 5a and the ionic-liquid-impregnated separator 5b to one another through the gelated ionic liquid. In general, a conductive polymer can operate only in an ionic liquid, but the conductive polymer actuator 5 having the three-layer structure can operate in air since the ion liquid turns into a gel. Further, the conductive polymer actuator 5 characterized in having the three-layer structure constituted by the components described above can be bent when a voltage of about 1 to 3 V is applied thereto. As a concrete example, an example of the conductive polymer actuator 5 having a three-layer structure, which includes polythiophene $((C_4H_2S)_n)$ films as conductive films 5a, is formed by laminating the conductive polymer films 5a with a thickness of 10 µm, a separator 5b being impregnated with an ionic liquid and having a thickness of 60 µm, and a gelated ionic liquid on one another, and then bonding them to another, and thus the conductive polymer actuator 5 has an overall thickness of about 100 µm. Results of experiments have revealed that, when the conductive polymer actuator 5 in the three-layer structure is shaped to form driving arm portions 2a-1 with a length of 8 mm, it is possible to extract, as outputs, bending and displacement of about 4 mm at the tip ends of the driving arm portions 2a-1, when a voltage of ±1 V is applied thereto.

FIG. 27B is a cross-sectional view illustrating a state where a power supply 6 for supplying a voltage to the conductive polymer actuator 5 in the above three-layer structure is connected thereto, and the conductive polymer actuator 5 is bent and displaced when a voltage is applied thereto from the power supply 6 along an upward arrow A1 in the drawing. Due to the applied voltage from the power supply 6, negative ions existing in the conductive polymer film 5a at the upper portion in the drawing and in the separator 5b are drawn toward the conductive polymer film 5a at the lower portion in the drawing, and the conductive polymer film 5a at the upper portion in the drawing contracts by discharging the negative ions, while the conductive polymer film 5a at the lower portion in the drawing swells and expands by taking in the negative ions. Accordingly, the conductive polymer actuator 5, which is constituted by the two conductive polymer films 2a and 5a and the separator 5b bonded therebetween, outputs bending and displacement along the +z axis.

FIG. 27C is a cross-sectional view illustrating a state where the power supply 6 for supplying a voltage to the conductive polymer actuators 5 in the above three-layer structure is connected thereto, and the conductive polymer actuator 5 is bent and displaced when a voltage with the opposite polarity from that described in the description of FIG. 27B (a voltage along a downward arrow A2 in the drawing) is applied thereto. Due to the applied voltage from the power supply 6, negative ions existing in the conductive polymer film 5a at the lower portion in the drawing and in the separator 5b are drawn toward the conductive polymer film 5a at the upper portion in the drawing. Thus, the conductive polymer film 5a at the lower portion in the drawing contracts by discharging the negative ions, while the conductive polymer film 5a at the upper portion in the drawing swells and expands by taking in the negative ions. Accordingly, the conductive polymer actuator 5, which is constituted by the two conductive polymer films 5a and the separator 5b bonded therebetween, outputs bending and displacement along the −z axis. The conductive polymer actuator 5 has a property of being held in a state of being bent as illustrated in FIG. 27B and FIG. 27C, when no voltage is applied thereto, since no negative ions are moved among the respective conductive polymer films 5a and the separator 5b.

Further, the conductive polymer actuator 5 is capable of outputting a bending state according to the amount of the voltage applied thereto from the power supply 6, and also is capable of being held in the bending state. Therefore, the conductive polymer actuator 5 has a property of being capable of reducing the electric power consumption of the lens holder driving device since a voltage should be applied thereto from the power supply 6 only when the respective driving arm portions 5-1 of the conductive actuator 5 are bent.

Figure 28:
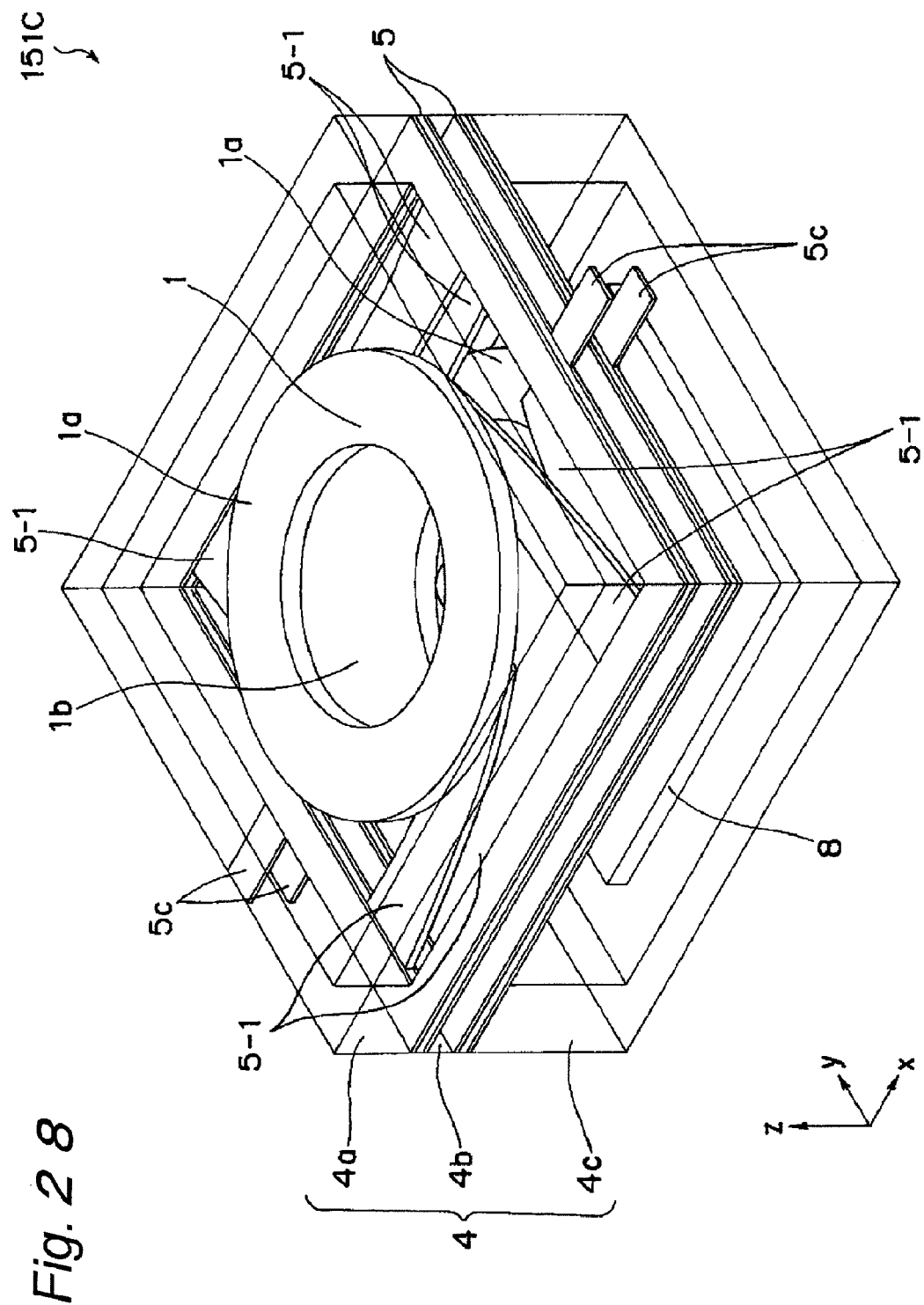
FIG. 28 is a perspective view of a lens holder driving device employing planary-driven actuators which are conductive polymer actuators according to the third embodiment of the present invention, in a state of incorporating an image pickup device therein and being viewed only through a fixing frame member.

FIG. 28 illustrates a perspective view of a lens holder driving device 151C employing planary-driven actuators which are the conductive polymer actuators 5, according to the third embodiment of the present invention. The lens holder driving device 151C illustrated in FIG. 28 includes the same members and portions as those of the second embodiment in FIG. 20, except that the first and second planary-driven actuators 2 and 92 are replaced with the conductive polymer actuators 5.

Figure 29:
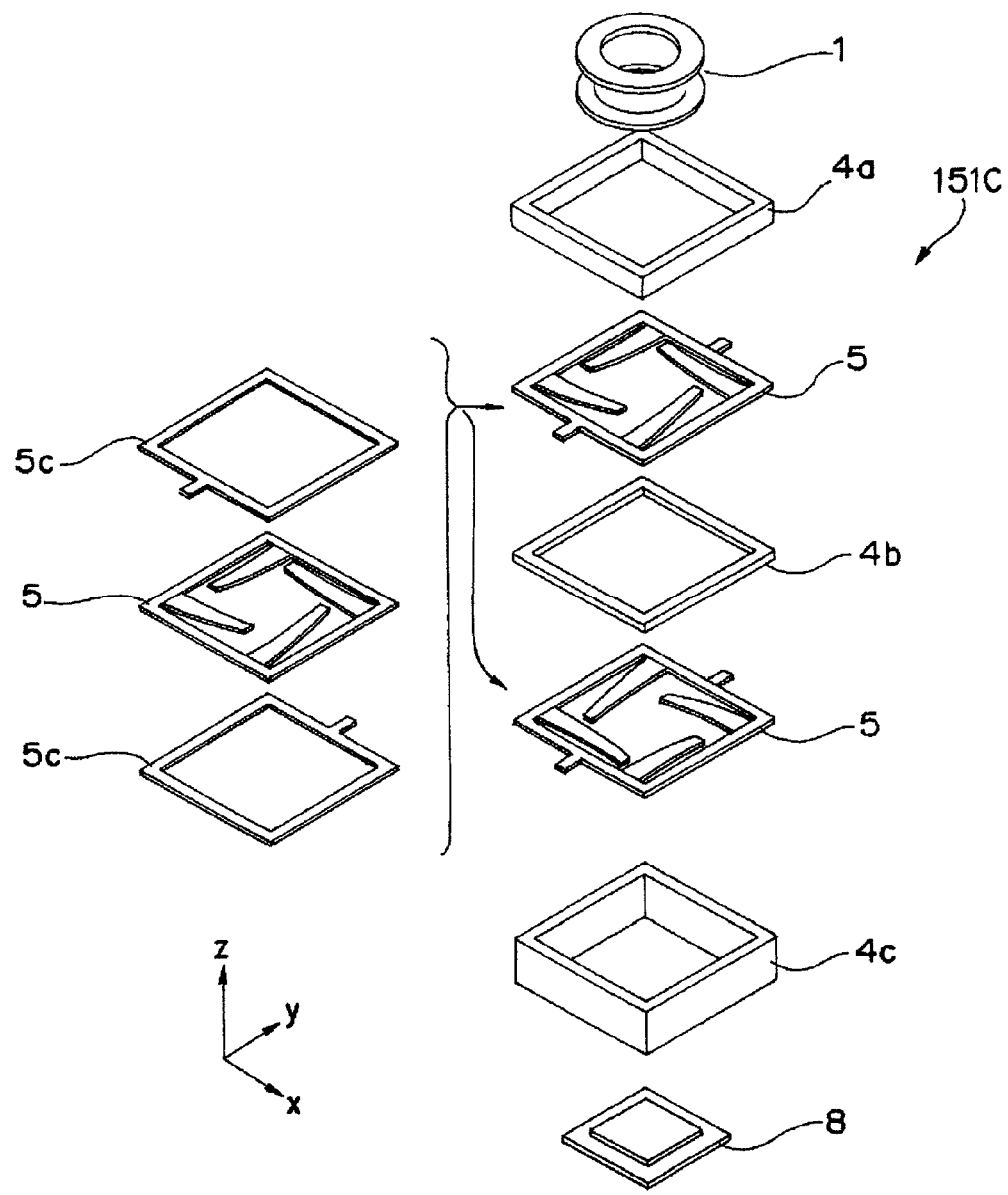
FIG. 29 is an exploded perspective view of the components of the lens holder driving device employing the planary-driven conductive actuators which are the conductive polymer actuators in FIG. 28 according to the third embodiment of the present invention, in a state where an image pickup device is incorporated therein.

FIG. 29 illustrates a perspective view of the components of the lens holder driving device 151C employing the planary-driven actuators which are the conductive polymer actuators 5, according to the third embodiment of the present invention. The same components as those of the first embodiment, out of the respective components of the third embodiment, will be designated by the same reference characters as those in the first embodiment and will not be described. In this case, the planary-driven actuators 5 which are the conductive polymer actuators are structured to be sandwiched between two extraction electrodes 5c for supplying a voltage thereto.

Figure 30:
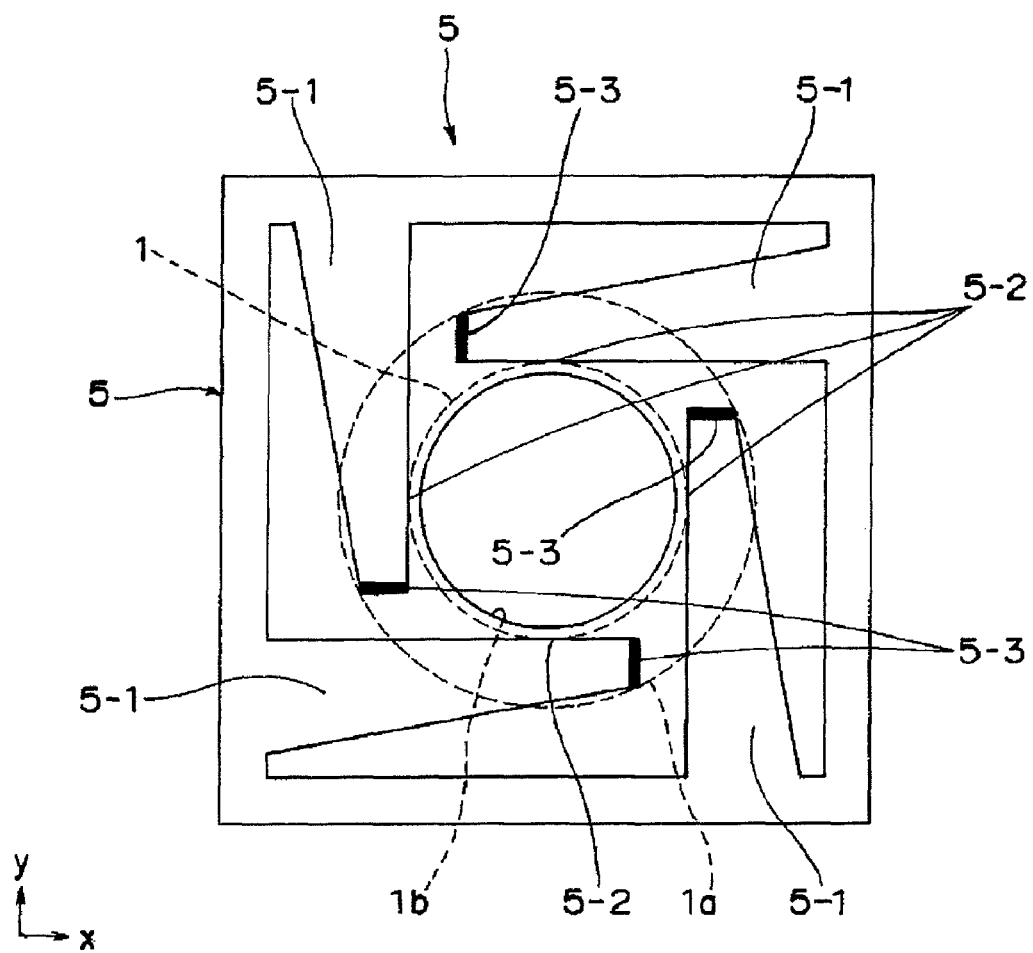
FIG. 30 is a plan view of a planary-driven actuator which is a conductive polymer actuator characterized in having a three-layer structure formed by sandwiching a separator impregnated with an ionic liquid between two conductive polymer films for bonding, in the lens holder driving device according to the third embodiment of the present invention.

As illustrated in FIG. 30, the planary-driven actuators 5 which are the conductive polymer actuators have a plurality of driving arm portions 5-1, similarly to the driving arm portions 2a-1, the lens holder support points 2a-2, and the free-end side contact portions 2a-3 of the planary-driven actuators 2 and 92 described in the first embodiment and the second embodiment. Each driving arm portion 5-1 has a property of having a lens holder support point 5-2 and a free-end side contact portion 5-3 in its shape. The outer surface of the cylindrical body portion 1b of the lens holder 1 is restrained in a plane intersecting with the direction of the optical axis, through the lens holder support points 5-2 placed at the plurality of positions opposing to each other. The planary-driven actuators 5 which are the conductive polymer actuators have a property of bending and displacing at their respective driving arm portions 5-1, in response to the voltage applied thereto from the power supply 6, along the optical axis according to the direction of the voltage applied from the power supply 6, thereby causing the free-end side contact portions 5-3 of the respective driving arm portions 5-1 to move the lens holder 1 along the optical axis while contacting with the flange portions 1a of the lens holder 1. Accordingly, the driving arm portions 5-1, the lens holder support points 5-2, the free-end side contact portions 5-3, and the extraction electrodes 5c of the conductive polymer actuators 5 correspond to the driving arm portions 2a-1, the lens holder support points 2a-2, the free-end side contact portions 2a-3, and the extraction electrodes 2b of the conductive polymer actuators 2 and 92. Further, the structure and the functions of the conductive polymer actuators 5 are the same as the structure and functions of the planary-driven actuators 2 and 92, and therefore will not be described in detail. The respective components are sized similarly to in the first embodiment, but only the fixing frame member 4 has different sizes. The upper fixing frame 4a, the middle fixing frame 4b, and the lower fixing frame 4c are sized such that, for example, their thicknesses are 2 mm, 0.9 mm, and 4 mm, in the mentioned order. In the case where their square outer shape has a size of 14 mm at each single side, and their portions sandwiched between the electrodes 2b are the portions with a width of 1 mm from their outer shape, the square inner edges of their portions other than the driving arm portions 2a-1 have a size of 12 mm at each single side.

Figure 31:
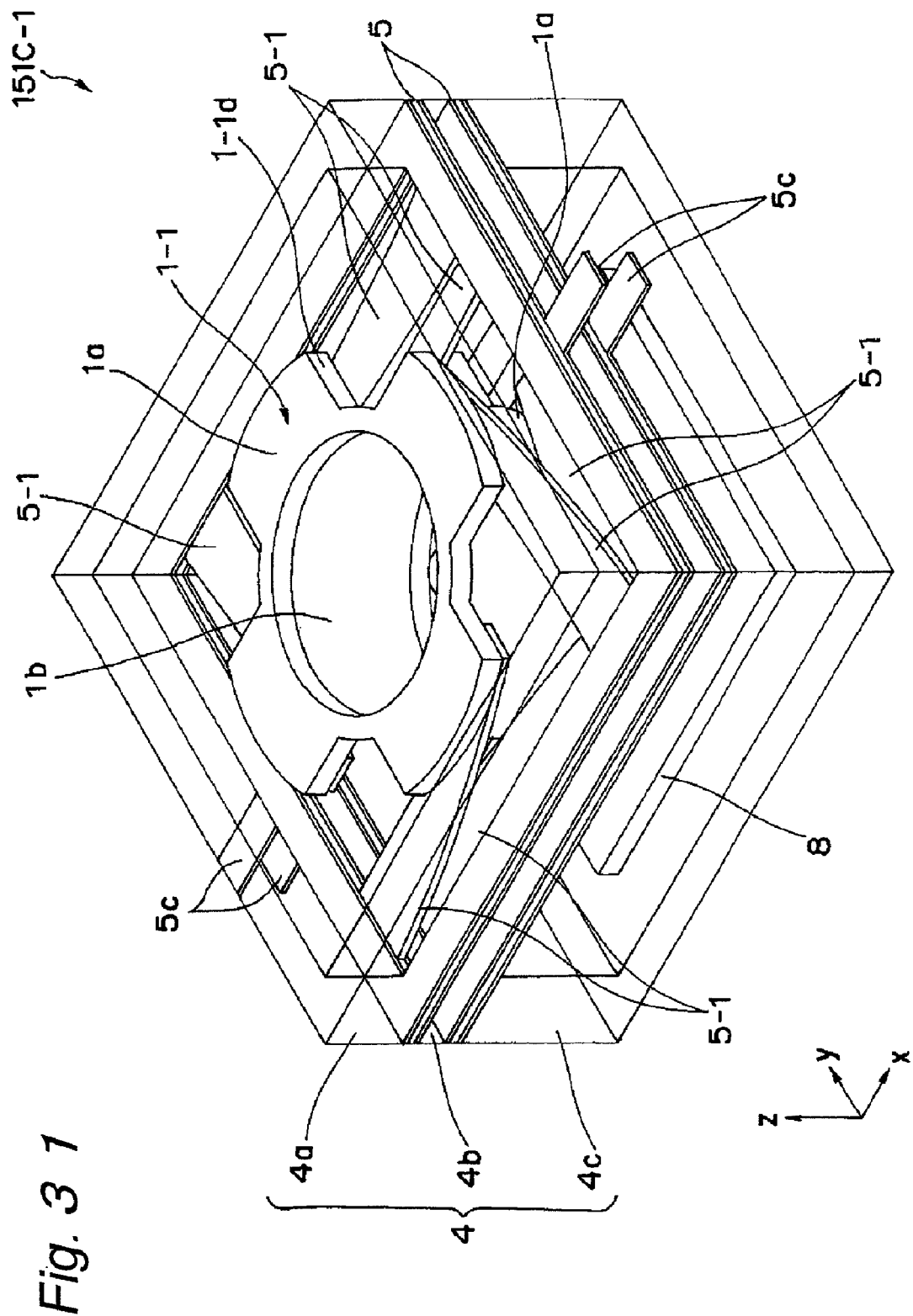
FIG. 31 is a perspective view of the lens holder driving device employing the planary-driven actuators which are the conductive polymer actuators according to the third embodiment of the present invention, in a state where the lens holder in FIG. 5A is applied thereto, and it incorporates an image pickup device therein and is viewed only through the fixing frame member.

FIG. 31 is a perspective view of a lens holder driving device 151-C incorporating planary-driven actuators 5 which are the plurality of conductive polymer actuators and incorporating the lens holder 1-1 in FIG. 5A, according to an example of modification of the third embodiment.

With the structure employing the lens holder 1-1, when the respective driving arm portions 5-1 of the planary-driven actuators 5 which are the two conductive polymer actuators are bent substantially at the same time, it is possible to reduce the interference thereof with the flange portions 1a of the lens holder 1-1. Further, there is provided the advantage of an increase of the ranges within which the driving arm portions 5-1 of the planary-driven actuators 5 which are the conductive polymer actuators are movable.

Figure 32:
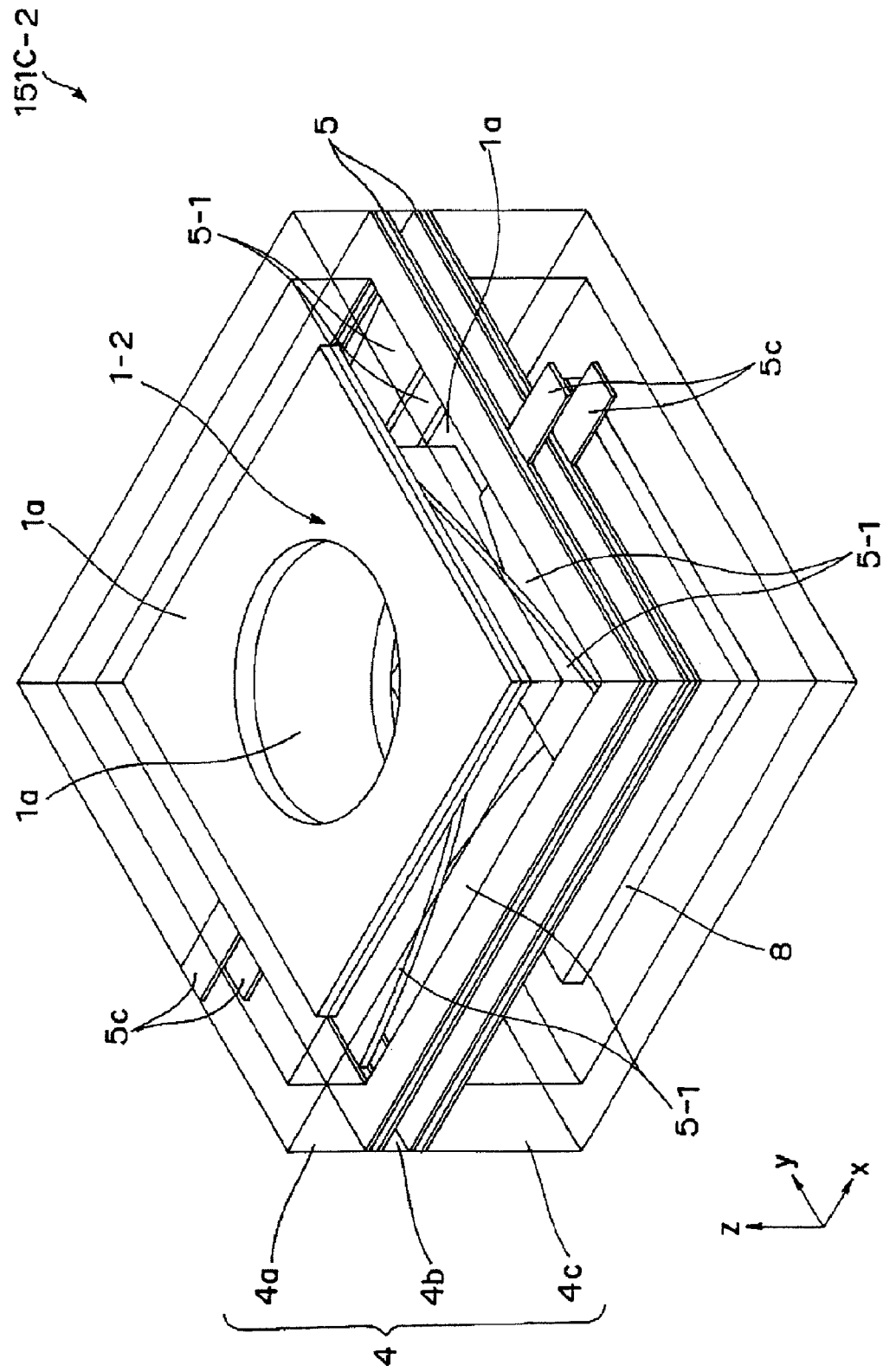
FIG. 32 is a perspective view of the lens holder driving device employing the planary-driven actuators which are the conductive polymer actuators according to the third embodiment of the present invention, in a state where the lens holder in FIG. 5B is applied thereto, and it incorporates an image pickup device therein and is viewed only through the fixing frame member.

FIG. 32 is a perspective view of a lens holder driving device 151C-2 incorporating planary-driven actuators 5 which are the plurality of conductive polymer actuators and incorporating the lens holder 1-2 in FIG. 5B, according to an example of modification of the third embodiment.

With this structure, there is provided the advantage that the lens holder 1-2 is allowed to move only along the optical axis, while being prevented from rotating in a plane intersecting with the direction of the optical axis.

Figure 33:
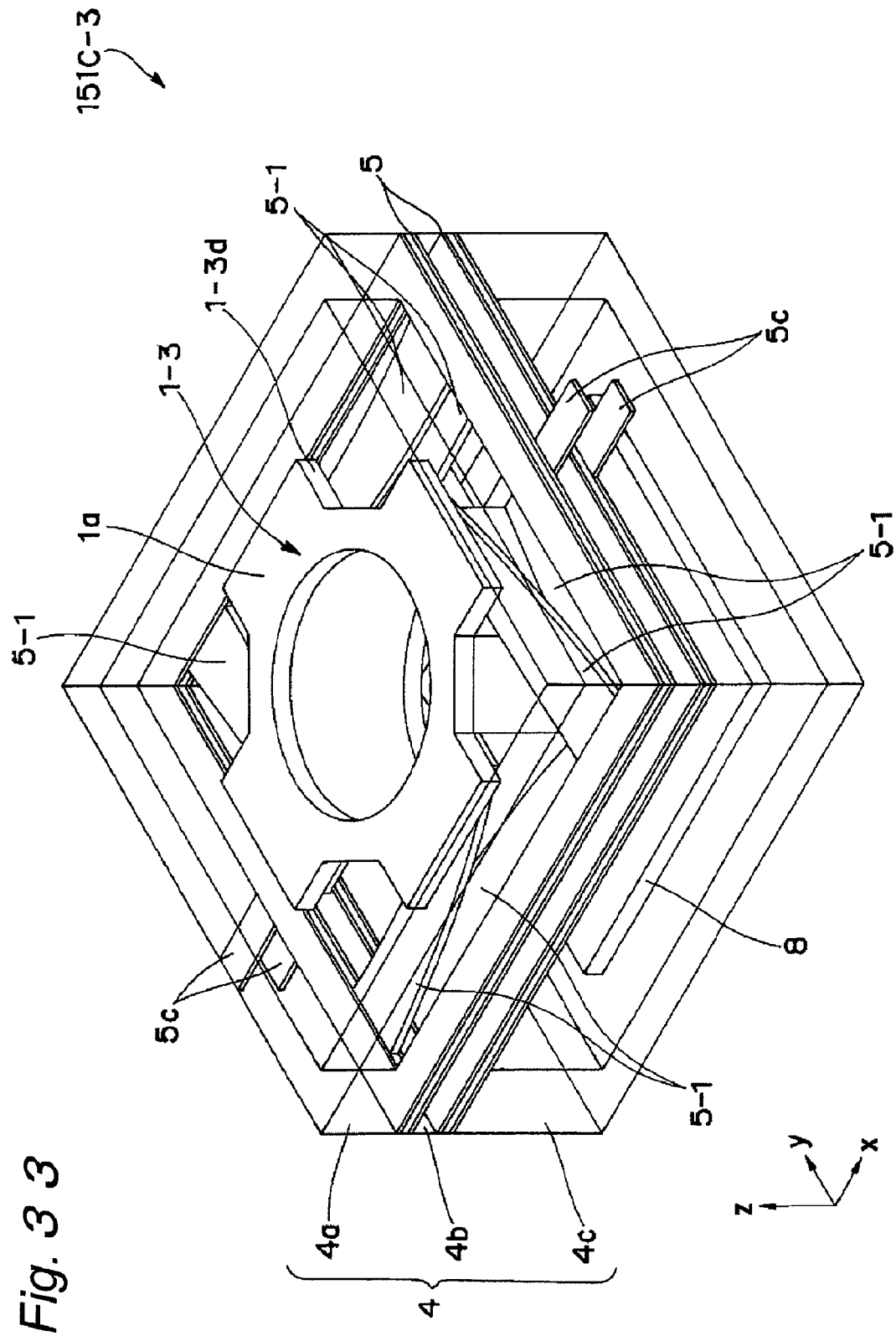
FIG. 33 is a perspective view of the lens holder driving device employing the planary-driven actuators which are the conductive polymer actuators according to the third embodiment of the present invention, in a state where the lens holder in FIG. 5C is applied thereto, and it incorporates an image pickup device therein and is viewed only through the fixing frame member.

FIG. 33 is a perspective view of a lens holder driving device 151C-3 incorporating planary-driven actuators 5 which are the plurality of conductive polymer actuators and incorporating the lens holder 1-3 in FIG. 5C, according to an example of modification of the third embodiment.

With the structure employing the lens holder 1-3, when the respective driving arm portions 5-1 of the planary-driven actuators 5 which are the two conductive polymer actuators are bent substantially at the same time, it is possible to reduce the interference thereof with the flange portions 1a of the lens holder 1-3. Further, there is provided the advantage of an increase of the ranges within which the driving arm portions 5-1 of the planary-driven actuators 5 which are the conductive polymer actuators are movable. With this structure, there is provided the advantage that the lens holder 1-3 is allowed to move only along the optical axis, while being prevented from rotating in a plane intersecting with the direction of the optical axis.

Figure 34:
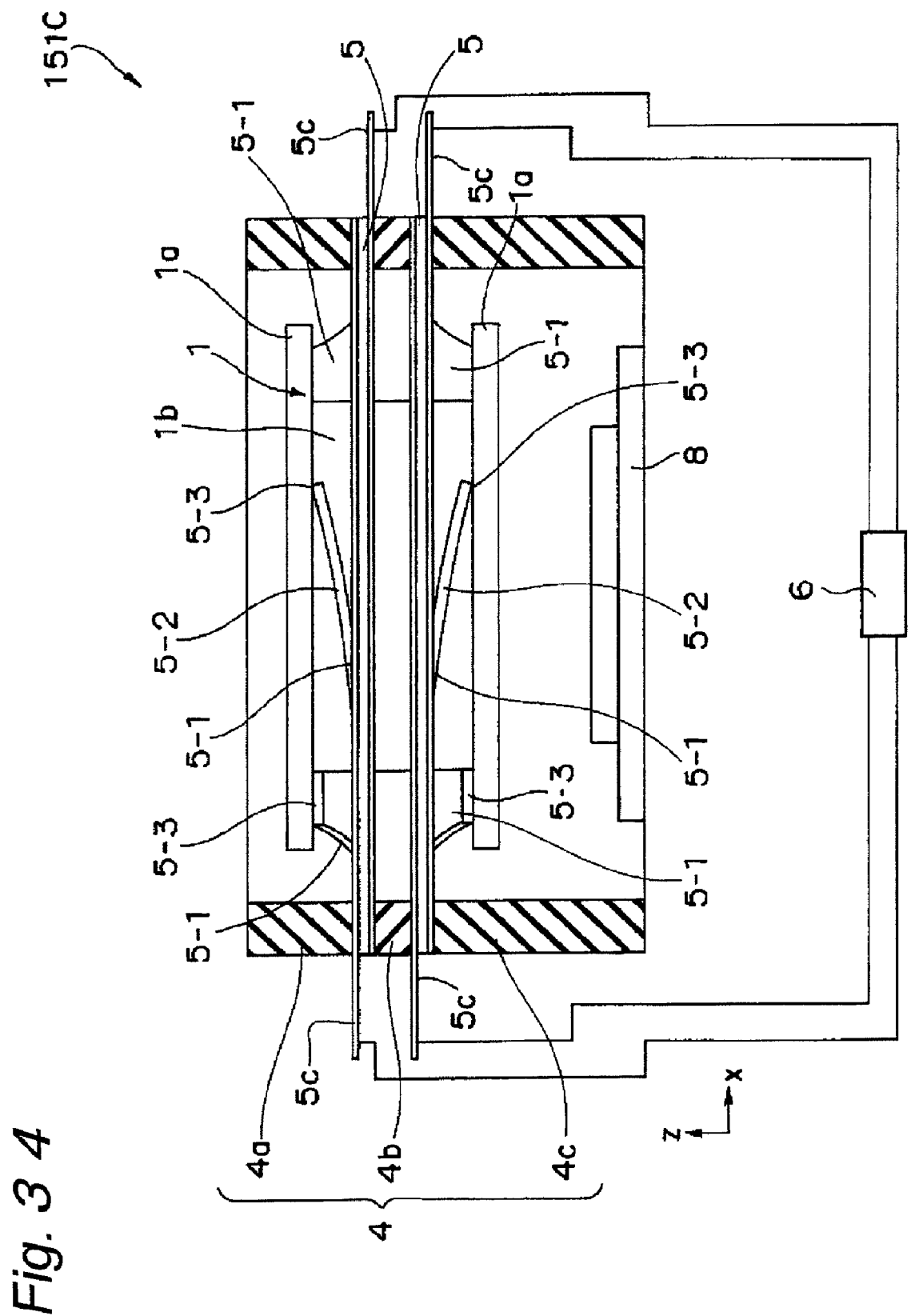
FIG. 34 is a partial cross-sectional side view of the lens holder driving device employing planary-driven actuators which are conductive polymer actuators in FIG. 28 according to the third embodiment of the present invention.

FIG. 34 illustrates a side view of the lens holder driving device 151C employing the planary-driven actuators which are the conductive polymer actuators, according to the third embodiment of the present invention (a cross sectional view of only the fixing frame member). In this case, initial voltages are applied from the power supply 6 to the planary-driven actuators 5 which are the plurality of conductive polymer actuators placed in parallel with each other for bending and displacing, substantially at the same time, the free-end side contact portions 5-3 of the respective driving arm portions 5-1 of the planary-driven actuator 5 which is the conductive polymer actuator placed at the upper portion, until they come into contact with the bottom surface of the upper flange portion 1a of the lens holder 1. Further, the free-end side contact portions 5-3 of the respective driving arm portions 5-1 of the planary-driven actuator 5 which is the conductive polymer actuator placed at the lower portion are bent and displaced, substantially at the same time, until they come into contact with the upper surface of the lower flange portion 1a of the lens holder 1. Thereafter, application of the initial voltages from the power supply 6 is stopped for holding the state where the respective driving arm portions 5-1 of the upper and lower planary-driven actuators 5 are bent, thereby restricting the initial position of the lens holder 1 along the optical axis. Further, when the two conductive polymer films 5a and the separator 5b, which are the components of each planary-driven actuator 5 which is the conductive polymer actuator, are bonded to one another, the respective components are bonded to one another by thermally and compressively attaching them to one another in a state where the respective components are provided with a curvature, and thus the conductive polymer actuators 5 which are bent with a desired curvature are employed. It is thus possible to reduce or eliminate displacement of the lens holder 1 toward the initial position along the optical axis.

The lens holder 1 having the flange portions 1a is sandwiched between the planary-driven actuators 5 which are the plurality of conductive polymer actuators placed in parallel with each other, and the respective components are bonded to one another through the fixing frame member 4 constituted by the upper fixing frame 4a, the middle fixing frame 4b, and the lower fixing frame 4c for realizing the lens holder driving device 151C. An image pickup device 8 can be placed in the lowermost portion of the lens holder driving device 151C to form an image pickup unit, which will be described later.

Figure 35A:
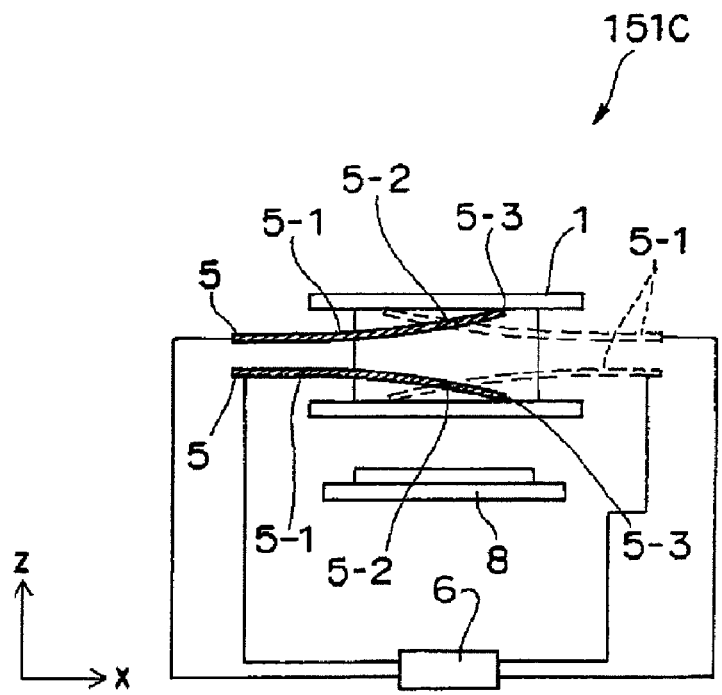
FIG. 35A is a side view schematically illustrating the lens holder driving device employing the planary-driven actuators which are the conductive polymer actuators according to the third embodiment of the present invention, with the position of an image pickup device being illustrated for the purpose of reference, and also illustrating a state where initial voltages are applied from a power supply to the planary-driven actuators which are the conductive polymer actuators, and thus a lens holder is held therein.
Figure 35B:
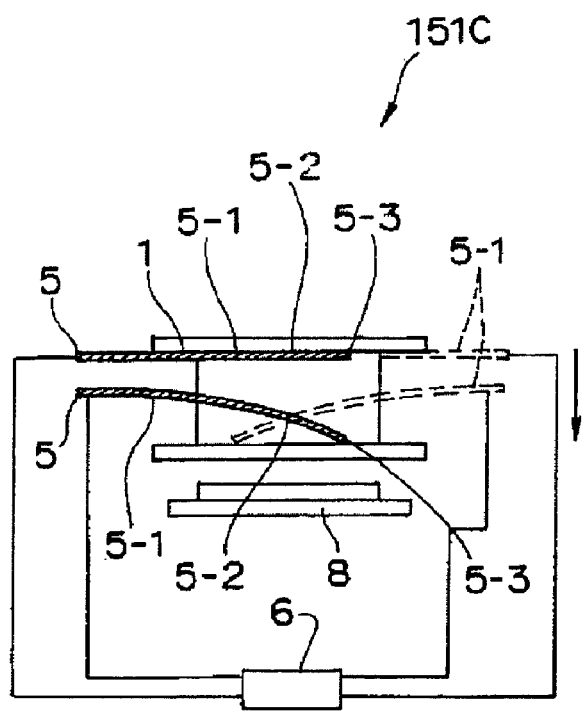
FIG. 35B is a side view schematically illustrating the lens holder driving device employing the planary-driven actuators which are the conductive polymer actuators according to the third embodiment of the present invention, with the position of an image pickup device being illustrated for the purpose of reference, and also illustrating a state where voltages are applied from the power supply to the planary-driven actuators, and thus the lens holder has been displaced along the −z axis.
Figure 35C:
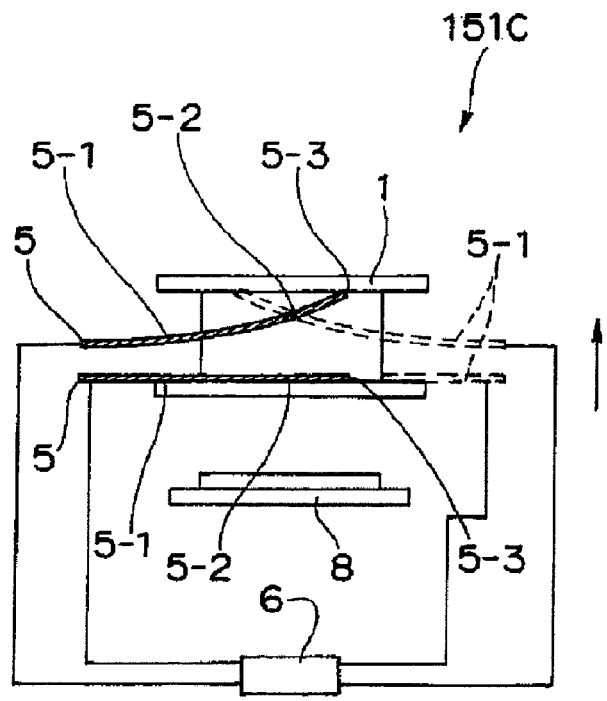
FIG. 35C is a side view schematically illustrating the lens holder driving device employing the planary-driven actuators which are the conductive polymer actuators according to the third embodiment of the present invention, with the position of an image pickup device being illustrated for the purpose of reference, and also illustrating a state where voltages are applied from the power supply to the planary-driven actuators, and thus the lens holder has been displaced along the +z axis.

FIGS. 35A to 35C are side views schematically illustrating a method for driving the lens holder driving device 151C employing the planary-driven actuators 5 which are the plurality of conductive polymer actuators, according to the third embodiment of the present invention. In this case, the upper and lower flange portions 1a of the lens holder 1 are not coupled and secured to the free-end side contact portions 5-3 in the planary-driven actuators 5 which are the conductive polymer actuators. This enables utilizing to a maximum extent the bending and displacement of the respective driving arm portions 5-1 of the planary-driven actuators 5 which are the conductive polymer actuators for moving the lens holder 1 along the optical axis. Accordingly, it is possible to increase the ranges within which the respective driving arm portions 5-1 are movable, in comparison with cases where the respective free-end side contact portions 5-3 in the planary-driven actuators 5 which are the conductive polymer actuators are coupled and secured to the upper and lower flange portions 1a of the lens holder 1.

FIG. 35A illustrates a state where the lens holder 1 is at an initial position along the optical-axis, after the free-end side contact portions 5-3 of the respective driving arm portions 5-1 of the planary-driven actuator 5 which is the conductive polymer actuator placed at the upper portion are bent and displaced, substantially at the same time until they come into contact with the bottom surface of the upper flange portion 1a of the lens holder 1, through the power supply 6, then the free-end side contact portions 5-3 of the respective driving arm portions 5-1 of the planary-driven actuator 5 which is the conductive polymer actuator placed at the lower portion are bent and displaced, substantially at the same time, until they come into contact with the upper surface of the lower flange portion 1a of the lens holder 1, and then application of the initial voltages from the power supply 6 is stopped for holding the state where the respective driving arm portions 5-1 of the upper and lower planary-driven actuators 5 are bent. Also, the two conductive polymer films 5a and the separator 5b, which are the components of each planary-driven actuator 5 which is the conductive polymer actuator, are bonded to one another by thermally and compressively attaching the respective components to one another in a state where the components are provided with a curvature, and thus the conductive polymer actuators 5 which are bent with a desired curvature are employed. Further, the free-end side contact portions 5-3 of the respective driving arm portions 5-1 are brought into contact with the bottom surface of the upper flange portion 1a of the lens holder 1, and also the free-end side contact portions 5-3 of the respective driving arm portions 5-1 of the planary-driven actuator 5 which is the conductive polymer actuator placed at the lower portion are brought into contact with the upper surface of the lower flange portion 1a of the lens holder 1. There is illustrated the state where the lens holder 1 is held at the initial position along the optical axis in the way described above. In this case, the lens holder 1 is restricted in position in a plane intersecting with the direction of the optical axis, by the lens holder support point 5-2 of the respective driving arm portions 5-1 of the planary-driven actuators 5 which are the plurality of conductive polymer actuators placed in parallel with each other.

FIG. 35B illustrates a state where the lens holder 1 has been moved along the −z axis, by applying voltages, from the power supply 6, to the planary-driven actuators 5 which are the conductive polymer actuators held at the bending state at the above initial position. Due to the applied voltage from the power supply 6, the free-end side contact portions 5-3 of the respective driving arm portions 5-1 in the planary-driven actuator 5 which is the conductive polymer actuator placed at the lower portion in the drawing are further bent in the same direction substantially at the same time, from the initial bending state, to move the lens holder 1 along the −z axis, while contacting with the upper surface of the lower flange portion 1a of the lens holder 1. In this case, it is necessary to apply a voltage thereto from the power supply 6 such that the respective driving arm portions 5-1 of the planary-driven actuator 5 which is the conductive polymer actuator placed at the upper portion are bent and displaced substantially at the same time along the −z axis, while following the bending of the respective driving arm portions 5-1 of the conductive polymer actuator 5 placed at the lower portion. Also, the respective driving arm portions 5-1 of the planary-driven actuator 5 which is the conductive polymer actuator placed at the upper portion can be forcibly bent so as to follow movement of the lens holder 1 along the −z axis, without applying a voltage from the power supply 6 to the planary-driven actuator 5 which is the conductive polymer actuator placed at the upper portion. Further, the respective driving arm portions 5-1 of the planary-driven actuator 5 which is the conductive polymer actuator placed at the upper portion reach a horizontal state in FIG. 35B, and the position to horizontally contact with the bottom surface of the upper flange portion 1a of the lens holder 1 in FIG. 35B defines the limit of movement of the lens holder 1 along the −z axis. In this case, even when the lens holder 1 has been displaced along the −z axis, the lens holder 1 is restricted in position, in a plane intersecting with the direction of the optical axis, by the lens holder support points 5-2 of the respective driving arm portions 5-1 of the planary-driven actuators 5 which are the plurality of conductive polymer actuators placed in parallel with each other. Further, when application of the voltages from the power supply 6 to the planary-driven actuators 5 which are the conductive polymer actuators placed in parallel with each other is stopped, the lens holder 1 is held in the state of being displaced in the −z direction. In order to displace the lens holder 1 to the initial position, voltages should be applied to the respective actuators 5 from the power supply 6 so as to displace the respective actuators 5 along the +z axis.

FIG. 35C illustrates a state where the lens holder 1 has been moved along the +z axis by applying voltages, from the power supply 6, to the planary-driven actuators 5 which are the conductive polymer actuators held the bending state at the above initial position. Due to the applied voltage from the power supply 6, the free-end side contact portions 5-3 of the respective driving arm portions 5-1 in the planary-driven actuator 5 which is the conductive polymer actuator placed at the upper portion in the drawing are further bent in the same direction substantially at the same time, from the initial bending state, to move the lens holder 1 along the +z axis, while contacting with the bottom surface of the upper flange portion 1a of the lens holder 1. In this case, it is necessary to apply a voltage from the power supply 6 such that the respective driving arm portions 5-1 of the planary-driven actuator 5 which is the conductive polymer actuator placed at the lower portion are bent and displaced substantially at the same time along the +z axis, while following the bending of the respective driving arm portions 5-1 of the conductive polymer actuator 5 placed at the upper portion. Also, the respective driving arm portions 5-1 of the planary-driven actuator 5 which is the conductive polymer actuator placed at the upper portion can be forcibly bent, so as to follow movement of the lens holder 1 along the +z axis, without applying a voltage from the power supply 6 to the planary-driven actuator 5 which is the conductive polymer actuator placed at the lower portion. Further, the respective driving arm portions 5-1 of the planary-driven actuator 5 which is the conductive polymer actuator placed at the lower portion reach a horizontal state in FIG. 35C. Further, the position to horizontally contact with the upper surface of the lower flange portion 1a of the lens holder 1 in FIG. 35C defines the limit of movement of the lens holder 1 along the +z axis. In this case, even when the lens holder 1 has been displaced along the +z axis, the lens holder 1 is restricted in position, in a plane intersecting with the direction of the optical axis, by the lens holder support points 5-2 of the respective driving arm portions 5-1 of the planary-driven actuators 5 which are the plurality of conductive polymer actuators placed in parallel with each other. Further, when application of the voltages from the power supply 6 to the planary-driven actuators 5 which are the conductive polymer actuators placed in parallel with each other is stopped, the lens holder 1 is held in the state of being displaced in the +z direction. In order to displace the lens holder 1 to the initial position, voltages should be applied to the respective actuators 5 from the power supply 6 so as to displace the respective actuators 5 along the −z axis.

With the structure described above, the upper and lower flange portions 1a of the lens holder 1 are not coupled and secured to the free-end side contact portions 5-3 in the planary-driven actuators 5 which are the conductive polymer actuators. This enables utilizing to a maximum extent the bend and displacement of the respective driving arm portions 5-1 of the planary-driven actuators 5 which are the conductive polymer actuators for moving the lens holder 1 along the optical axis. Accordingly, it is possible to realize the lens holder driving device 151C capable of increasing the ranges within which the respective driving arm portions 5-1 are movable, in comparison with cases where the respective free-end side contact portions 5-3 in the planary-driven actuators 5 which are the conductive polymer actuators are coupled and secured to the upper and lower flange portions 1a of the lens holder 1. Further, the lens holder 1 is restricted in position in a plane intersecting with the direction of the optical axis, through the shapes of the respective driving arm portions 5-1 of the planary-driven actuators 5 which are the conductive polymer actuators. Further, the plurality of planary-driven actuators 5, which are the conductive polymer actuators capable of being held at a bending state, are placed in parallel with each other, and the respective driving arm portions 5-1 of the actuators are bent through application of initial voltages thereto or, also, the two conductive polymer films 5a and the separator 5b, which are the components of each planary-driven actuator 5 which is the conductive polymer actuator, are bonded to one another by thermally and compressively attaching them to one another in a state where the respective components are provided with a curvature. Thus, the lens holder 1 can be held at the initial position along the optical axis through the bending state with the desired curvature, which realizes the lens holder driving device 151C capable of moving the lens holder 1 along the optical axis and restricting movement of the lens holder 1 to be along the optical axis. Further, the plurality of plenary-driven actuators 5, which are the conductive polymer actuators capable of being held at a bending state, are placed in parallel with each other. It is thus possible to increase the ranges within which the respective driving arm portions 5-1 of the planary-driven actuators 5 which are the conductive polymer actuators can bend, thereby realizing the lens holder driving device 151C capable of increasing the amount of movement of the lens holder 1 along the optical axis. Further, the planary-driven actuators 5 which are the conductive polymer actuators can be driven at a low voltage of 1 to 3 V, and also can be held at a bending state. Therefore, it is necessary to apply voltages from the power supply 6 thereto only when the lens holder 1 is moved along the optical axis, thereby realizing a lens holder driving device 151C capable of reducing the power consumption.

Fourth Embodiment

FIGS. 36A to 38C illustrate side views of lens holder driving devices 151D having the following characteristic according to the first to third embodiments of the present invention. The characteristic is that they include a control device 7 capable of controlling so as to apply voltages from the power supply 6 to the planary-driven actuators 2, 92 and 5 only when bending substantially at the same time the respective driving arm portions 2a-1 and 5-1 of the planary-driven actuators 2, 92 and 5. Further, there is illustrated an image pickup device 8 at a lower portion of the lens holder driving device 151D for the purpose of reference.

Figure 36A:
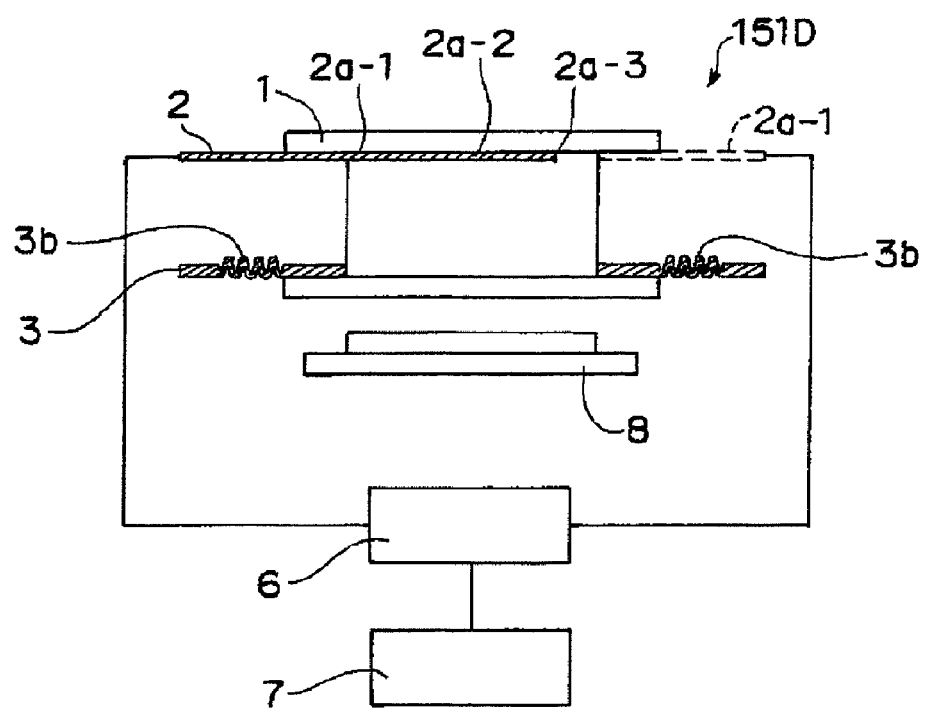
FIG. 36A is a side view illustrating an initial position of the lens holder in the lens holder driving device according to the first embodiment of the present invention, including a control device for controlling such that a voltage is applied from a power supply to the planary-driven actuator only when bending the driving arm portions of the planary-driven actuator, with the position of an image pickup device being illustrated for the purpose of reference.

FIG. 36A is a side view illustrating an initial position of the lens holder 1 in the lens holder driving device 151D. In this case, the power supply 6 for applying a voltage to the planary-driven actuator 2 in the lens holder driving device 151D described in the first embodiment of the present invention is connected thereto, and the control device 7 is further connected to the power supply 6, wherein the control device 7 supplies control signals to the power supply 6 only when bending substantially at the same time the respective driving arm portions 2a-1 of the planary-driven actuator 2.

Figure 36B:
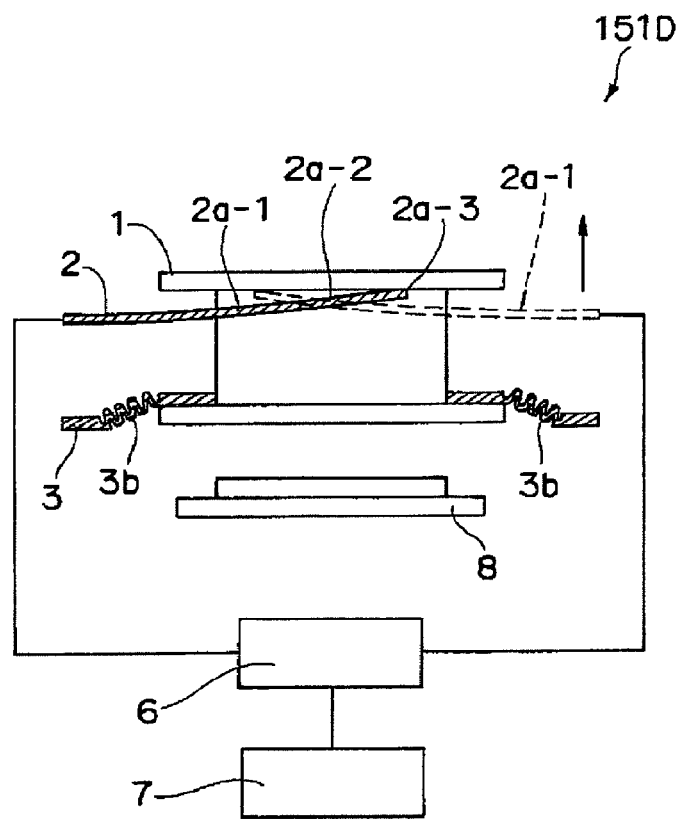
FIG. 36B is a side view illustrating displacement of the lens holder along the +z axis in the lens holder driving device according to the first embodiment of the present invention, including the control device, with the position of an image pickup device being illustrated for the purpose of reference.

In this case, as illustrated in FIG. 36B, only when the lens holder 1 is moved along the +z axis, the control device 7 supplies control signals to the power supply 6 for causing the power supply 6 to apply a voltage to the planary-driven actuator 2. Thus, the planary-driven actuator 2 is controlled to be bent and displaced along the +z axis substantially at the same time for moving the lens holder 1. When no voltage is applied from the power supply 6, the lens holder 1 is displaced to the initial position defined by the planary-driven actuator 2 as well as by the lens-holder retaining plate 3 having the spring-characteristic portions 3b and is held at the initial position.

With this structure, it is possible to realize the lens holder driving device 151D capable of applying a voltage from the power supply 6 only when bending the respective driving arm portions 2a-1 of the planary-driven actuator 2 substantially at the same time for displacing the lens holder 1 along the +z axis, and thus capable of driving with less power consumption. Further, it is possible to realize the lens holder driving device 151D capable of controlling the voltage applied from the power supply 6 to the planary-driven actuator 2 with the control device 7 for controlling the amount of bend and displacement of the respective driving arm portions 2a-1 of the planary-driven actuator 2 so as to control the amount of movement of the lens holder 1 along the +z axis.

Figure 37A:
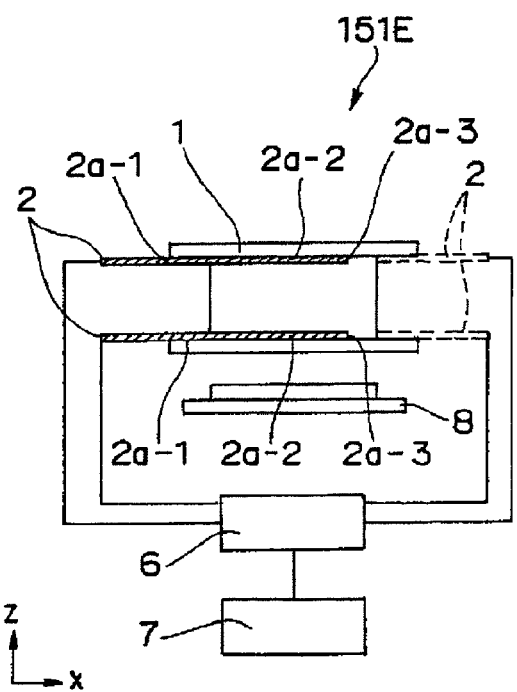
FIG. 37A is a side view illustrating an initial position of the lens holder in the lens holder driving device according to the second embodiment of the present invention, including a control device for controlling such that voltages are applied from a power supply to the planary-driven actuators only when bending the driving arm portions of the planary-driven actuators, with the position of an image pickup device being illustrated for the purpose of reference.

FIG. 37A is a side view illustrating an initial position of the lens holder 1 in the lens holder driving device 151E. In this case, the power supply 6 for applying voltages to the planary-driven actuators 2 in the lens holder driving device described in the second embodiment of the present invention is connected thereto. Further, the control device 7 is connected to the power supply 6, wherein the control device 7 supplies control signals to the power supply 6 only when bending substantially at the same time the respective driving arm portions 2a-1 of the planary-driven actuators 2.

Figure 37B:
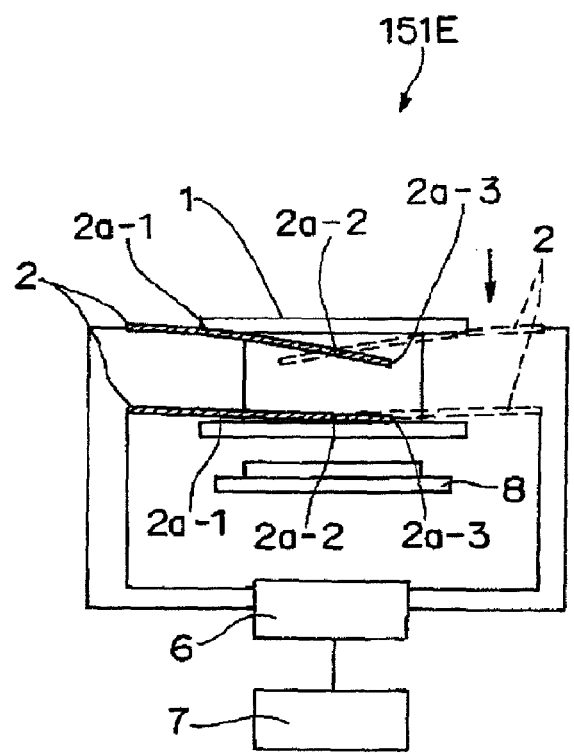
FIG. 37B is a side view illustrating displacement of the lens holder along the −z axis in the lens holder driving device according to the second embodiment of the present invention, including the control device, with the position of an image pickup device being illustrated for the purpose of reference.

As illustrated in FIG. 37B, when the lens holder 1 is moved along the −z axis, the control device 7 supplies control signals to the power supply 6 for causing the power supply 6 to apply voltages to the plurality of planary-driven actuators 2 placed in parallel with each other. Thus, the plurality of planary-driven actuators 2 placed in parallel with each other are controlled by the control device 7 such that the respective driving arm portions 2a-1 of the planary-driven actuators 2 are bent and displaced along the −z axis substantially at the same time, thereby moving the lens holder 1. In this case, voltages having different values from each other are applied to the planary-driven actuator 2 placed at the upper portion and the conductive polymer actuator 2 placed at the lower portion. It is necessary to control with the control device 7 so as to apply voltages from the power supply 6, such that the respective driving arm portions 2a-1 of the planary-driven actuator 2 placed at the upper portion are bent and displaced along the −z axis substantially at the same time while following the bending of the respective driving arm portion 2a-1 of the planary-driven actuator 2 placed at the lower portion. Also, it is necessary to control with the control device 7 such that the planary-driven actuator 2 placed at the upper portion follows movement of the lens holder 1 along the −z axis, without applying a voltage from the power supply 6 to the planary-driven actuator 2 placed at the upper portion. When no voltage is applied from the power supply 6 to the planary-driven actuator 2 placed at the upper portion and the planary-driven actuator 2 placed at the lower portion, the lens holder 1 is displaced to the initial position defined by the plurality of planary-driven actuators 2 placed in parallel with each other and is held at the initial position.

Figure 37C:
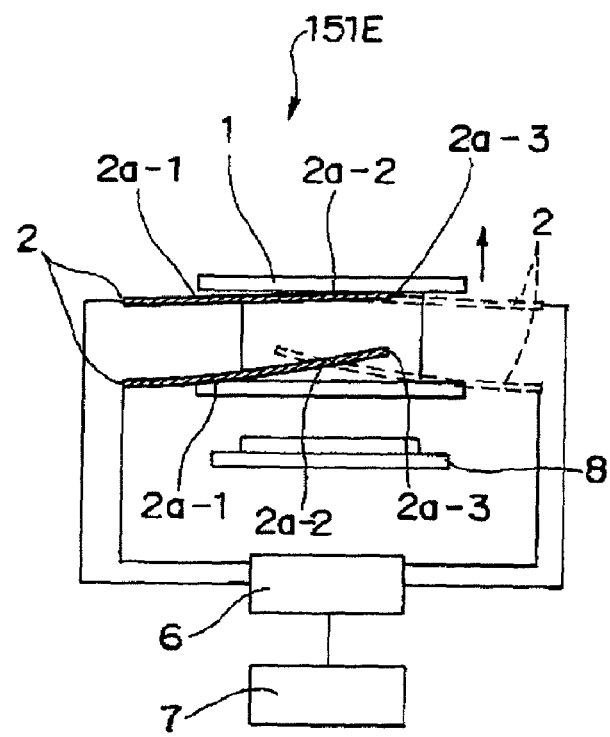
FIG. 37C is a side view illustrating displacement of the lens holder along the +z axis in the lens holder driving device according to the second embodiment of the present invention, including the control device, with the position of an image pickup device being illustrated for the purpose of reference.

As illustrated in FIG. 37C, when the lens holder 1 is moved along the +z axis, the control device 7 supplies control signals to the power supply 6 for causing the power supply 6 to apply voltages to the plurality of planary-driven actuators 2 placed in parallel with each other. Thus, the plurality of planary-driven actuators 2 placed in parallel with each other are controlled by the control device 7 such that the respective driving arm portions 2a-1 are bent and displaced along the +z axis substantially at the same time, thereby moving the lens holder 1. In this case, voltages having different values from each other are applied to the planary-driven actuator 2 placed at the lower portion and the conductive polymer actuator 2 placed at the upper portion. It is necessary to control with the control device 7 so as to apply voltages from the power supply 6, such that the respective driving arm portions 2a-1 of the planary-driven actuator 2 placed at the lower portion are bent and displaced along the +z axis substantially at the same time, while following the bending of the respective driving arm portion 2a-1 of the planary-driven actuator 2 placed at the upper portion. Also, it is necessary to control with the control device 7 such that the planary-driven actuator 2 placed at the lower portion follows movement of the lens holder 1 along the +z axis, without applying a voltage from the power supply 6 to the planary-driven actuator 2 placed at the lower portion. When no voltage is applied from the power supply 6 to the planary-driven actuator 2 placed at the lower portion and the planary-driven actuator 2 placed at the upper portion, the lens holder 1 is displaced to the initial position defined by the plurality of planary-driven actuators 2 placed in parallel with each other and is held at the initial position.

With this structure, it is possible to realize the lens holder driving device 151E capable of applying voltages from the power supply 6 through control of the operation thereof with the control device 7, only when bending substantially at the same time the respective driving arm portions 2a-1 of the plurality of planary-driven actuators 2 placed in parallel with each other for displacing the lens holder 1 along the optical axis, and thus capable of driving with low power consumption. Further, it is possible to realize the lens holder driving device 151E capable of controlling the voltages applied to the planary-driven actuators 2 from the power supply 6 with the control device 7 for automatically controlling the amount of bend and displacement of the respective driving arm portions 2a-1 of the planary-driven actuators 2 so as to properly control the amount of movement of the lens holder 1 along the optical axis. Furthermore, the respective voltages applied to the plurality of planary-driven actuators 2 placed in parallel with each other are independently controlled by the control device 7. It is thus possible to realize the lens holder driving device 151E capable of positioning the lens holder 1 (accordingly, the lens 9) along the optical axis according to the amount of bend and displacement of the respective driving arm portions 2a-1 of the plurality of planary-driven actuators 2 placed in parallel with each other.

Figure 38A:
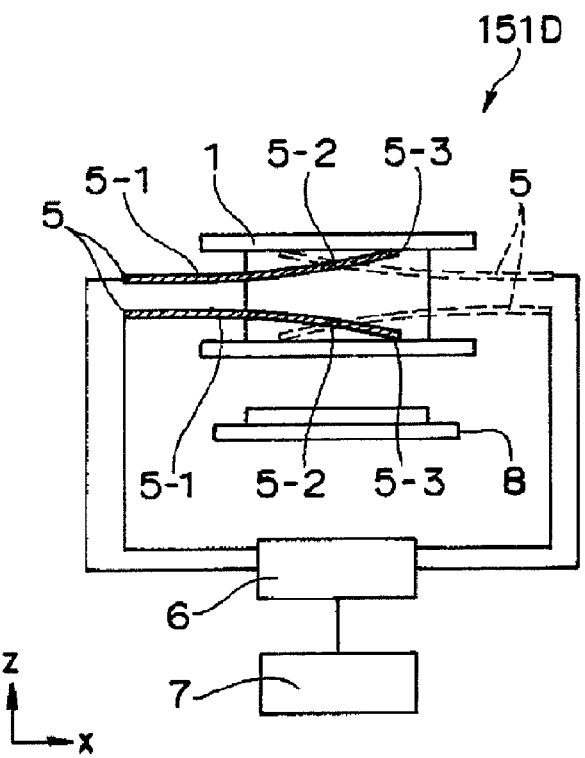
FIG. 38A is a side view illustrating an initial position of the lens holder in the lens holder driving device according to the third embodiment of the present invention, including a control device for controlling such that voltages are applied from a power supply to the planary-driven actuators only when bending the driving arm portions of the planary-driven actuators, with the position of an image pickup device being illustrated for the purpose of reference.

FIG. 38A is a side view illustrating an initial position of the lens holder 1 in the lens holder driving device 151D. In this case, the power supply 6 for applying voltages to the planary-driven actuators 5 which are the conductive polymer actuators in the lens holder driving device 151D described in the third embodiment of the present invention is connected thereto. Further, the control device 7 is connected to the power supply, 6, wherein the control device 7 supplies control signals to the power supply 6 only when bending substantially at the same time the respective driving arm portions 5-1 of the planary-driven actuators 5 which are the conductive polymer actuators.

Firstly, in order to hold the lens holder 1 at the initial position, the control device 7 supplies control signals to the power supply 6 for causing the power supply 6 to apply voltages to the planary-driven actuators 5 which are the plurality of conductive polymer actuators placed in parallel with each other. Thus, the control device 7 controls such that the respective driving arm portions 5-1 are bent and displaced substantially at the same time, until the free-end side contact portions 5-3 of the respective driving arm portions 5-1 of the plurality of planary-driven actuators 5 which are the conductive polymer actuators come into contact with the upper and lower flange portions 1a of the lens holder 1. In this case, voltages with different polarities are applied to the planary-driven actuator 5 which is the upper conductive polymer actuator and the planary-driven actuator 5 which is the lower conductive polymer actuator. Further, the same control is performed to hold the lens holder 1 at the initial position also in the case of employing the conductive polymer actuators 5 bent with a desired curvature configured such that the two conductive polymer films 5a and the separator 5b are bonded to one another by thermally and compressively attaching the respective components to one another in a state of having a curvature.

Figure 38B:
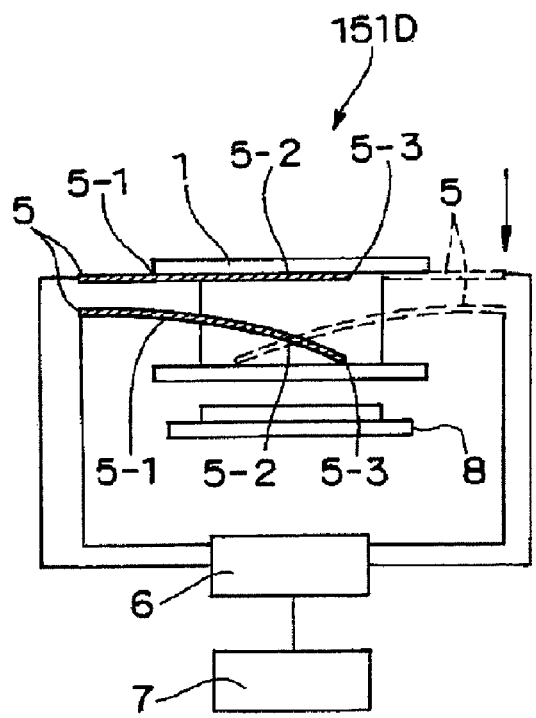
FIG. 38B is a side view illustrating displacement of the lens holder along the −z axis in the lens holder driving device according to the third embodiment of the present invention, including the control device, with the position of an image pickup device being illustrated for the purpose of reference.

As illustrated in FIG. 38B, when the lens holder 1 is moved along the −z axis, the control device 7 supplies control signals to the power supply 6 for causing the power supply 6 to apply voltages to the plurality of planary-driven actuators 5 placed in parallel with each other. Thus, the control device 7 controls such that the planary-driven actuator 5 placed at the upper portion and the planary-driven actuator 5 placed at the lower portion are bent and displaced along the −z axis, substantially at the same time. In this case, voltages having the same value can be applied to the planary-driven actuator 5 placed at the upper portion and the planary-driven actuator 5 placed at the lower portion. When application of the voltages from the power supply 6 is stopped, the lens holder 1 is held in the state of being displaced along the −z axis.

When the lens holder 1 is restored to the initial position, the control device 7 supplies control signals to the power supply 6 for causing the power supply 6 to apply voltages to the planary-driven actuators 5 which are the plurality of conductive polymer actuators placed in parallel with each other. Thus, the control device 7 controls such that the planary-driven actuator 5 placed at the upper portion and the planary-driven actuator 5 placed at the lower portion are bent and displaced along the +z axis substantially at the same time. In this case, voltages having the same value can be applied to the planary-driven actuator 5 placed at the upper portion and the planary-driven actuator 5 placed at the lower portion.

Figure 38C:
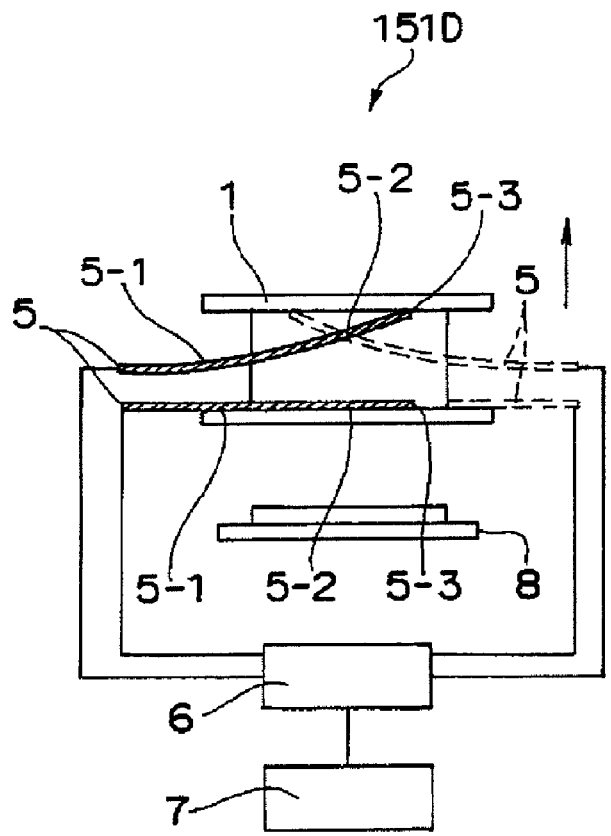
FIG. 38C is a side view illustrating displacement of the lens holder along the +z axis in the lens holder driving device according to the third embodiment of the present invention, including the control device, with the position of an image pickup device being illustrated for the purpose of reference.

As illustrated in FIG. 38C, when the lens holder 1 is moved along the +z axis, the control device 7 supplies control signals to the power supply 6 for causing the power supply 6 to apply voltages to the planary-driven actuators 5 which are the plurality of conductive polymer actuators placed in parallel with each other. Thus, the control device 7 controls such that the planary-driven actuator 5 placed at the upper portion and the planary-driven actuator 5 placed at the lower portion are bent and displaced along the +z axis, substantially at the same time. In this case, voltages having the same value can be applied to the planary-driven actuator 5 placed at the upper portion and the planary-driven actuator 5 placed at the lower portion. When application of the voltages from the power supply 6 is stopped, the lens holder 1 is held in the state of being displaced along the +z axis.

When the lens holder 1 is restored to the initial position, the control device 7 supplies control signals to the power supply 6 for causing the power supply 6 to apply voltages to the planary-driven actuators 5 which are the plurality of conductive polymer actuators placed in parallel with each other. Thus, the control device 7 controls such that the planary-driven actuator 5 placed at the upper portion and the planary-driven actuator 5 placed at the lower portion are bent and displaced along the −z axis, substantially at the same time. In this case, voltages having the same value can be applied to the planary-driven actuator 5 placed at the upper portion and the planary-driven actuator 5 placed at the lower portion.

With this structure, since the planary-driven actuators 5 are constituted by the plurality of conductive polymer actuators placed in parallel with each other, it is possible to realize the lens holder driving device 151D capable of holding the position of the lens holder 1 along the optical axis even when application of the voltages from the power supply 6 is stopped after the lens holder 1 is displaced along the optical axis by the planary-driven actuators 5. Further, it is possible to realize the lens holder driving device 151D capable of applying voltages from the power supply 6 only when bending substantially at the same time the respective driving arm portions 5-1 of the planary-driven actuators 5 which are the plurality of conductive polymer actuators placed in parallel with each other for displacing the lens holder 1 along the optical axis, and thus capable of driving with low power consumption. Further, it is possible to realize the lens holder driving device 151D capable of controlling with the control device 7 the voltages applied from the power supply to the planary-driven actuators 5 which are the conductive polymer actuators for controlling the amount of bend and displacement of the respective driving arm portions 5-1 of the planary-driven actuators 5 which are the conductive polymer actuators so as to control the amount of movement of the lens holder 1 along the optical axis. Moreover, it is possible to realize the lens holder driving device 151D capable of controlling the voltages applied to the planary-driven actuators 5 which are the plurality of conductive polymer actuators placed in parallel with each other for positioning the lens holder 1 along the optical axis according to the amount of bend and displacement of the respective driving arm portions 5-1 of the planary-driven actuators 5 which are the plurality of conductive polymer actuators placed in parallel with each other.

Fifth Embodiment

Figure 39A:
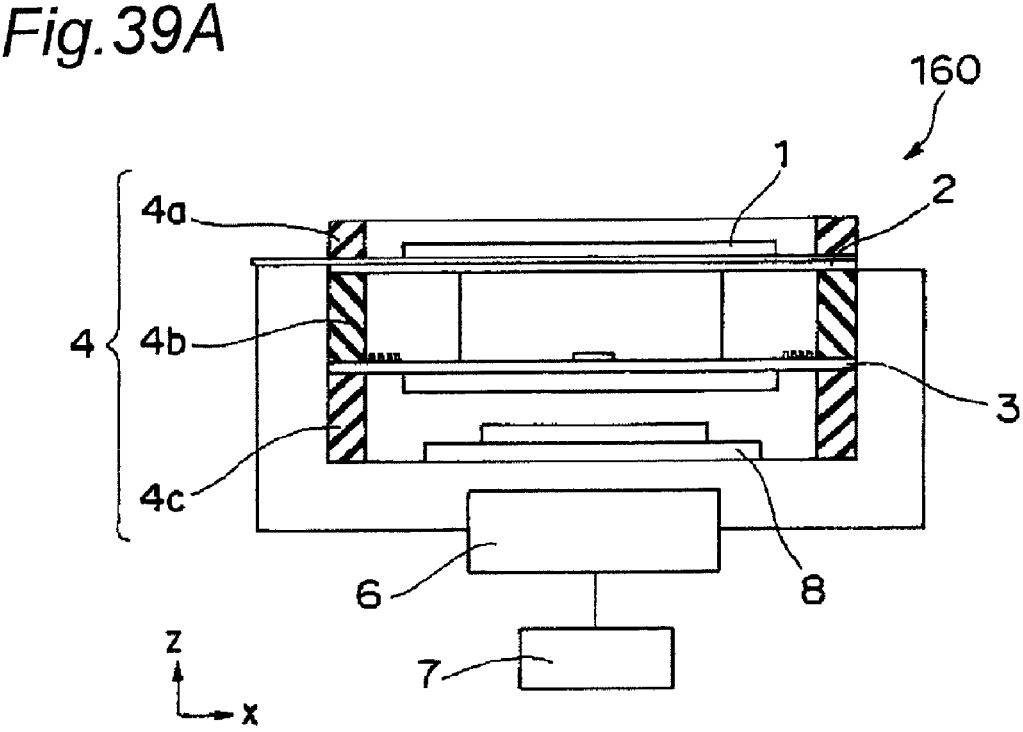
FIG. 39A is a partial cross-sectional side view of an image pickup unit including the lens holder driving device according to the first embodiment of the present invention, a lens, and an image pickup device capable of capturing images of objects formed by the lens.
Figure 39B:
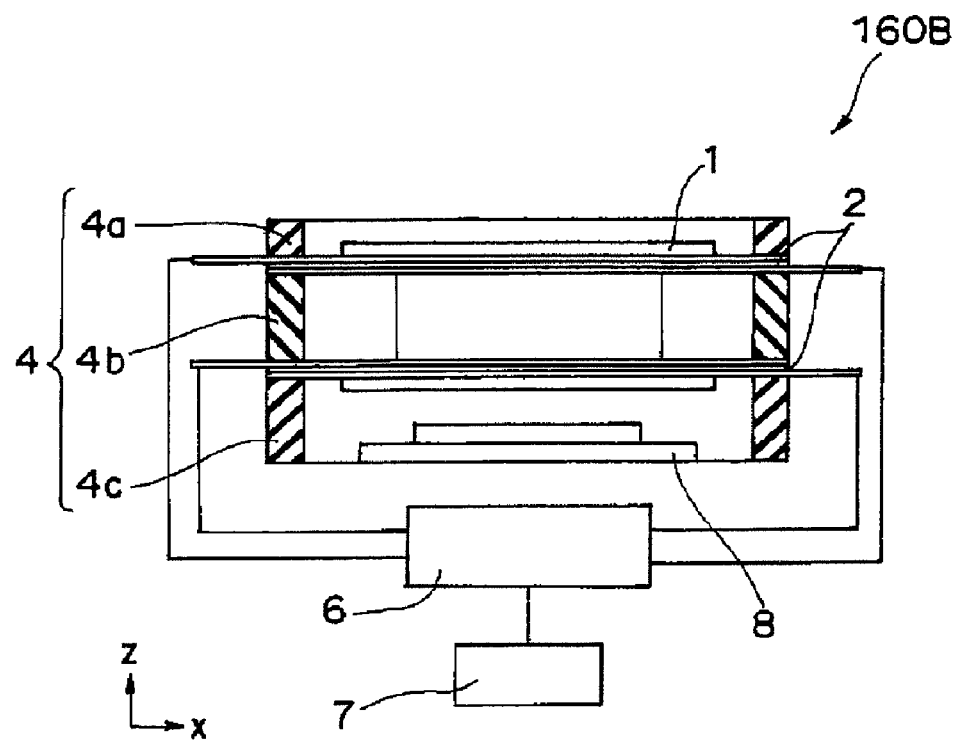
FIG. 39B is a partial cross-sectional side view of an image pickup unit including the lens holder driving device according to the second embodiment of the present invention, a lens, and an image pickup device capable of capturing images of objects formed by the lens.
Figure 39C:
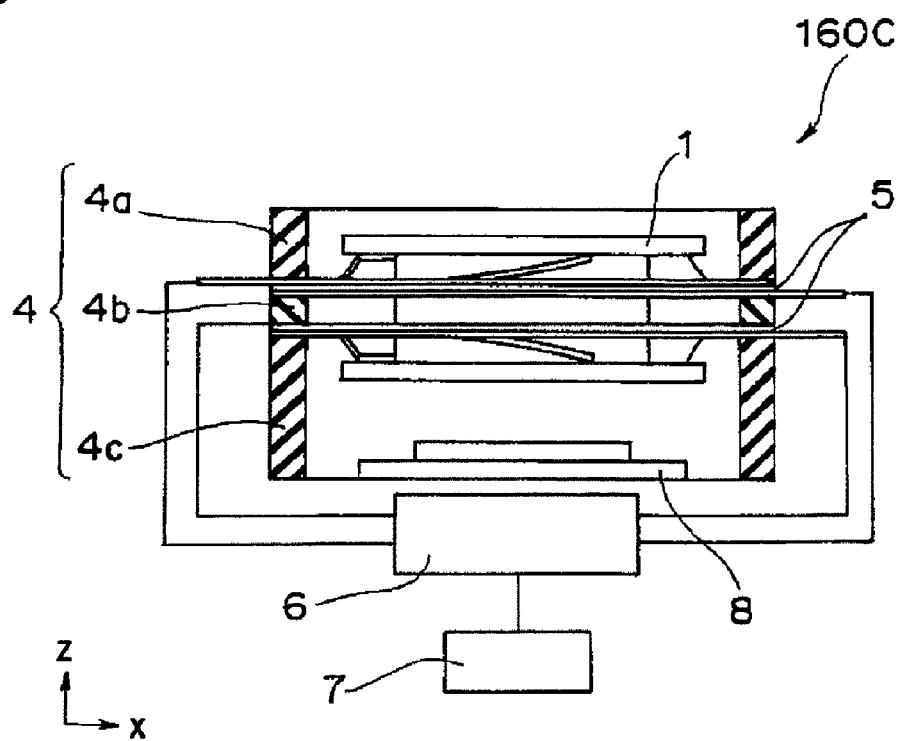
FIG. 39C is a partial cross-sectional side view of an image pickup unit including the lens holder driving device according to the third embodiment of the present invention, a lens, and an image pickup device capable of capturing images of objects formed by the lens.

FIGS. 39A to 39C illustrate side views of an image pickup unit 160 having a characteristic as follows (a cross-sectional view of only the fixing frame member). This characteristic is that it includes the lens holder driving device 151, 151-1, 151-2, 151-3, 151A, 151B-1, 151B-2, 151B-3, 151C or 131D according to the first to fourth embodiments of the present invention, and an image pickup device 8 for capturing images of objects formed by the lens 9 held in the lens holder driving device.

FIG. 39A is a side view of the image pickup unit 160. In this case, a power supply 6 for applying a voltage to the planary-driven actuator 2 in the lens holder driving device 151, 151-1, 151-2, 151-3 or 151A described in the first embodiment of the present invention is connected thereto. Further, a control device 7 is connected to the power supply 6, wherein the control device 7 supplies control signals to the power supply 6 only when bending substantially at the same time the respective driving arm portions 2a-1 of the planary-driven actuator 2 (the above structures except the control device 7 correspond to those of the lens holder driving device 151). Further, the image pickup device 8 is placed on the bottom surface of the lower fixing frame 4c.

With this structure, it is possible to control with the control device 7 the voltage applied from the power supply 6 to the planary-driven actuator 2 for controlling the amount of bend and displacement of the respective driving arm portions 2a-1 of the planary-driven actuator 2 so as to control the amount of movement of the lens holder 1 along the +z axis. Further, it is possible to realize the image pickup unit 160 including the lens holder driving device capable of driving the lens holder 1 in a state where the lens holder 1 is restrained in a plane intersecting with the direction of the optical axis, and also capable of controlling the amount of voltage applied from the power supply 6 to the planary-driven actuator 2 for positioning the lens holder 1 along the optical axis. Further, it is possible to realize the image pickup unit 160 including the lens holder driving device capable of applying a voltage from the power supply 6 only when bending substantially at the same time the respective driving arm portions 2a-1 of the planary-driven actuator 2 for displacing the lens holder 1 along the +z axis, and thus capable of driving with low power consumption.

FIG. 39B is a side view of an image pickup device 160B. In this case, a power supply 6 for applying voltages to the first planary-driven actuator 2 and the second planary-driven actuator 92 in the lens holder driving device 151B-1, 151B-2 or 151B-3 according to the second embodiment of the present invention is connected thereto. Further, a control device 7 is connected to the power supply 6, wherein the control device 7 supplies control signals to the power supply 6 only when bending substantially at the same the respective driving arm portions 2*a*-1 of the planary-driven actuators 2 and 92 (the above structures except the control device 7 correspond to those of the lens holder driving device 151E). Further, the image pickup device 8 is placed on the bottom surface of the lower fixing frame 4*c*.

With this structure, the voltages applied from the power supply 6 to the plurality of planary-driven actuators 2 placed in parallel with each other are individually controlled by the control device 7, thereby controlling the amount of bend and displacement of the respective driving arm portions 2*a*-1 of the plurality of planary-driven actuators 2 placed in parallel with each other. It is thus possible to determine the amount of movement of the lens holder 1 along the optical axis and the position of the lens holder 1 along the optical axis, thereby realizing the image pickup unit 160B including the lens holder driving device capable of driving the lens holder 1 in a state where the lens holder 1 is restrained in a plane intersecting with the direction of the optical axis. Further, it is possible to realize the image pickup unit 160B including the lens holder driving device capable of applying voltages from the power supply 6 only when bending substantially at the same time the respective driving arm portions 2*a*-1 of the planary-driven actuators 2 for displacing the lens holder 1 along the optical axis, and thus capable of driving with low power consumption.

FIG. 39C is a side view of an image pickup unit 160C. In this case, a power supply 6 for applying voltages to the planary-driven actuators 5 which are the plurality of conductive polymer actuators placed in parallel with each other in the lens holder driving device 151C described in the third embodiment of the present invention is connected thereto. Further, a control device 7 is connected to the power supply 6, wherein the control device 7 supplies control signals to the power supply 6 only when bending substantially at the same the respective driving arm portions 5-1 of the planary-driven actuators 5 which are the conductive polymer actuators (the above structures except the control device 7 correspond to those of the lens holder driving device 151C). Further, the image pickup device 8 is placed on the bottom surface of the lower fixing frame 4*c*.

With this structure, it is possible to realize the image pickup device 161C including the lens holder driving device 151C capable of holding the position of the lens holder 1 along the optical axis even when application of the voltages from the power supply 6 is stopped after the lens holder 1 is displaced along the optical axis by the planary-driven actuators 5 which are the plurality of conductive polymer actuators placed in parallel with each other. Further, it is possible to control with the control device 7 so as to apply voltages with different polarities from the power supply 6 to the planary-driven actuators 5 which are the plurality of conductive polymer actuators placed in parallel with each other for controlling the amount of bend and displacement of the respective driving arm portions 5-1 of the planary-driven actuators 5 which are the plurality of conductive polymer actuators placed in parallel with each other. It is thus possible to determine the amount of movement of the lens holder 1 along the optical axis and the position of the lens holder 1 along the optical axis, thereby realizing the image pickup device 160C including the lens holder driving device 151C capable of driving the lens holder 1 in a state where the lens holder 1 is restrained in a plane intersecting with the direction of the optical axis. Further, it is possible to realize the image pickup device 160C including the lens holder driving device capable of applying voltages from the power supply 6 only when bending substantially at the same time the respective driving arm portions 5-1 of the planary-driven actuators 5 which are the conductive polymer actuators for displacing the lens holder 1 along the optical axis, and thus capable of driving with less power consumption.

Sixth Embodiment

Figure 40:
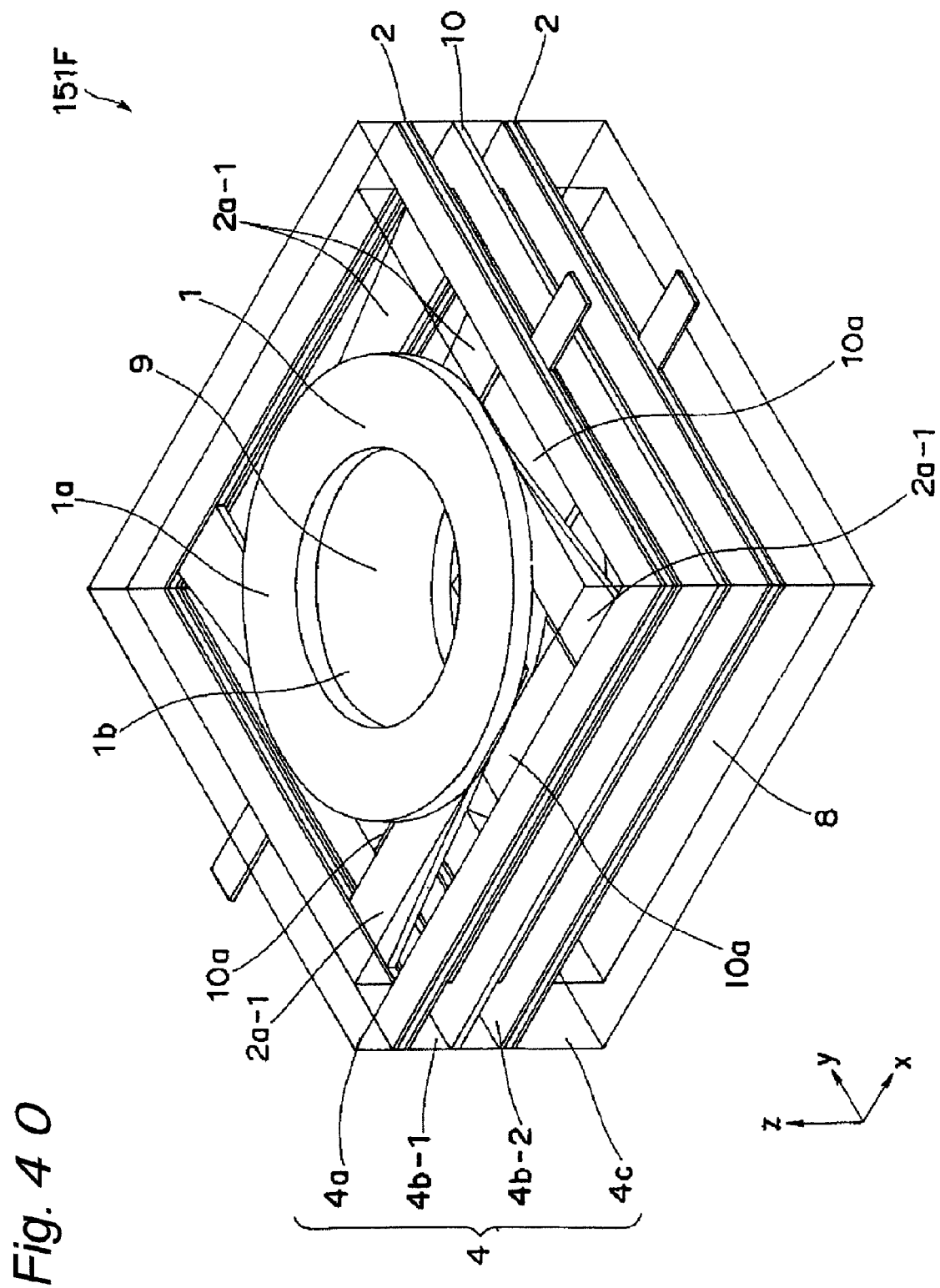
FIG. 40 is a perspective view of a lens holder driving device employing planary-driven actuators according to a sixth embodiment of the present invention, in a state of incorporating an image pickup device and being viewed only through a fixing frame member.

FIG. 40 is a perspective view of a lens holder driving device 151F employing planary-driven actuators according to the sixth embodiment of the present invention. The lens holder driving device 151F illustrated in FIG. 40 is structured to include a lens holder 1, a plurality of planary-driven actuators 2, an intermediate plate 10, and a fixing frame member 4. The lens holder 1 holds at least a single lens 9 for capturing images of objects, which is not illustrated, and also has flange portions 1*a* at its opposite end portions along the optical axis. The plurality of planary-driven actuators 2 are characterized in including driving arm portions 2*a*-1 having free-end side contact portions 2*a*-3 and lens holder support points 2*a*-2 for holding the outer surface of the cylindrical body portion 1*b* of the lens holder 1 at a plurality of positions opposing to each other. The intermediate plate 10 functions as an example of a lens holder disengagement-prevention/contact-prevention member for preventing disengagement of the lens holder 1 and for preventing contact between the free-end side contact portions 2*a*-3 in the plurality of planary-driven actuators 2 or as an example of a contact prevention member for preventing contact between the free-end side contact portions 2*a*-3 in the plurality of planary-driven actuators 2. The fixing frame member 4 has an upper fixing frame 4*a*, a first and second middle fixing frames 4*b*-1 and 4*b*-2, and a lower fixing frame 4*c* which form the outer surfaces of the lens holder driving device 151F and fix the respective components. An image pickup device 8 can be incorporated in the lower portion of the lens holder driving device 151F within the fixing frame member 4 to form an image pickup unit. Also, in the case of employing the intermediate plate 10 as an example of the contact prevention member, the upper fixing frame 4*a* and the lower fixing frame 4*c* can be provided with flange portions so as to have the function of preventing disengagement of the lens holder separately from the intermediate plate 10. However, in view of the number of members, it is more preferable to employ the intermediate plate 10 as a lens holder disengagement-prevention/contact-prevention member, since this can eliminate necessity for placing an additional disengagement prevention member, thereby reducing the number of members.

In order to fix the intermediate plate 10, the middle fixing frame 4*b* is divided into two parts which are the first middle fixing frame 4*b*-1 and the second middle fixing frame 4*b*-2, and the intermediate plate 10 is sandwiched and fixed between the first middle fixing frame 4*b*-1 and the second middle fixing frame 4*b*-2.

Figure 41:
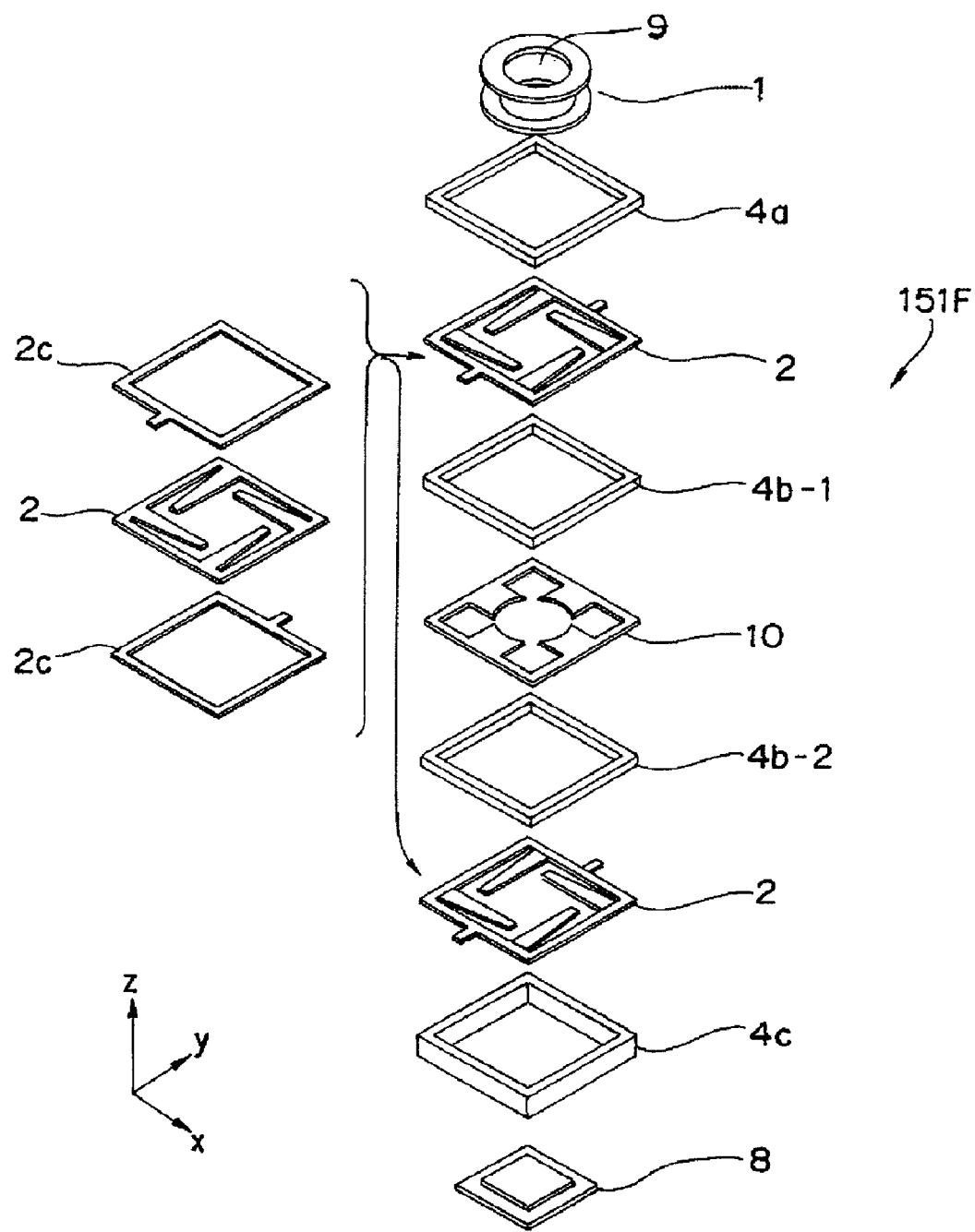
FIG. 41 is an exploded perspective view of the components of the lens holder driving device employing the planary-driven actuators in FIG. 40 according to the sixth embodiment of the present invention in a state where an image pickup device is incorporated therein.

FIG. 41 illustrates an exploded perspective view of the components of the lens holder driving device 151F employing the above planary-driven actuators according to the sixth embodiment of the present invention of FIG. 40.

Further, the same components as those of the first to third embodiments, out of the respective components of the sixth embodiment, will be designated by the same reference characters as those of the first to third embodiments and will not be described. The respective components are sized similarly to in the first embodiment, but only the fixing frame member 4 has different sizes. The upper fixing frame 4a, the first middle fixing frame 4b-1, the second middle fixing frame 4b-2, and the lower fixing frame 4c are sized such that, for example, their thicknesses are 1 mm, 1.2 mm, 1.2 mm, and 2.35 mm, in the mentioned order, the outer shapes of their square frame portions have a size of 14 mm at each single side, and the inner edges of their square frame portions have a size of 12 mm at each single side.

Figure 42:
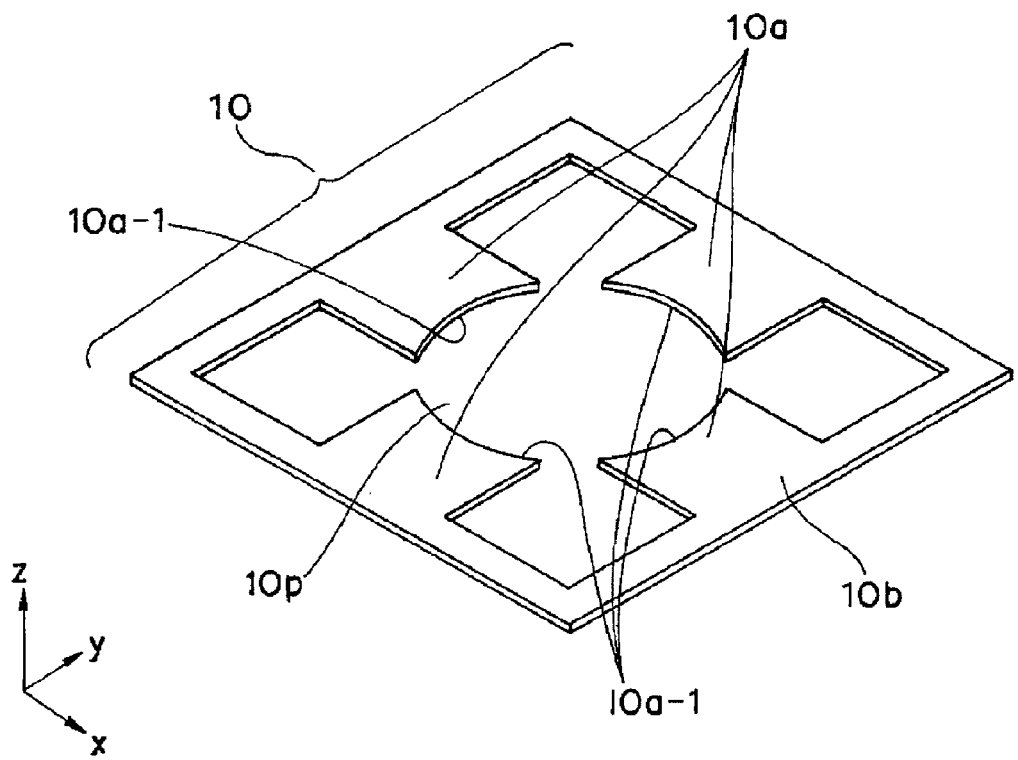
FIG. 42 is a perspective view of an intermediate plate in the lens holder driving device employing the planary-driven actuators in FIG. 40 according to the sixth embodiment of the present invention.

FIG. 42 illustrates a perspective view of the intermediate plate 10. The intermediate plate 10 is a rectangular-shaped thin plate having the same outer shape as that of the other members. Further, the intermediate plate 10 is structured to include lens-holder retaining portions 10a and a rectangular-frame-shaped bonding portion 10b. The lens-holder retaining portions 10a are protruded at 90-degrees intervals toward the center so as to be engaged with the flange portions 1a of the lens holder 1, and further have curved concave portions 10a-1 capable of forming gaps to an extent of inducing no contact friction with the outer surface of the cylindrical body portion 1b of the lens holder 1 so as to also function as an example of the contact prevention portions. The rectangular-frame-shaped bonding portion 10b is sandwiched between the first middle fixing frame 4b-1 and the second middle fixing frame 4b-2. Inside the four curved concave portions 10a-1, there is formed a circular-shaped through hole 10p which allows the cylindrical body portion 1b of the lens holder 1 to penetrate therethrough. As a more concrete example, the intermediate plate 10 is sized such that its thickness is 0.2 mm, the outer shape of its square frame portion has a size of 14 mm at each single side, the inner edge of its square frame portion has a size of 12 mm at each single side, and the curved concave portions 10a-1 in the lens holder retaining portions 10a have an inner diameter of 7.2 mm. In this case, the curved concave portions 10a-1 in the lens holder retaining portions 10a in the intermediate plate 10 have an inner diameter, which is determined such that movement of the lens holder 1 along the optical axis by the planary-driven actuators 2 is not obstructed by the contact friction between the lens holder 1 and the curved concave portions 10a-1 in the lens holder retaining portion 10a in the intermediate plate 10. The intermediate plate 10 is adapted such that its lens holder retaining portions 10a can engage with the flange portions 1a of the lens holder 1 for holding the lens holder 1, in a case where a sudden impact acts on the lens holder driving device 151F to prevent the respective driving arm portions 2a-1 of the planary-driven actuators 2 from holding the lens holder 1. There is thus provided the advantage that the lens holder 1 is prevented from disengaging from the lens holder driving device 151F. Further, there is provided the advantage that the lens holder retaining portions 10a of the intermediate plate 10 prevent the upper and lower free-end side contact portions 2a-3 from coming into contact with each other to induce a short circuit, when the respective driving arm portions 2a-1 of the plurality of planary-driven actuators 2 placed in parallel with each other are largely bent or when an impact acts on the =ens holder driving device 151F. The intermediate plate 10 is required to be made of an insulation material in order to prevent occurrence of short circuits due to contact between the free-end side contact portions 2a-3 of the plurality of planary-driven actuators placed in parallel with each other. Further, the intermediate plate 10 is preferably made of a material with a degree of flexibility in order to enable during assembling the lens holder retaining portions 10a to be bent for allowing one of the flange portions 1a of the lens holder 1 to be inserted through the through hole 10p and for allowing the cylindrical body portion 1b of the lens holder 1 to be held in the through hole 10p. As a specific material for the intermediate plate 10, it is possible to employ a resin material such as an ABS resin, a polyvinyl chloride, or PET (Polyethylene Terephthalate), because of the ease of processing thereof, but the material is not limited to the above. The intermediate plate 10 can also be integrated with the first and second middle fixing frames 4b-1 and 4b-2.

Figure 43A:
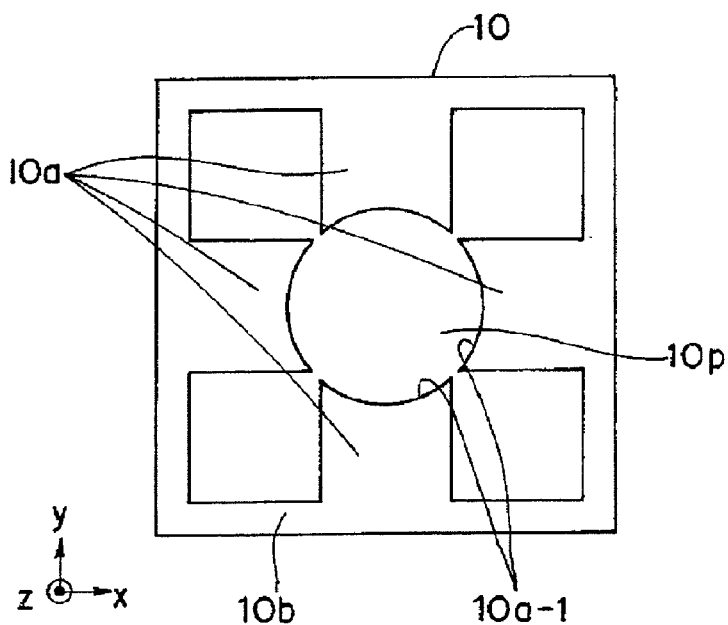
FIG. 43A is a plan view of the intermediate plate in the lens holder driving device employing the planary-driven actuators in FIG. 40 according to the sixth embodiment of the present invention.
Figure 43B:
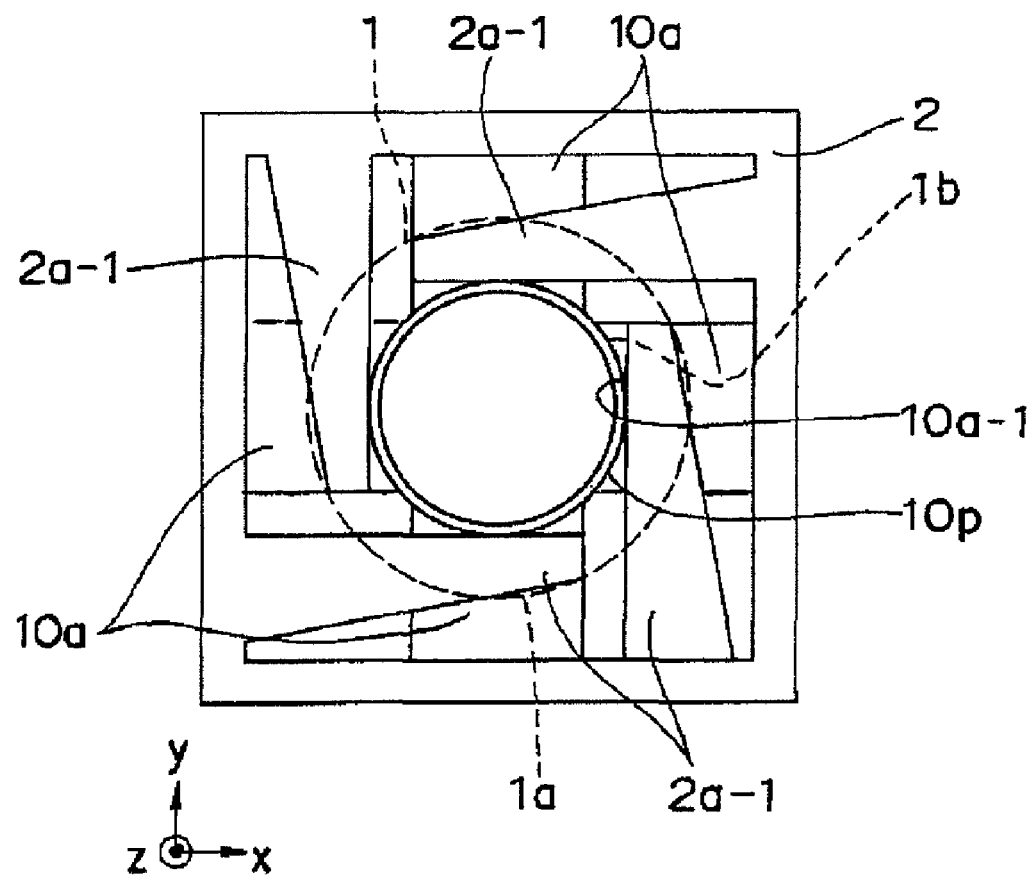
FIG. 43B is a plan view of the placement of the lens holder, the planary-driven actuators, and the intermediate plate, in the lens holder driving device employing the planary-driven actuators in FIG. 40 according to the sixth embodiment of the present invention.

FIG. 43A and FIG. 43B illustrate a plan view of the intermediate plate 10 and a plan view of the placement of the lens holder 1, the planary-driven actuators 2, and the intermediate plate 10, respectively. FIG. 43A is a plan view of the intermediate plate 10. The intermediate plate 10 is structured by forming arm shapes forming the lens holder retaining portions 10a and protruded at a plurality of opposing positions (positions at 90-degrees intervals in FIG. 43A) on the rectangular-frame-shaped bonding portion 10b. In this case, the number of the arms which form the lens holder retaining portions 10a is not limited to four as illustrated in the drawing. FIG. 43B illustrates a plan view of the placement of the lens holder 1, the planary-driven actuators 2, and the intermediate plate 10. The lens holder 1 is restricted in movement at the positions where the flange portions 1a of the lens holder 1 contact with the lens holder retaining portions 10a of the intermediate plate 10, when the lens holder 1 is moved along the optical axis (along the z axis) (the direction penetrating through the paper surface in FIG. 43B), by the lens holder retaining portions 10a of the intermediate plate 10. Further, in a case where a sudden impact acts on the lens holder 1, the lens holder driving device 151F, or the image pickup unit, the flange portions 1a of the lens holder 1 come into contact with the lens holder retaining portions 10a of the intermediate plate 10, and thus are engaged and held by the lens holder retaining portions 10a, thereby offering the advantage of the prevention of disengagement thereof from the fixing frame member 4.

Figure 44:
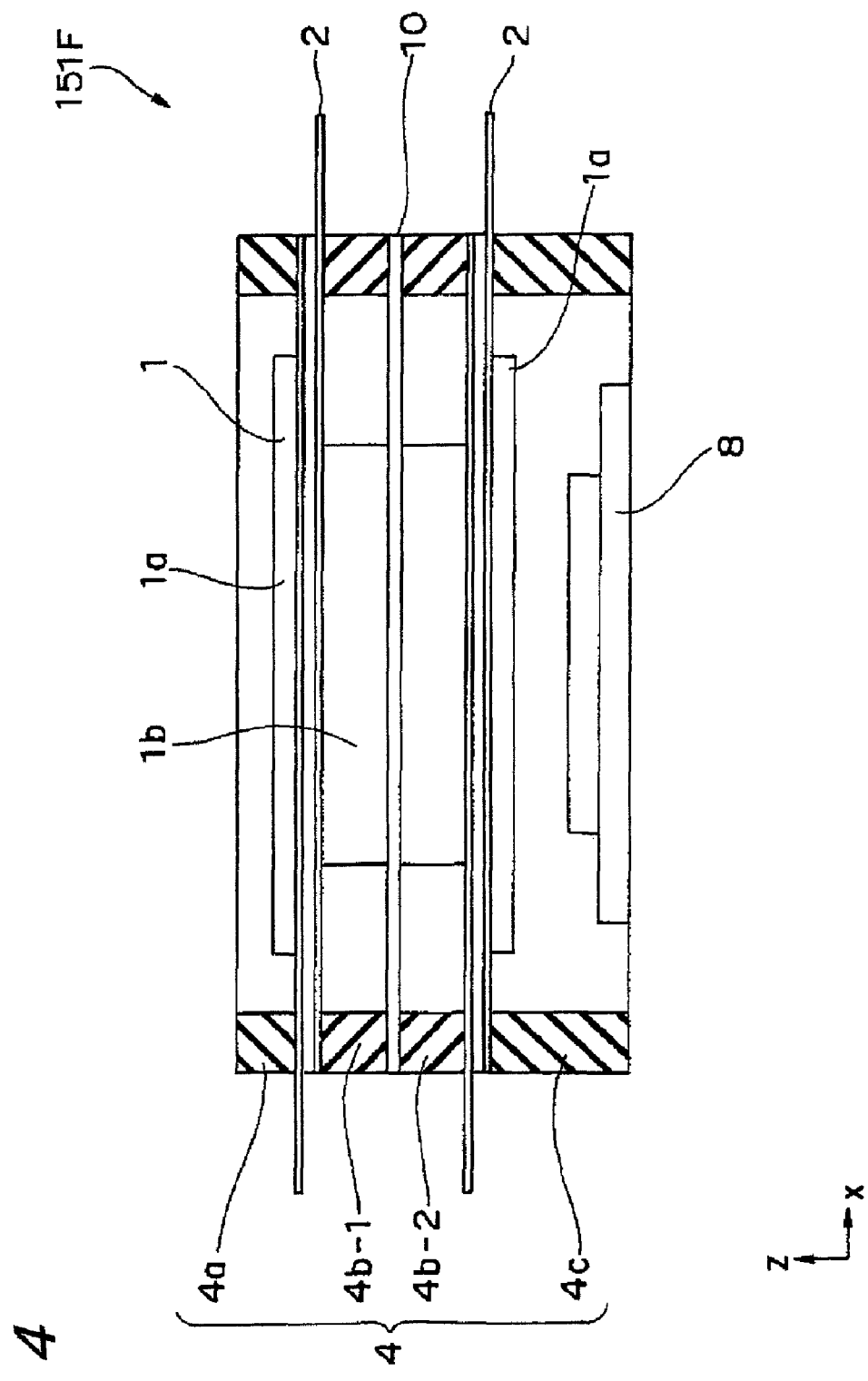
FIG. 44 is a partial cross-sectional side view of the lens holder driving device employing the planary-driven actuators according to the sixth embodiment of the present invention, in a state where an image pickup device is incorporated therein.

FIG. 44 illustrates a side view of the lens holder driving device 151F employing the planary-driven actuators, according to the sixth embodiment of the present invention (a cross sectional view of only the fixing frame member). In this case, the plurality of planary-driven actuators 2 are placed in parallel with each other so as to contact with the upper and lower flange portions 1a of the lens holder 1, thereby restricting the initial position of the lens holder 1 along the optical axis. The lens holder 1 having the flange portions 1a is sandwiched between the plurality of planary-driven actuators 2, and the respective components are bonded to one another through the upper fixing frame 4a, the first middle fixing frame 4b-1, the intermediate plate 10, the second middle fixing frame 4b-2, and the lower fixing frame 4c to realize the lens holder driving device 151F. An image pickup device 8 can be incorporated in the lower portion of the lens holder driving device 151F within the fixing frame member 4 to form an image pickup unit.

Figure 45A:
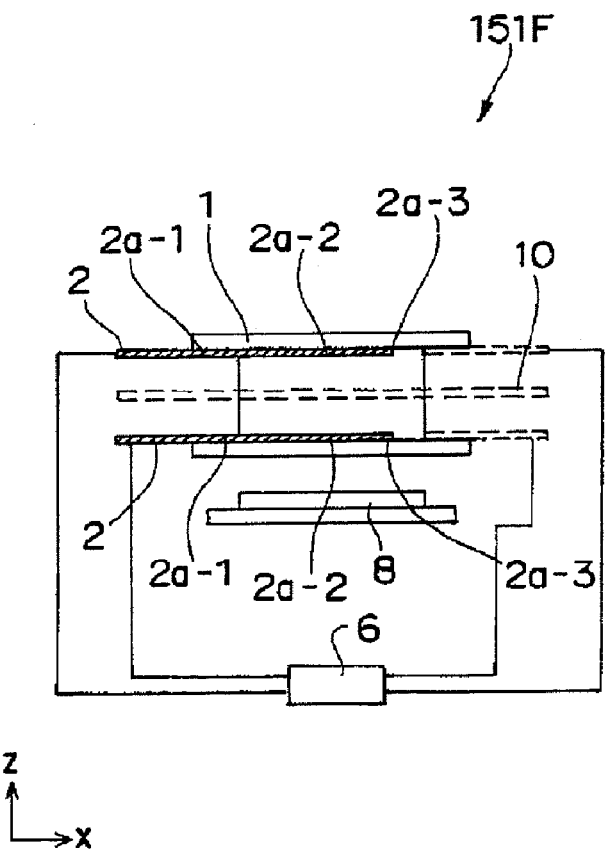
FIG. 45A is a side view schematically illustrating the lens holder driving device employing the planary-driven actuators according to the sixth embodiment of the present invention, with the position of an image pickup device being illustrated for the purpose of reference, and also illustrating a state where no voltage is applied from a power supply to the planary-driven actuators.
Figure 45B:
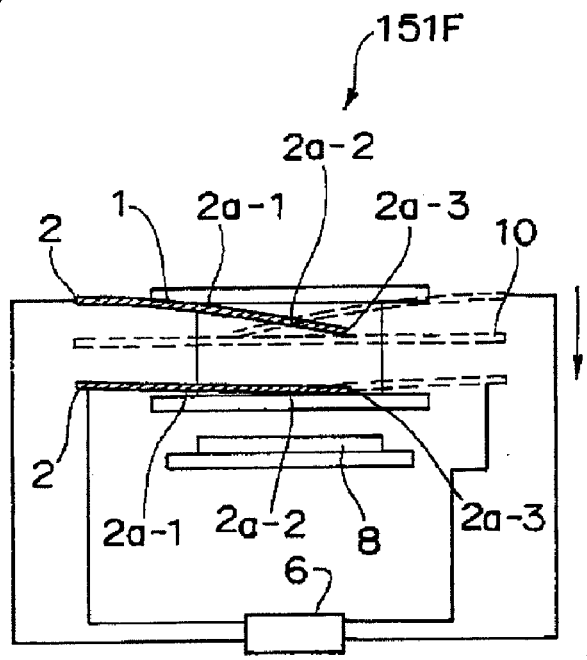
FIG. 45B is a side view schematically illustrating the lens holder driving device employing the planary-driven actuators according to the sixth embodiment of the present invention, with the position of an image pickup device being illustrated for the purpose of reference, and also illustrating a state where voltages are applied from the power supply to the planary-driven actuators, and thus the lens holder has been displaced along the −z axis.
Figure 45C:
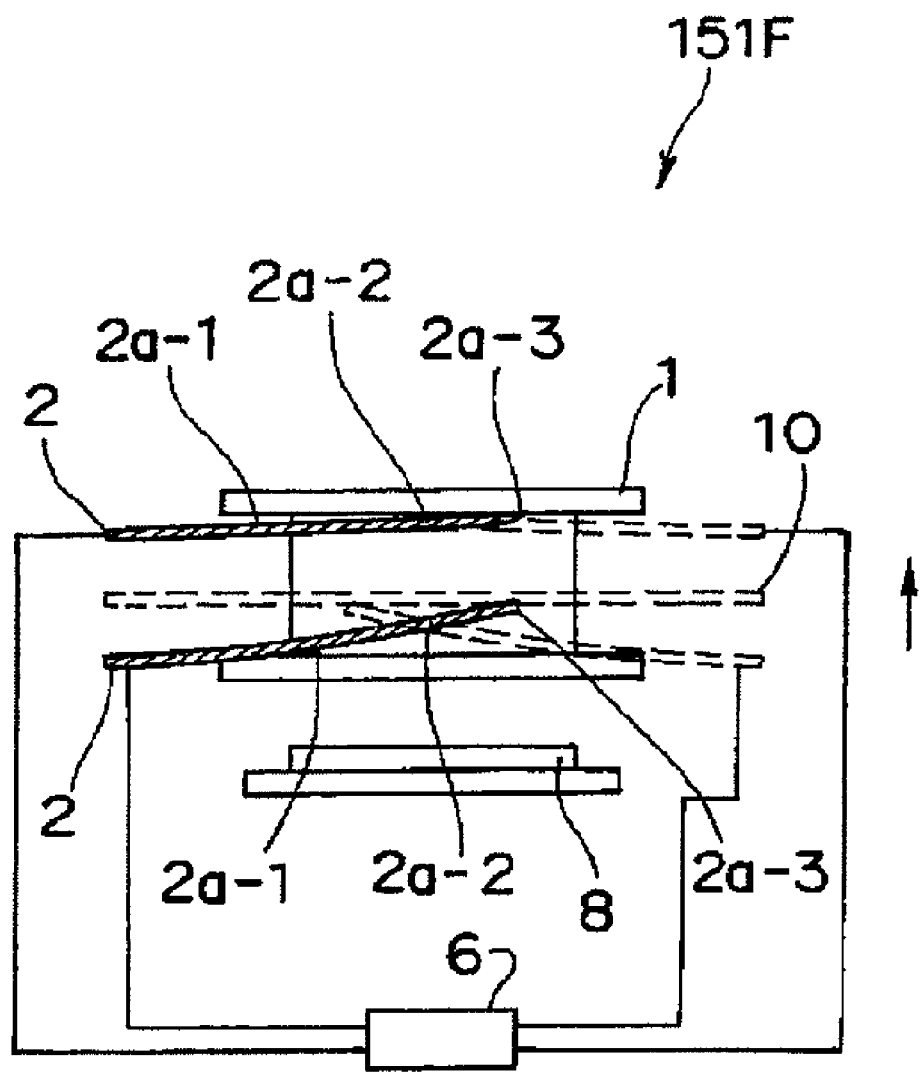
FIG. 45C is a side view schematically illustrating the lens holder driving device employing the planary-driven actuators according to the sixth embodiment of the present invention, with the position of an image pickup device being illustrated for the purpose of reference, and also illustrating a state where voltages are applied from the power supply to the planary-driven actuators, and thus the lens holder has been displaced along the +z axis.

FIGS. 45A to 45C are side views schematically illustrating a method for driving the lens holder driving device 151F employing the planary-driven actuators, according to the sixth embodiment of the present invention.

FIG. 45A illustrates a state where no voltage is applied to the planary-driven actuators 2 from a power supply 6, and thus the planary-driven actuators 2 are at the initial position.

In this case, the lens holder 1 is restricted in position in a plane intersecting with the direction of the optical axis, by the lens holder support point 2a-2 of the respective driving arm portions 2a-1 of the plurality of planary-driven actuators 2 placed in parallel with each other. Further, the initial position of the lens holder 1 is restricted along the optical axis, by the free-end side contact portions 2a-3 of the respective driving arm portions 2a-1 in the plurality of planary-driven actuators 2 placed in parallel with each other. In this case, the upper and lower flange portions 1a of the lens holder 1 are not coupled and secured to the free-end side contact portions 2a-3 of the upper and lower planary-driven actuators 2 placed in parallel with each other. This enables utilizing to a maximum extent the bend and displacement of the respective driving arm portions 2a-1 of the planary-driven actuators 2 for moving the lens holder 1 along the optical axis. Accordingly, it is possible to increase the ranges within which the respective driving arm portions 2a-1 are movable, in comparison with cases where the respective free-end side contact portions 2a-3 of the planary-driven actuators 2 are coupled and secured to the upper and lower flange portions 1a of the lens holder 1.

FIG. 45B illustrates a state where voltages are applied, from the power supply 6, to the upper and lower planary-driven actuator 2 placed in parallel with each other, and thus the lens holder 1 has been moved along the −z axis (along a downward arrow).

Due to the applied voltage from the power supply 6, the respective driving arm portions 2a-1 of the planary-driven actuator 2 placed at the lower portion in FIG. 45B are driven, so that the free-end side contact portions 2a-3 of the respective driving arm portions 2a-1 in the planary-driven actuator 2 placed at the lower portion in FIG. 45B move the lens holder 1 along the −z axis, while contacting with the upper surface of the lower flange portion 1a of the lens holder 1. Further, it is necessary that, through application of the voltage from the power supply 6, the respective driving arm portions 2a-1 of the planary-driven actuator 2 placed at the upper portion are driven, such that the respective driving arm portions 2a-1 of the planary-driven actuator 2 placed at the upper portion are bent and displaced, such that contact of their base-end side portions with the edge of the upper flange portion 1a of the lens holder 1 is a lower limit, and also contact of their free-end side contact portions 2a-3 with the intermediate plate 10 is an upper limit. Therefore, voltages having different values are applied to the planary-driven actuators 2 placed at the upper and lower portions. Also, it is possible to forcibly bend the respective driving arm portions 2a-1 of the upper planary-driven actuator 2 so as to follow movement of the lens holder 1 along the −z axis, without applying a voltage from the power supply 6 to the upper planary-driven actuator 2. When the lens holder 1 is displaced along the −z axis, the lower surface of the upper planary-driven actuator 2 is charged at a positive potential, while the upper surface of the lower planary-driven actuator 2 is charged at a negative potential. In this case, due to the intermediate plate 10 installed between the upper and lower planary-driven actuators 2, even when the upper planary-driven actuator 2 is largely bent or an impact acts on the entire lens holder driving device 151F to deform the upper planary-driven actuator 2, there is provided the advantage of the prevention of short circuits due to contact between the lower surface of the upper planary-driven actuator 2 and the upper surface of the lower planary-driven actuator 2. In this case, even in a state where the lens holder 1 has been displaced along the −z axis, the lens holder 1 is restricted in position, in a plane intersecting with the direction of the optical axis, by the lens holder support points 2a-2 of the respective driving arm portions 2a-1 of the plurality of planary-driven actuators 2 placed in parallel with each other. When application of the voltages to the plurality of planary-driven actuators 2 placed in parallel with each other is stopped, this causes the lens holder 1 to be displaced to be brought into the above initial position in FIG. 45A and to be kept at this position.

FIG. 45C illustrates a state where voltages are applied, from the power supply 6, to the upper and lower planary-driven actuator 2 placed in parallel with each other, and thus the lens holder 1 has been moved along the +z axis (along an upward arrow).

Due to the applied voltage from the power supply 6, the respective driving arm portions 2a-1 of the planary-driven actuator 2 placed at the upper portion in FIG. 45C are driven, so that the free-end side contact portions 2a-3 of the respective driving arm portions 2a-1 in the planary-driven actuator 2 placed at the upper portion in FIG. 45C move the lens holder 1 along the +z axis, while contacting with the lower surface of the upper flange portion 1a of the lens holder 1. Further, it is necessary that, through application of the voltage from the power supply 6, the respective driving arm portions 2a-1 of the planary-driven actuator 2 placed at the lower portion are driven, such that the respective driving arm portions 2a-1 of the planary-driven actuator 2 placed at the lower portion are bent and displaced, such that contact of their base-end side portions with the edge of the lower flange portion 1a of the lens holder 1 is a lower limit, and also contact of their free-end side contact portions 2a-3 with the intermediate plate 10 is an upper limit. Therefore, voltages having different values are applied to the planary-driven actuators 2 placed at the upper and lower portions. Also, it is possible to forcibly bend the respective driving arm portions 2a-1 of the lower planary-driven actuator 2 so as to follow movement of the lens holder 1 along the +z axis, without applying a voltage from the power supply 6 to the lower planary-driven actuator 2. When the lens holder 1 is displaced along the +z axis, the upper surface of the lower planary-driven actuator 2 is charged at a positive potential, while the lower surface of the upper planary-driven actuator 2 is charged at a negative potential. In this case, due to the intermediate plate 10 installed between the upper and lower planary-driven actuators 2, even when the lower planary-driven actuator 2 is largely bent or even when an impact acts on to the entire lens holder driving device 151F to deform the lower planary-driven actuator 2, there is provided the advantage of the prevention of short circuits due to contact between the upper surface of the lower planary-driven actuator 2 and the lower surface of the upper planary-driven actuator 2. In this case, even in a state where the lens holder 1 has been displaced along the +z axis, the lens holder 1 is restricted in position, in a plane intersecting with the direction of the optical axis, by the lens holder support points 2a-2 of the respective driving arm portions 2a-1 of the plurality of planary-driven actuators 2 placed in parallel with each other. When application of the voltages from the power supply 6 to the plurality of planary-driven actuators 2 placed in parallel with each other is stopped, this causes the lens holder 1 to be displaced to be brought into the above initial position in FIG. 45A and to be kept at this position.

with the structure described above, the upper and lower flange portions 1a of the lens holder 1 are not coupled and secured to the free-end side contact portions 2a-3 of the respective planary-driven actuators 2, which enables utilizing to a maximum extent the bend and displacement of the respective driving arm portions 2a-1 of the planary-driven actuators 2 for moving the lens holder 1 along the optical axis, thereby increasing the amount of movement of the lens holder 1 along the optical axis. Further, the lens holder 1 is restricted in position in a plane intersecting with the direction of the optical axis, and also the plurality of planary-driven actuators 2 are placed in parallel with each other, through the shapes of the respective planary-driven actuators 2. This realizes the lens holder driving device 151F capable of restricting movement of the lens holder 1 only to be along the optical axis, and also capable of increasing the amount of movement of the lens holder 1 along the optical axis. Further, since the intermediate plate 10 is added to the component members, it is possible to realize the lens holder driving device 151F capable of causing the intermediate plate 10 to engage with the lens holder 1 for holding the lens holder 1, thereby preventing the lens holder 1 from disengaging from the lens holder driving device 151F, in a case where a sudden impact acts on the lens holder driving device 151F to prevent the driving arm portions 2a-1 of the planary-driven actuators 2 from holding the lens holder 1. Further, it is possible to realize the lens holder driving device 151F capable of preventing occurrence of short circuits due to contact between the free-end side contact portions 2a-3, when the respective driving arm portions 2a-1 of the plurality of planary-driven actuator 2 placed in parallel with each other are largely bent or when an impact acts on the entire lens holder driving device 151F.

Figure 46:
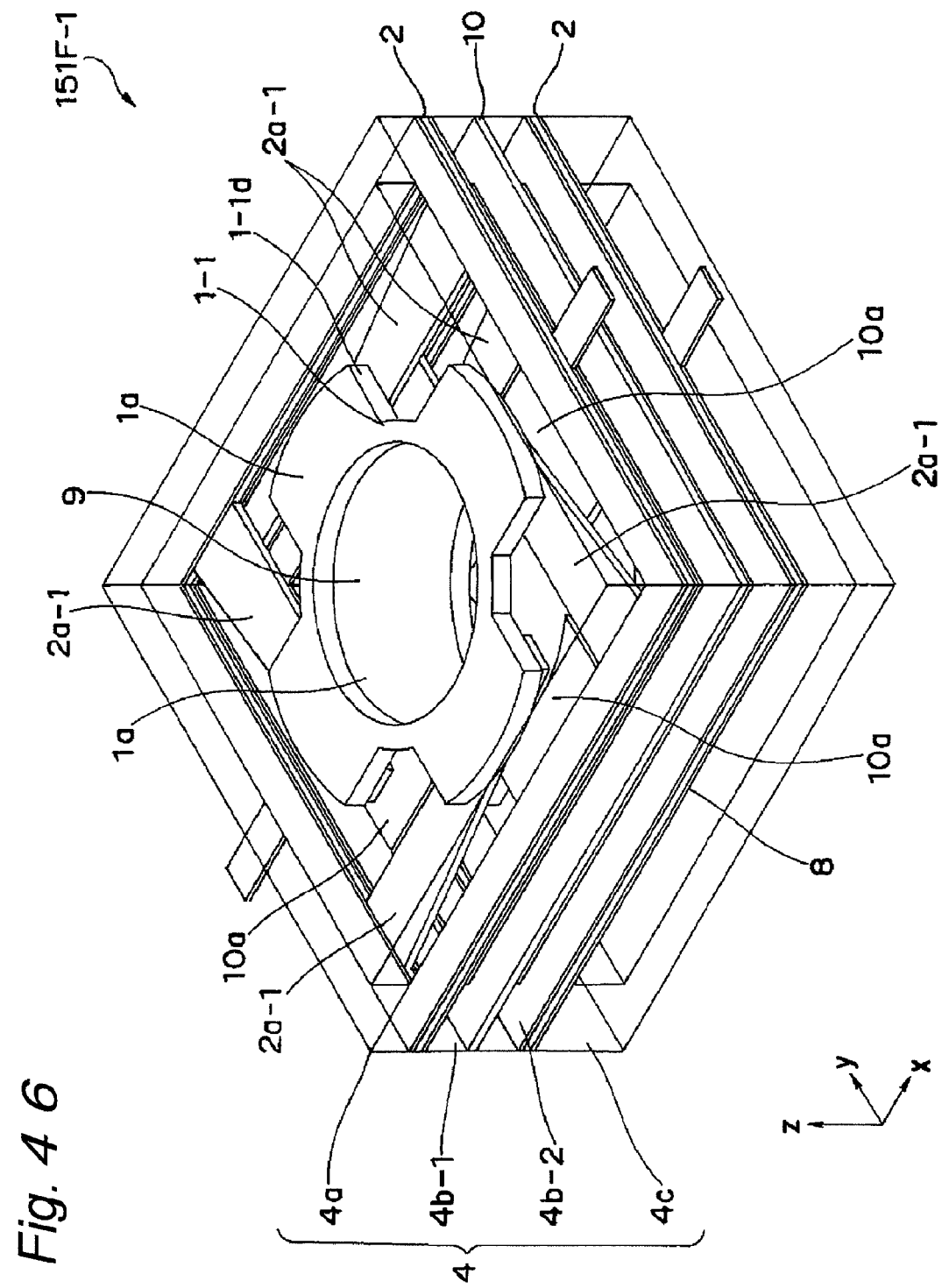
FIG. 46 is a perspective view of the lens holder driving device employing the planary-driven actuators according to the sixth embodiment of the present invention, in a state where the lens holder in FIG. 5A is applied thereto, and it incorporates an image pickup device therein and is viewed only through the fixing frame member.

FIG. 46 is a perspective view of a lens holder driving device 151F-1 according to an example of modification of the lens holder driving device 151F according to the sixth embodiment of the present invention. The lens holder driving device 151F-1 is structured to include the lens holder 1-1 in FIG. 5A, a plurality of planary-driven actuators 2, an intermediate plate 10, and a fixing frame member 4. The lens holder 1-1 in FIG. 5A holds at least a single lens 9 for capturing images of objects, which is not illustrated, and has flange portions at its opposite end portions along the optical axis. The plurality of planary-driven actuators 2 are characterized in having driving arm portions 2a-1 having free-end side contact portions 2a-3 and lens holder support points 2a-2 for holding the outer surface of the cylindrical body portion 1b of the lens holder 1-1 at a plurality of positions opposing to each other. The intermediate plate 10 functions as an example of a lens holder disengagement-prevention/contact-prevention member or a contact prevention member for preventing disengagement of the lens holder 1-1 and for preventing contact between the free-end side contact portions 2a-3 in the plurality of planary-driven actuators 2 placed in parallel with each other. The fixing frame member 4 is constituted by an upper fixing frame 4a, a first and second middle fixing frames 4b-1 and 4b-2, and a lower fixing frame 4c which form the outer surfaces of the lens holder driving device 151F-1 and fix the respective components. An image pickup device 8 can be incorporated in the lower portion of the lens holder driving device 151F-1 within the fixing frame member 4 to form an image pickup unit.

With the structure employing the lens holder 1-1, when the respective driving arm portions 2a-1 of the planary-driven actuators 2 are bent, it is possible to reduce the interference thereof with the flange portions 1a of the lens holder 1. Further, there is provided the advantage of an increase of the ranges within which the respective driving arm portions 2a-1 of the planary-driven actuators 2 are movable. Further, it is possible to prevent disengagement of the lens holder 1 and to prevent contact between the plurality of planary-driven actuators 2 placed in parallel with each other. This realizes the lens holder driving device 151F-1 capable of offering these various advantages.

Figure 47:
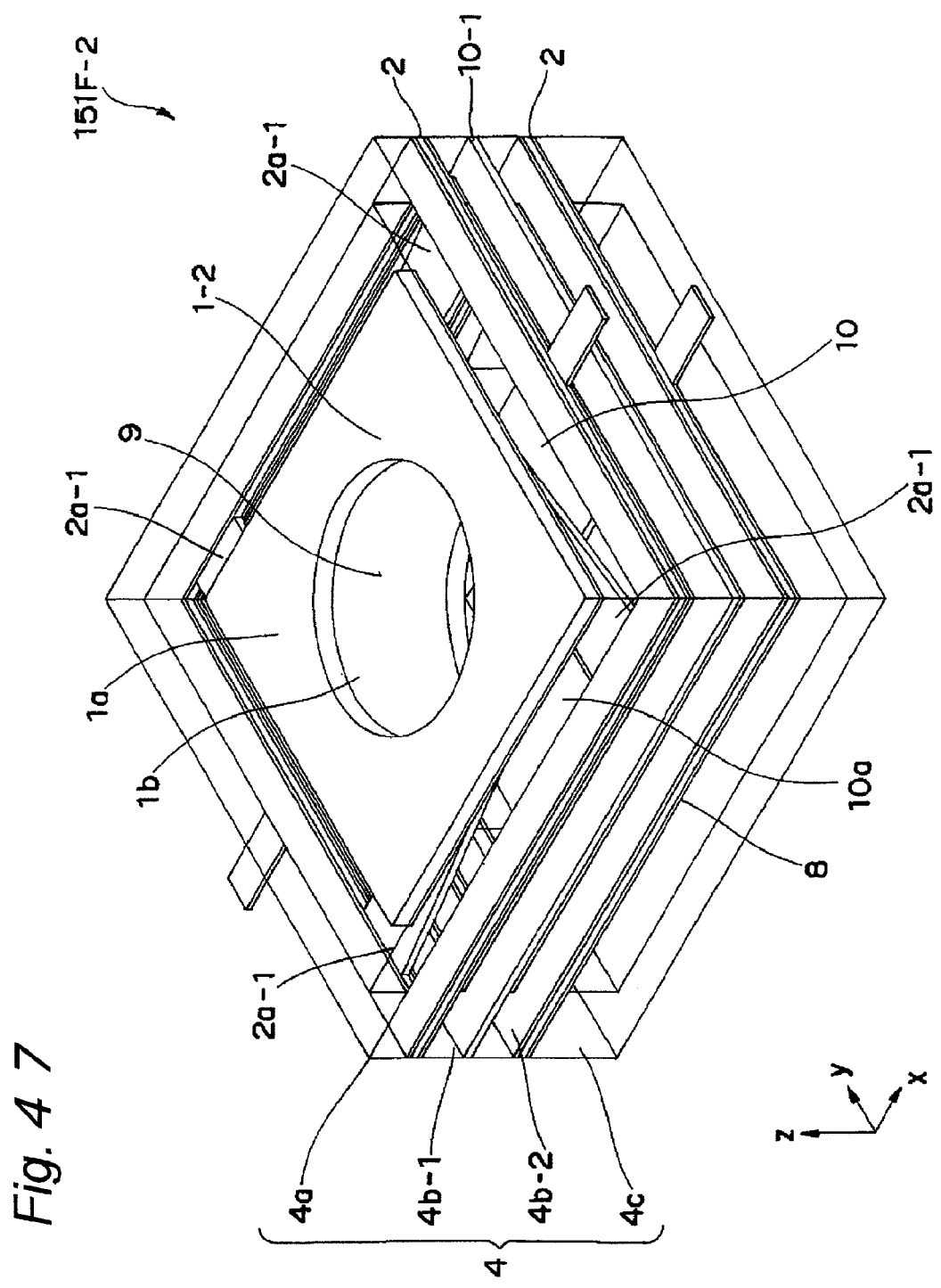
FIG. 47 is a perspective view of the lens holder driving device employing the planary-driven actuators according to the sixth embodiment of the present invention, in a state where the lens holder in FIG. 5B is applied thereto, and it incorporates an image pickup device therein and is viewed only through the fixing frame member.

FIG. 47 is a perspective view of a lens holder driving device 151F-2 according to an example of modification of the lens holder driving device 151F according to the sixth embodiment of the present invention. The lens holder driving device 151F-2 is structured to include the lens holder 1-2 in FIG. 5B, a plurality of planary-driven actuators 2, an intermediate plate 10-1, and a fixing frame member 4. FIG. 47 is a perspective view of an image pickup unit formed by incorporating an image pickup device 8 in the lower portion of the lens holder driving device 151F-2 within the fixing frame member 4. The lens holder 1-2 in FIG. 5B holds at least a single lens 9 for capturing images of objects, which is not illustrated, and has flange portions 1a at its opposite end portions along the optical axis. The plurality of planary-driven actuators 2 are characterized in having driving arm portions 2a-1 having free-end side contact portions 2a-3 and lens holder support points 2a-2 for holding the outer surface of the cylindrical body portion 1b of the lens holder 1-2 at a plurality of positions opposing to each other. The intermediate plate 10-1 functions as an example of a lens holder disengagement-prevention/contact-prevention member or a contact prevention member for preventing disengagement of the lens holder 1-2 and for preventing contact between the plurality of planary-driven actuators 2 placed in parallel with each other. The fixing frame member 4 is constituted by an upper fixing frame 4a, a first and second middle fixing frames 4b-1 and 4b-2, and a lower fixing frame 4c which form the outer shape of the lens holder driving device 151F-2 and fix the respective components.

Figure 48A:
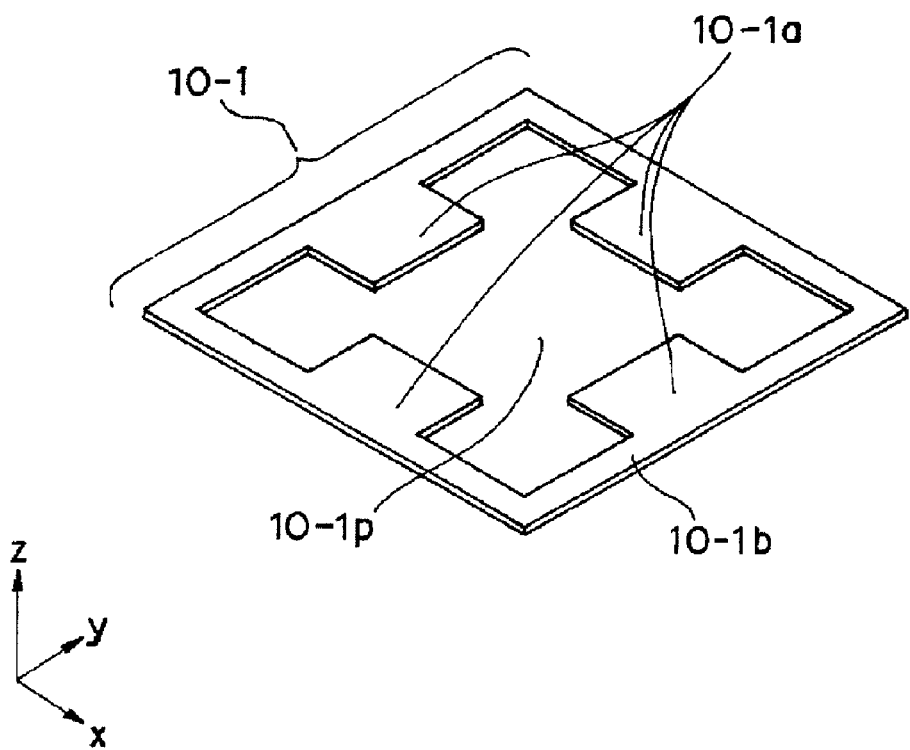
FIG. 48A is a perspective view of an intermediate plate in the lens holder driving device employing the planary-driven actuators according to the sixth embodiment of the present invention.
Figure 48B:
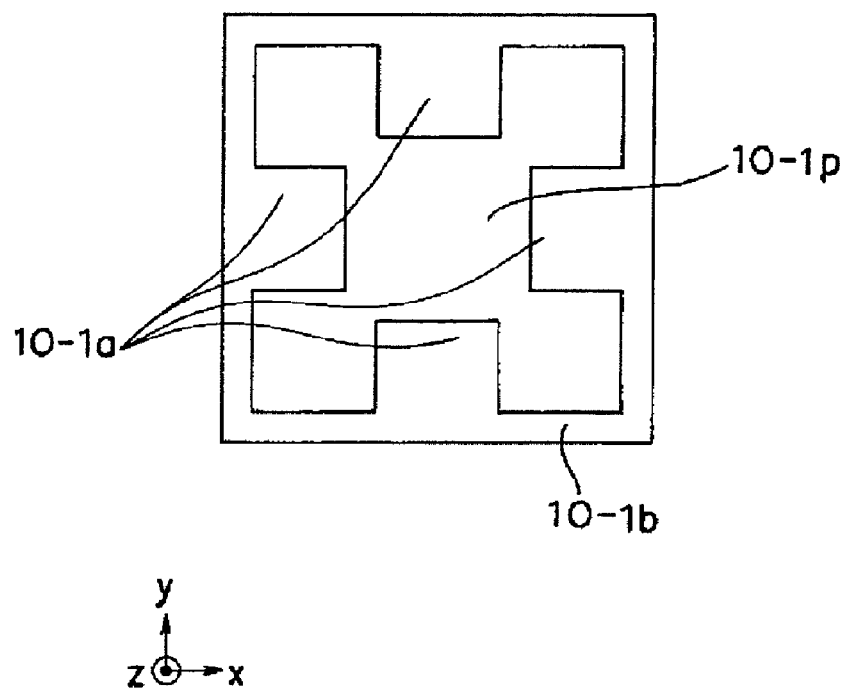
FIG. 48B is a plan view of the intermediate plate in the lens holder driving device employing the planary-driven actuators according to the sixth embodiment of the present invention.

The intermediate plate 10-1 is structured to include lens holder retaining portions 10-1a and a portion 10-1b to be bonded to the fixing frame member 4, similarly to the intermediate plate 10. Further, the lens holder retaining portions 10-1a have a shape conforming to the outer shapes of the lens holders 1-2 and 1-3 in FIG. 5B and FIG. 5C (a rectangular outer shape rather than a circular shape). FIG. 48A and FIG. 48B illustrate a perspective view and a plan view of the same. Accordingly, the four lens holder retaining portions 10-1a form a rectangular-shaped through hole 10-1p unlike the lens holder retaining portions 10a in FIG. 43A and the like.

With this structure, it is possible to move the lens holder 1-2 only along the optical axis, while preventing the lens holder 1-2 from rotating in a plane intersecting with the direction of the optical axis. Accordingly, it is possible to realize the lens holder driving device 151F-2 capable of offering the advantages of the prevention of disengagement of the lens holder 1-2 and the prevention of contact between the plurality of planary-driven actuators 2 placed in parallel with each other, with the intermediate plate 10-1.

Figure 49:
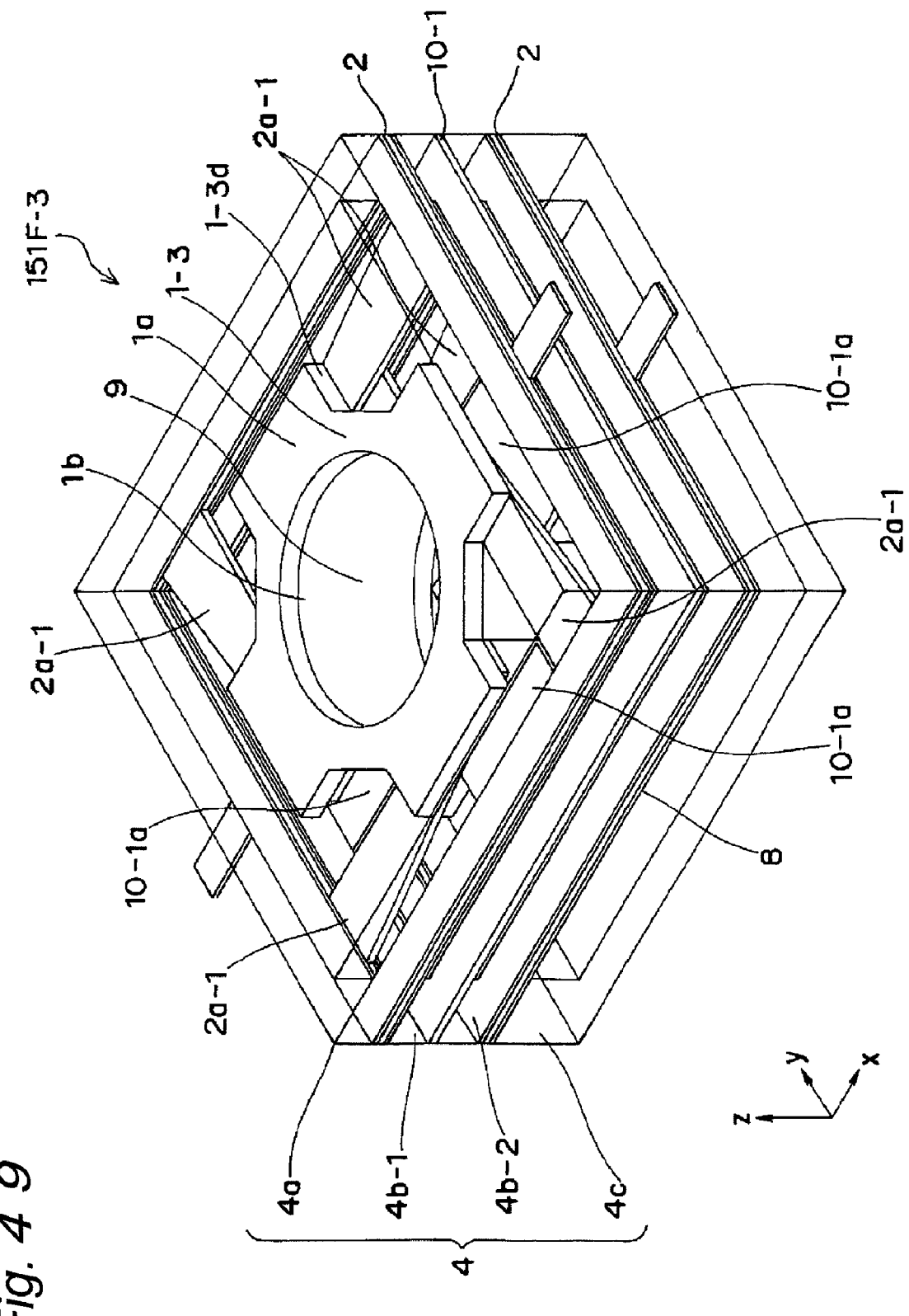
FIG. 49 is a perspective view of the lens holder driving device employing the planary-driven actuators according to the sixth embodiment of the present invention, in a state where the lens holder in FIG. 5C is applied thereto, and it incorporates an image pickup device therein and is viewed only through the fixing frame member.

FIG. 49 is a perspective view of a lens holder driving device 151F-3 according to an example of modification of the lens holder driving device 151F according to the sixth embodiment of the present invention. The lens holder driving device 151F-3 is structured to include the lens holder 1-3 in FIG. 5C, a plurality of planary-driven actuators 2, an intermediate plate 10-1, and a fixing frame member 4. FIG. 49 is a perspective view of an image pickup unit formed by incorporating an image pickup device 8 in the lower portion of the lens holder driving device 151F-3 within the fixing frame member 4. The lens holder 1-3 in FIG. 5C holds at least a single lens 9 for capturing images of objects, which is not illustrated, and has flange portions 1a at its opposite end portions along the optical axis. The plurality of planary-driven actuators 2 are characterized in having driving arm portions 2a-1 having free-end side contact portions 2a-3 and lens holder support points 2a-2 for holding the outer surface of the cylindrical body portion 1b of the lens holder 1-3 at a plurality of positions opposing to each other. The intermediate plate 10-1 functions as an example of a lens holder disengagement-prevention/contact-prevention member or a contact prevention member for preventing disengagement of the lens holder 1-3 and for preventing contact between the plurality of planary-driven actuators 2 placed in parallel with each other. The fixing frame member 4 is constituted by an upper fixing frame 4a, a first and second middle fixing frames 4b-1 and 4b-2, and a lower fixing frame 4c which form the outer shape of the lens holder driving device 151F-3 and fix the respective components.

The intermediate plate 10-1 used in the example of modification of FIG. 49 is the same as the intermediate plate 10-1 in FIG. 48A and FIG. 48B.

With the structure employing the lens holder 1-3, when the respective driving arm portions 2a-1 of the planary-driven actuators 2 are bent, it is possible to reduce the interference thereof with the flange portions 1a of the lens holder 1-3. Further, there is provided the advantage of an increase of the ranges within which the respective driving arm portions 2a-1 of the planary-driven actuators 2 are movable. Further, it is possible to move the lens holder 1-3 only along the optical axis, while preventing the lens holder 1-3 from rotating in a plane intersecting with the direction of the optical axis. Further, it is possible to prevent disengagement of the lens holder 1-3 and to prevent contact between the plurality of planary-driven actuators 2 placed in parallel with each other. This realizes the lens holder driving device 151F-1 capable of offering these various advantages.

Seventh Embodiment

FIG. 50 is a perspective view of a lens holder driving device 151G employing planary-driven actuators which are conductive polymer actuators, according to the seventh embodiment of the present invention. The lens holder driving device 151G illustrated in FIG. 50 is structured to include a lens holder 1, a plurality of planary-driven actuators 5 which are a plurality of conductive polymer actuators, an intermediate plate 10, and a fixing frame member 4. In FIG. 50, an image pickup device 8 can be incorporated in the lower portion of the lens holder driving device 151G within the fixing frame member 4 to form an image pickup unit. The lens holder 1 holds at least a single lens 9 for capturing images of objects, which is not illustrated, and also has flange portions 1a at its opposite end portions along the optical axis. The planary-driven actuators 5 which are the plurality of conductive polymer actuators are characterized in including driving arm portions 5-1 having free-end side contact portions 5-3 and lens holder support points 5-2 for holding the outer surface of the cylindrical body portion 1b of the lens holder 1 at a plurality of positions opposing to each other, and also are characterized in that these driving arm portions 5-1 can be held at a bending state. The intermediate plate 10 functions as an example of a lens holder disengagement-prevention/contact-prevention member or a contact prevention member for preventing disengagement of the lens holder 1 and for preventing contact among the free-end side contact portions 5-3 in the planary-driven actuators 5 which are the plurality of conductive polymer actuators. The fixing frame member 4 is constituted by an upper fixing frame 4a, a first and second middle fixing frames 4b-1 and 4b-2, and a lower fixing frame 4c which form the outer shape of the lens holder driving device 151G and fix the respective components.

Figure 51:
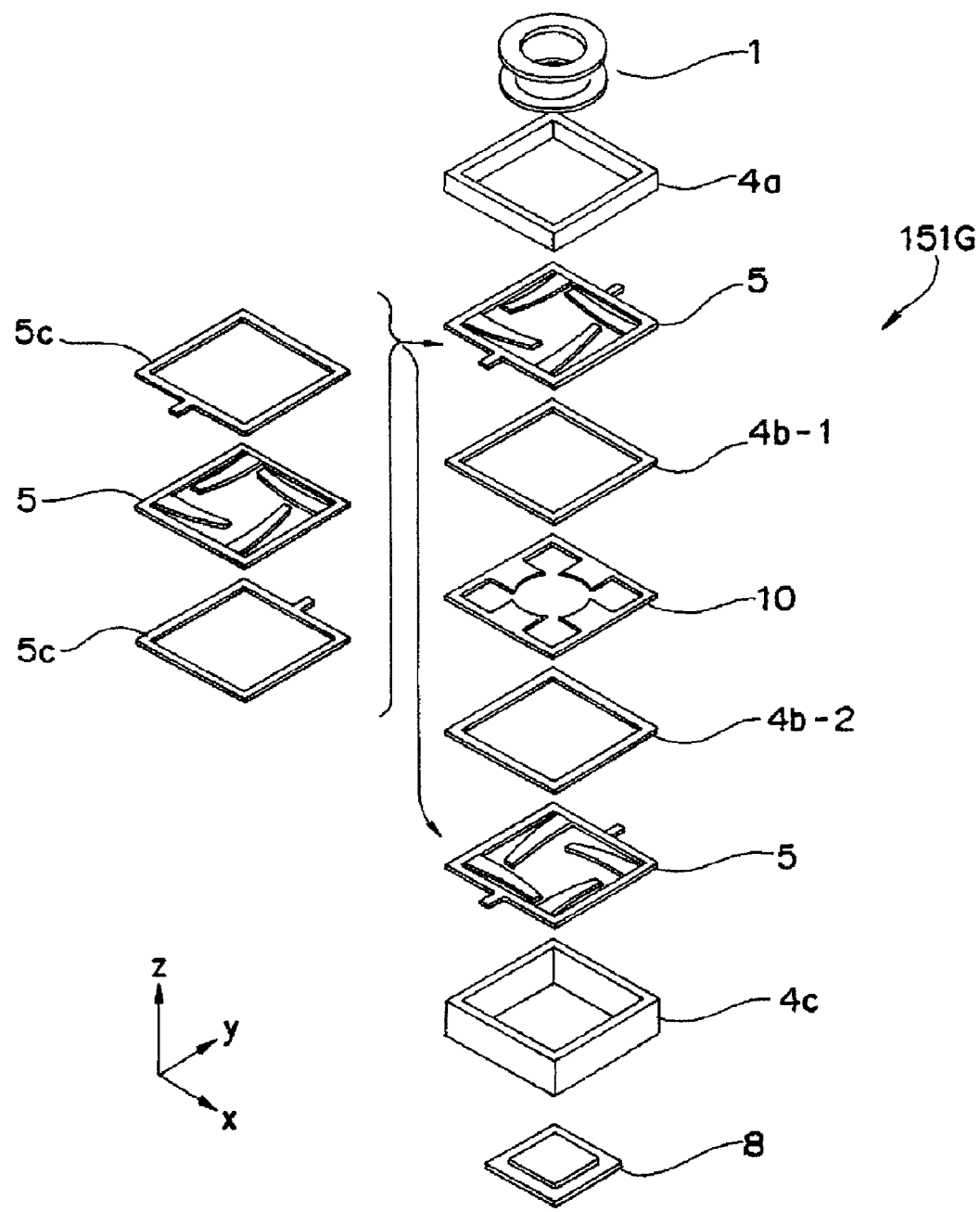
FIG. 51 is an exploded perspective view of the components of the lens holder driving device employing the planary-driven conductive actuators of FIG. 50 which are the conductive polymer actuators, in a state where an image pickup device is incorporated therein according to a seventh embodiment of the present invention.

FIG. 51 illustrates an exploded perspective view of the components of the lens holder driving device 151G employing the planary-driven actuators which are the above conductive polymer actuators in FIG. 50, according to the seventh embodiment of the present invention.

Further, the same components as those of the first to third embodiments and the sixth embodiment, out of the respective components of the seventh embodiment, will be designated by the same reference characters as those of the first to third embodiments and the sixth embodiment and will not be described. The respective components are sized similarly to in the third embodiment, but only the fixing frame member 4 has different sizes. The upper fixing frame 4a, the first middle fixing frame 4b-1, the second middle fixing frame 4b-2, and the lower fixing frame 4c are sized such that, for example, their thicknesses are 2 mm, 0.35 mm, 0.35 mm, and 2.35 mm, in the mentioned order. In the case where their square outer shapes have a size of 14 mm at each single side, and the portion sandwiched between the two electrodes 5c is the portions with a width of 1 mm from the outer shape, the square inner edge of the portion other than the driving arm portions 2a-1 has a size of 12 mm at each single side.

Figure 52:
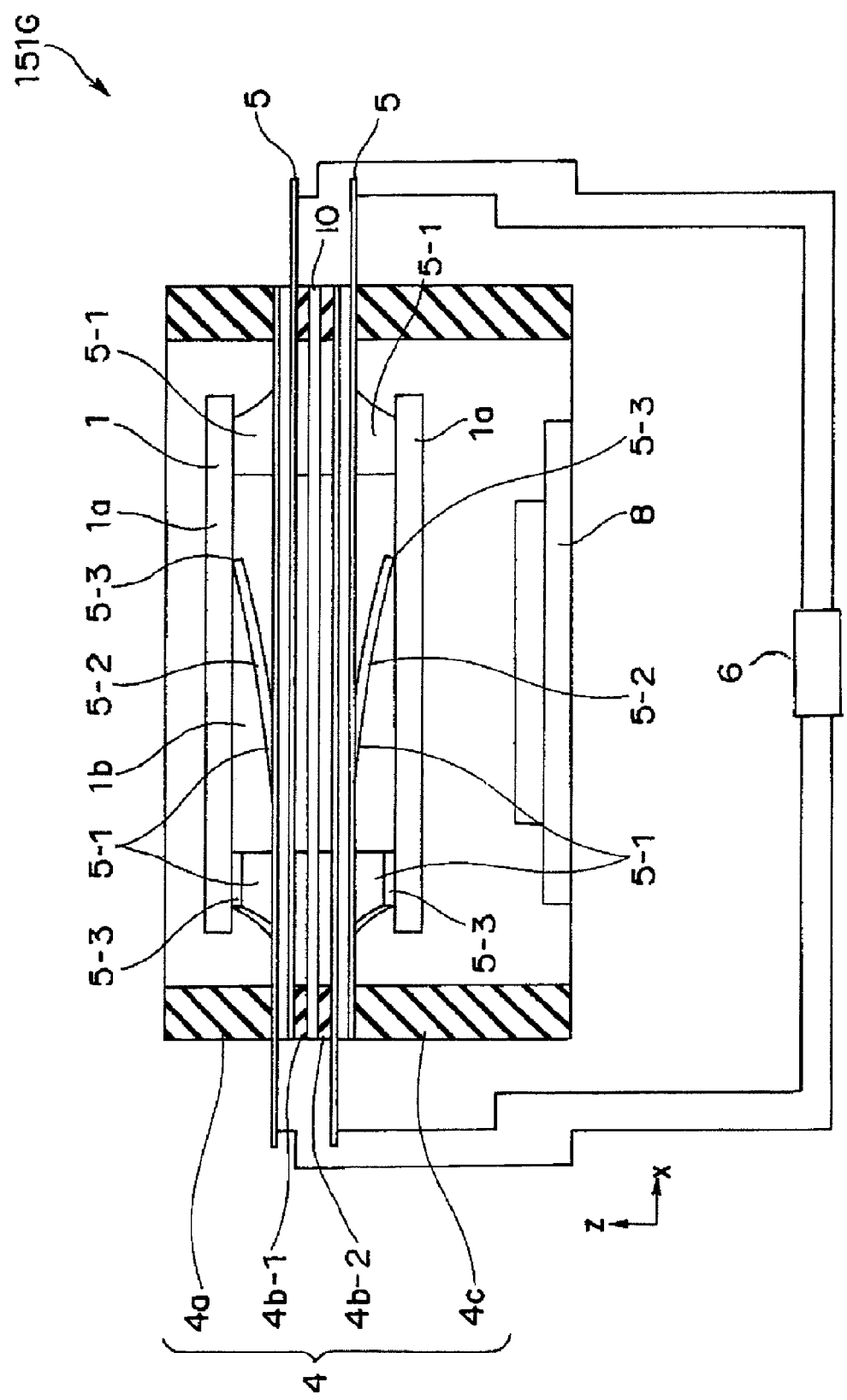
FIG. 52 is a partial cross-sectional side view of the lens holder driving device employing the planary-driven actuators which are the conductive polymer actuators according to the seventh embodiment of the present invention in a state where an image pickup device is incorporated therein.

FIG. 52 illustrates a side view of the lens holder driving device 151G employing the planary-driven actuators which are the conductive polymer actuators, according to the seventh embodiment of the present invention (a cross sectional view of only the fixing frame member). In this case, initial voltages are applied from the power supply 6 to the planary-driven actuators 5 which are the plurality of conductive polymer actuators placed in parallel with each other for bending and displacing, substantially at the same time, the free-end side contact portions 5-3 of the respective driving arm portions 5-1 of the planary-driven actuator 5 which is the conductive polymer actuator placed at the upper portion, until they come into contact with the bottom surface of the upper flange portion 1a of the lens holder 1. Further, the free-end side contact portions 5-3 of the respective driving arm portions 5-1 of the planary-driven actuator 5 which is the conductive polymer actuator placed at the lower portion are bent and displaced, substantially at the same time, until they come into contact with the upper surface of the lower flange portion 1a of the lens holder 1. Thereafter, application of the initial voltages from the power supply 6 is stopped for holding the bending state. Thus, the initial position of the lens holder 1 is restricted along the optical axis. As described in the previous embodiments, employed are the conductive polymer actuators 5 bent with a desired curvature configured such that the two conductive polymer films 5a and the separator 5b, which are the components of each planary-driven actuator 5 as the conductive polymer actuator, are bonded to one another by thermally and compressively attaching the respective components to one another in a state of having a curvature. It is thus possible to reduce or eliminate displacement of the lens holder 1 toward the initial position along the optical axis.

The lens holder 1 having the flange portions 1a is sandwiched between the planary-driven actuators 5 which are the plurality of conductive polymer actuators placed in parallel with each other, and the respective components are bonded to one another through the upper fixing frame 4a, the first middle fixing frame 4b-1, the intermediate plate 10, the second middle fixing frame 4b-2, and the lower fixing frame 4c for realizing the lens holder driving device 151G. An image pickup device 8 can be placed in the lowermost portion of the lens holder driving device 151G within the fixing frame member 4 to form an image pickup unit.

Figure 53A:
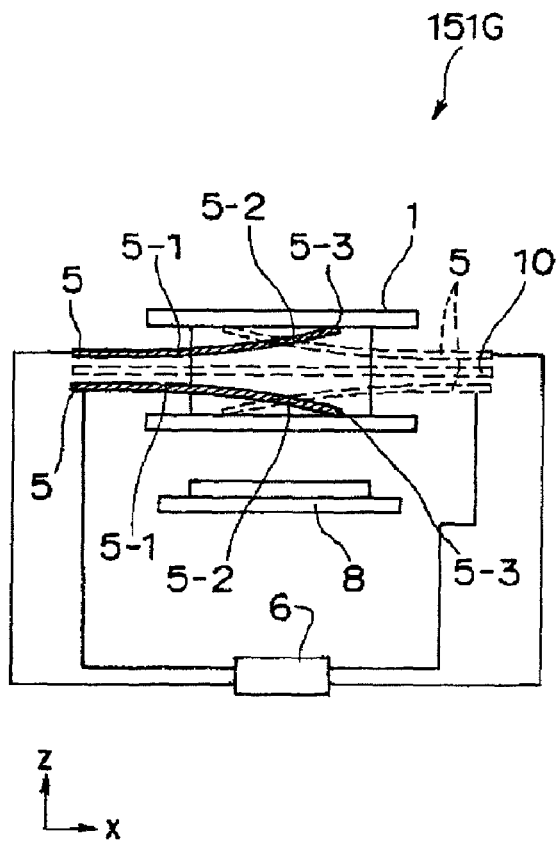
FIG. 53A is a side view schematically illustrating the lens holder driving device employing the planary-driven actuators which are the conductive polymer actuators according to the seventh embodiment of the present invention, with the position of an image pickup device being illustrated for the purpose of reference, and also illustrating a state where initial voltages are applied from a power supply to the planary-driven actuators which are the conductive polymer actuators, and thus the lens holder is held therein.
Figure 53B:
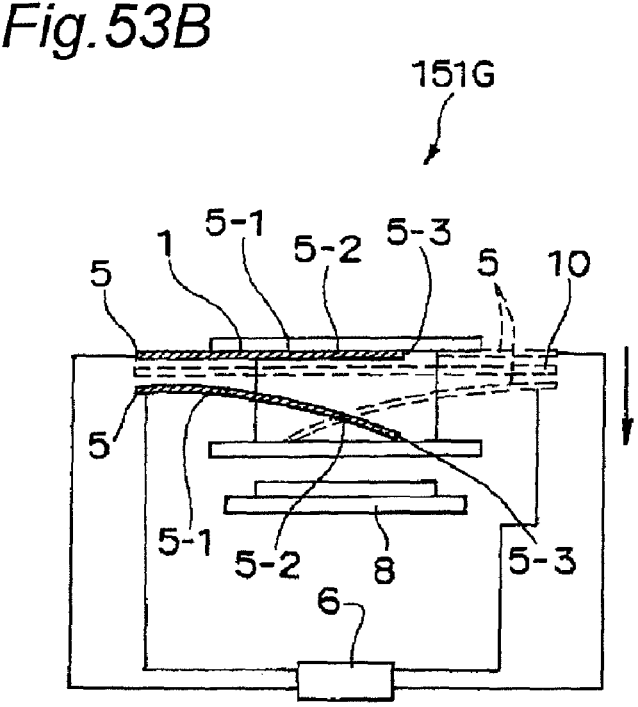
FIG. 53B is a side view schematically illustrating the lens holder driving device employing the planary-driven actuators which are the conductive polymer actuators according to the seventh embodiment of the present invention, with the position of an image pickup device being illustrated for the purpose of reference, and also illustrating a state where voltages are applied from the power supply to the planary-driven actuators which are the conductive polymer actuators, and thus the lens holder has been displaced along the −z axis.
Figure 53C:
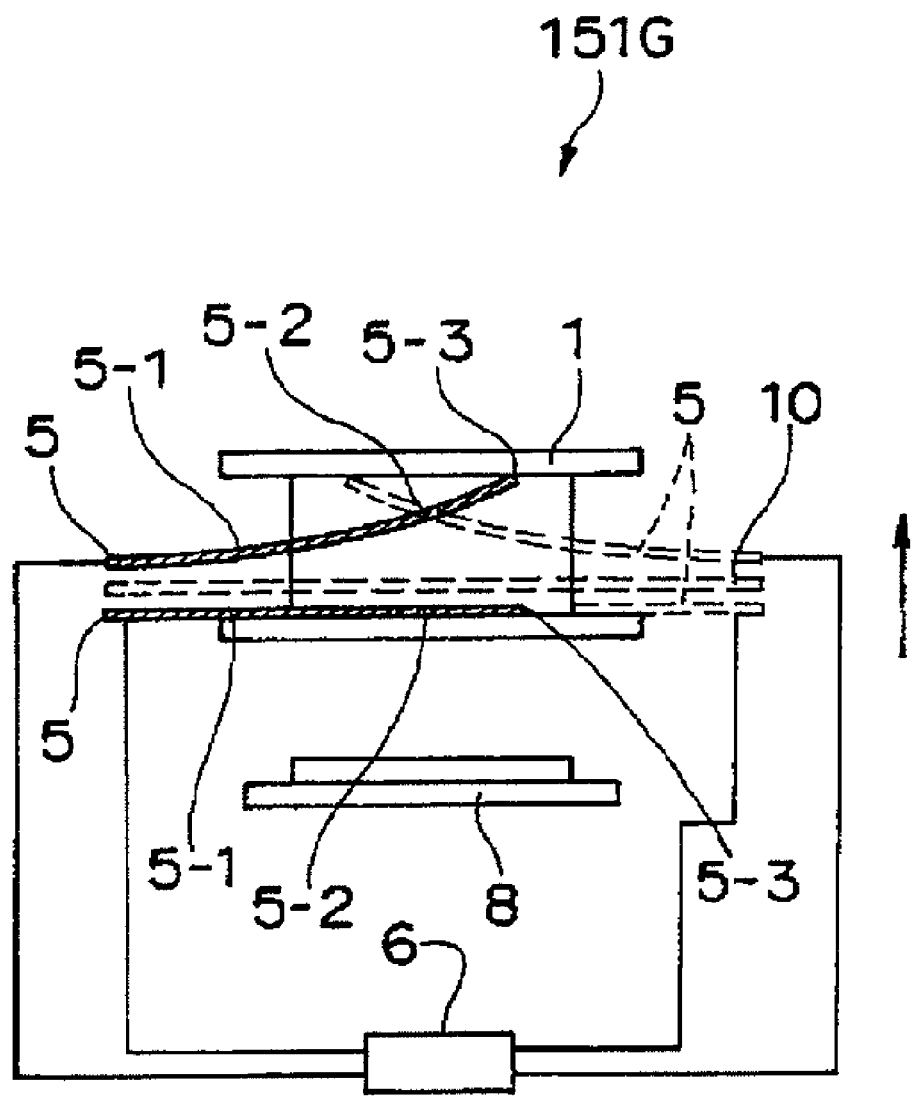
FIG. 53C is a side view schematically illustrating the lens holder driving device employing the planary-driven actuators which are the conductive polymer actuators according to the seventh embodiment of the present invention, with the position of an image pickup device being illustrated for the purpose of reference, and also illustrating a state where voltages are applied from the power supply to the planary-driven actuators which are the conductive polymer actuators, and thus the lens holder has been displaced along the +z axis.

FIGS. 53A to 53C are side views schematically illustrating a method for driving the lens holder driving device 151G employing the planary-driven actuators which are the conductive polymer actuators, according to the third embodiment of the present invention. In this case, the upper and lower flange portions 1a of the lens holder 1 are not coupled and secured to the free-end side contact portions 5-3 in the planary-driven actuators 5 which are the conductive polymer actuators. This enables utilizing to a maximum extent the bend and displacement of the respective driving arm portions 5-1 of the planary-driven actuators 5 which are the conductive polymer actuators for moving the lens holder 1 along the optical axis. This can increase the ranges within which the respective driving arm portions 5-1 are movable, in comparison with cases where the respective free-end side contact portions 5-3 in the planary-driven actuators 5 which are conductive polymer actuators are coupled and secured to the upper and lower flange portions 1*a* of the lens holder 1.

FIG. 53A illustrates a state where the lens holder 1 is at an initial position along the optical axis, after the free-end side contact portions 5-3 of the respective driving arm portions 5-1 of the planary-driven actuator 5 which is the conductive polymer actuator placed at the upper portion out of the planary-driven actuators 5 which are the plurality of conductive polymer actuators in parallel with each other, are bent and displaced, substantially at the same time until they come into contact with the bottom surface of the upper flange portion 1*a* of the lens holder 1, through the power supply 6, then the free-end side contact portions 5-3 of the respective driving arm portions 5-1 of the planary-driven actuator 5 which is the conductive polymer actuator placed at the lower portion are bent and displaced, substantially at the same time, until they come into contact with the upper surface of the lower flange portion 1*a* of the lens holder 1, and then application of the initial voltages from the power supply 6 is stopped for holding the state where the respective driving arm portions 5-1 of the upper and lower planary-driven actuators 5 are bent. Also, the two conductive polymer films 5*a* and the separator 5*b*, which are the components of each planary-driven actuator 5 which is the conductive polymer actuator, are bonded to one another by thermally and compressively attaching the respective components to one another in a state where the components are provided with a curvature, and thus the conductive polymer actuators 5 which are bent with a desired curvature are employed. Further, the free-end side contact portions 5-3 of the respective driving arm portions 5-1 are brought into contact with the bottom surface of the upper flange portion 1*a* of the lens holder 1, and also the free-end side contact portions 5-3 of the respective driving arm portions 5-1 of the planary-driven actuator 5 which is the conductive polymer actuator placed at the lower portion are brought into contact with the upper surface of the lower flange portion 1*a* of the lens holder 1. There is illustrated the state where the lens holder 1 is held at the initial position along the optical axis in the way described above. In this case, the lens holder 1 is restricted in position in a plane intersecting with the direction of the optical axis, by the lens holder support point 5-2 of the respective driving arm portions 5-1 of the planary-driven actuators which are the plurality of conductive polymer actuators placed in parallel with each other.

FIG. 53B illustrates a state where the lens holder 1 has been moved along the −z axis, by applying voltages, from the power supply 6, to the planary-driven actuators 5 which are the conductive polymer actuators held at the bending state at the above initial position. Due to the applied voltage from the power supply 6, the free-end side contact portions 5-3 of the respective driving arm portions 5-1 in the planary-driven actuator 5 which is the conductive polymer actuator placed at the lower portion in the drawing are further bent in the same direction substantially at the same time, from the initial bending state, to move the lens holder 1 along the −z axis, while contacting with the upper surface of the lower flange portion 1*a* of the lens holder 1. In this case, it is necessary to apply a voltage thereto from the power supply 6 such that the respective driving arm portions 5-1 of the planary-driven actuator 5 which is the conductive polymer actuator placed at the upper portion are bent and displaced substantially at the same time along the −z axis, while following the bending of the respective driving arm portions 5-1 of the conductive polymer actuator 5 placed at the lower portion. Also, the respective driving arm portions 5-1 of the planary-driven actuator 5 which is the conductive polymer actuator placed at the upper portion can be forcibly bent so as to follow movement of the lens holder 1 along the −z axis, without applying a voltage from the power supply 6 to the planary-driven actuator 5 which is the conductive polymer actuator placed at the upper portion. Further, the respective driving arm portions 5-1 of the planary-driven actuator 5 which is the conductive polymer actuator placed at the upper portion reach a horizontal state in FIG. 53B, and the position to horizontally contact with the bottom surface of the upper flange portion 1*a* of the lens holder 1 in FIG. 53B defines the limit of movement of the lens holder 1 along the −z axis. In this case, even when the lens holder 1 has been displaced along the −z axis, the lens holder 1 is restricted in position, in a plane intersecting with the direction of the optical axis, by the lens holder support points 5-2 of the respective driving arm portions 5-1 of the planary-driven actuators 5 which are the plurality of conductive polymer actuators placed in parallel with each other. Further, when application of the voltages from the power supply 6 to the planary-driven actuators 5 which are the conductive polymer actuators placed in parallel with each other is stopped, the lens holder 1 is held in the state of being displaced in the −z direction. In order to displace the lens holder 1 to the initial position, voltages should be applied to the respective actuators from the power supply 6 so as to displace the respective actuators along the +z axis. Further, since the intermediate plate 10 is installed, even when an impact and the like acts on the entire lens holder driving device 151G to cause the respective driving arm portions 5-1 of the planary-driven actuator 5 which is the conductive polymer actuator plated at the upper portion to be further bent and deformed from the horizontal state in FIG. 53B along the −z axis, it is possible to offer the advantages that it is possible to prevent, with the insulation intermediate plate 10, the occurrence of short circuits due to contact between the planary-driven actuator 5 which is the lower conductive polymer actuator and the planary-driven actuator 5 which is the conductive polymer actuator placed at the upper portion, and also it is possible to prevent disengagement of the lens holder 1.

FIG. 53C illustrates a state where the lens holder 1 has been moved along the +z axis by applying voltages, from the power supply 6, to the planary-driven actuators 5 which are the conductive polymer actuators held the bending state at the above initial position. Due to the applied voltage from the power supply 6, the free-end side contact portions 5-3 of the respective driving arm portions 5-1 in the planary-driven actuator 5 which is the conductive polymer actuator placed at the upper portion in the drawing are further bent in the same direction substantially at the same time, from the initial bending state, to move the lens holder 1 along the +z axis, while contacting with the bottom surface of the upper flange portion 1*a* of the lens holder 1. In this case, it is necessary to apply a voltage from the power supply 6 such that the respective driving arm portions 5-1 of the planary-driven actuator 5 which is the conductive polymer actuator placed at the lower portion are bent and displaced substantially at the same time along the +z axis, while following the bending of the respective driving arm portions 5-1 of the conductive polymer actuator 5 placed at the upper portion. Also, the respective driving arm portions 5-1 of the planary-driven actuator 5 which is the conductive polymer actuator placed at the upper portion can be forcibly bent so as to follow movement of the lens holder 1 along the +z axis, without applying a voltage from the power supply 6 to the planary-driven actuator 5 which is the conductive polymer actuator placed at the lower portion. Further, the respective driving arm portions 5-1 of the planary-driven actuator 5 which is the conductive polymer actuator placed at the lower portion reach a horizontal state in FIG. 53C, and the position in FIG. 53C to horizontally contact with the upper surface of the lower flange portion 1*a* of the lens holder 1 defines the limit of movement of the lens holder 1 along the +z axis. In this case, even when the lens holder 1 has been displaced along the +z axis, the lens holder 1 is restricted in position, in a plane intersecting with the direction of the optical axis, by the lens holder support points 5-2 of the respective driving arm portions 5-1 of the planary-driven actuators 5 which are the plurality of conductive polymer actuators placed in parallel with each other. Further, when application of the voltages from the power supply 6 to the planary-driven actuators 5 which are the conductive polymer actuators placed in parallel with each other is stopped, the lens holder 1 is held in the state of being displaced in the +z direction. In order to displace the lens holder 1 to the initial position, voltages should be applied to the respective actuators 5 from the power supply 6 so as to displace the respective actuators 5 along the −z axis. Further, since the intermediate plate 10 is installed, even when an impact and the like acts on the entire lens holder driving device 151G to cause the respective driving arm portions 5-1 of the planary-driven actuator 5 which is the conductive polymer actuator plated at the lower portion to be further bent and deformed from the horizontal state in FIG. 53C along the +z axis, it is possible to offer the advantages that it is possible to prevent, with the insulation intermediate plate 10, the occurrence of short circuits due to contact between the planary-driven actuator 5 which is the upper conductive polymer actuator and the planary-driven actuator 5 which is the conductive polymer actuator placed at the lower portion.

With the structure described above, the upper and lower flange portions 1*a* of the lens holder 1 are not coupled and secured to the free-end side contact portions 5-3 of the planary-driven actuators 5 which are the conductive polymer actuators. This enables utilizing to a maximum extent the bend and displacement of the respective driving arm portions 5-1 of the planary-driven actuators 5 which are the conductive polymer actuators for moving the lens holder 1 along the optical axis. This can increase the ranges within which the respective driving arm portions 5-1 are movable, in comparison with cases where the respective free-end side contact portions 5*a*-3 of the planary-driven actuators 5 which are the conductive polymer actuators are coupled and secured to the upper and lower flange portions 1*a* of the lens holder 1. This realizes a lens holder driving device 151G capable of offering these various advantages. Further, the lens holder 1 is restricted in position in a plane intersecting with the direction of the optical axis, through the shapes of the respective driving arm portions 5-1 of the planary-driven actuators 5 which are the conductive polymer actuators. Further, the plurality of planary-driven actuators 5 which are the conductive polymer actuators which can be held at a bending state are placed in parallel with each other. It is thus possible to hold the initial position of the lens holder 1 along the optical axis, with a state where the respective driving arm portions 5-1 of the actuators 5 are bent through application of initial voltages thereto or with a state where the respective components have been bonded to one another to be bent with a desired curvature by thermally and compressively attaching the two conductive polymer films 5*a* and the separator 5*b*, which are the components of each planary-driven actuators 5 as the conductive polymer actuator, to one another in a state of being provided with a certain curvature. This realizes the lens holder driving device 151G capable of restricting movement of the lens holder 1 to be along the optical axis, and also capable of moving it along the optical axis. Further, the plurality of planary-driven actuators 5, which are the conductive polymer actuators capable of being held at a bending state, are placed in parallel with each other. It is thus possible to increase the ranges within which the respective driving arm portions 5-1 of the planary-driven actuators 5 which are the conductive polymer actuators can bend, thereby realizing the lens holder driving device 151*6* capable of increasing the amount of movement of the lens holder 1 along the optical axis. Further, the planary-driven actuators 5 which are the conductive polymer actuators can be driven at a low voltage of 1 to 3 V, and also can be held at a bending state. Therefore, it is necessary to apply voltages from the power supply 6 thereto only when the lens holder 1 is moved along the optical axis, thereby realizing the lens holder driving device 151G capable of reducing the power consumption. Further, since the intermediate plate 10 is added to the component members, it is possible to realize the lens holder driving device 151G capable of preventing, with the intermediate plate 10, disengagement of the lens holder 1, in a case where a sudden impact acts on the lens holder driving device 151G to prevent the driving arm portions 5-1 of the planary-driven actuators 5 which are the conductive polymer actuators from holding the lens holder 1. Further, it is possible to realize the lens holder driving device 151G capable of preventing, with the insulation intermediate plate 10, the occurrence of short circuits due to contact between the free-end side contact portions 5-3 of the planary-driven actuators 5 which are the conductive polymer actuators, when the driving arm portions 5-1 of the planary-driven actuator 5 which are the plurality of conductive polymer actuators 5 placed in parallel with each other are largely bent or when an impact acts on the entire lens holder driving device 151G.

Figure 54:
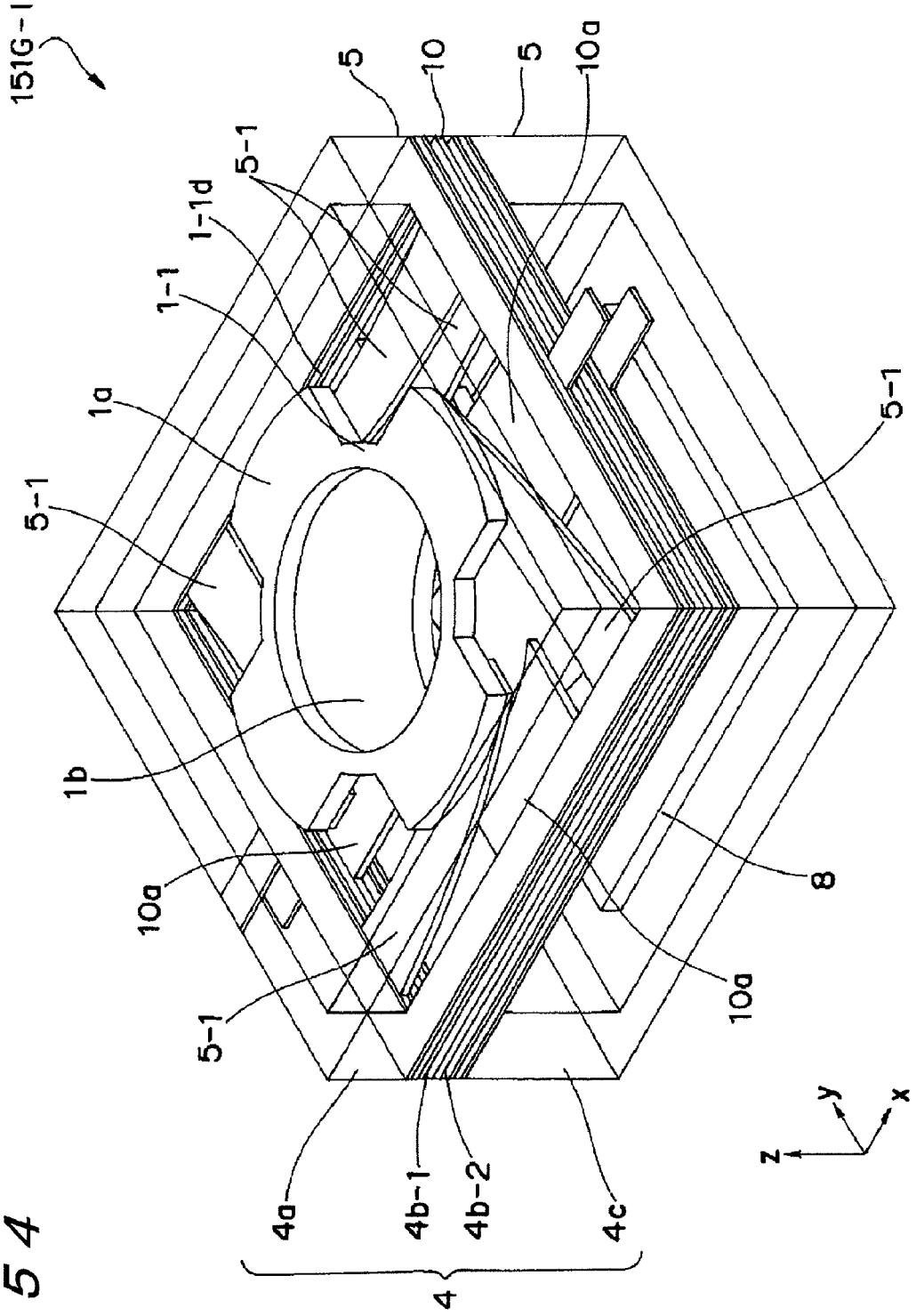
FIG. 54 is a perspective view of the lens holder driving device employing the planary-driven actuators which are the conductive polymer actuators according to the seventh embodiment of the present invention, in a state where the lens holder in FIG. 5A is applied thereto, and it incorporates an image pickup device therein and is viewed only through the fixing frame member.

FIG. 54 is a perspective view of a lens holder driving device 151G-1 according to an example of modification of the lens holder driving device 151G according to the seventh embodiment of the present invention. The lens holder driving device 151G-1 is structured to include the lens holder 1-1 in FIG. 5A, a plurality of planary-driven actuators 5 which are a plurality of conductive polymer actuators, an intermediate plate 10, and a fixing frame member 4. FIG. 54 is a perspective view of an image pickup unit formed by incorporating an image pickup device 8 in the lower portion of the lens holder driving device 151G-1 within the fixing frame member 4. The lens holder 1-1 in FIG. 5A holds at least a single lens 9 for capturing images of objects, which is not illustrated, and has flange portions 1*a* at its opposite end portions along the optical axis. The planary-driven actuators 5, which are the plurality of conductive polymer actuators, are characterized in having driving arm portions 5-1 having free-end side contact portions 5-3 and lens holder support points 5-2 for holding the outer surface of the cylindrical body portion 1*b* of the lens holder 1-1 at a plurality of positions opposing to each other. The intermediate plate 10 functions as an example of a lens holder disengagement-prevention/contact-prevention member or a contact prevention member for preventing disengagement of the lens holder 1-1 and for preventing contact between the plurality of planary-driven actuators 5 which are the plurality of conductive polymer actuators placed in parallel with each other. The fixing frame member 4 is constituted by an upper fixing frame 4*a*, a first and second middle fixing frames 4*b*-1 and 4*b*-2, and a lower fixing frame 4*c* which form the outer shape of the lens holder driving device 151G-1 and fix the respective components.

With the structure employing the lens holder 1-1, when the respective driving arm portions 5-1 of the planary-driven actuators 5 which are the conductive polymer actuators are bent, it is possible to reduce the interference thereof with the flange portions 1*a* of the lens holder 1-1. This can increase the ranges within which the respective driving arm portions 5-1 of the planary-driven actuators 5, which are the conductive polymer actuators, are movable. Further, with the intermediate plate 10, it is possible to offer the advantages of the prevention of disengagement of the lens holder 1-1 and the prevention of contact between the planary-driven actuators 5 which are the plurality of conductive polymer actuators placed in parallel with each other. This realizes the lens holder driving device 151G-1 capable of offering these various advantages.

Figure 55:
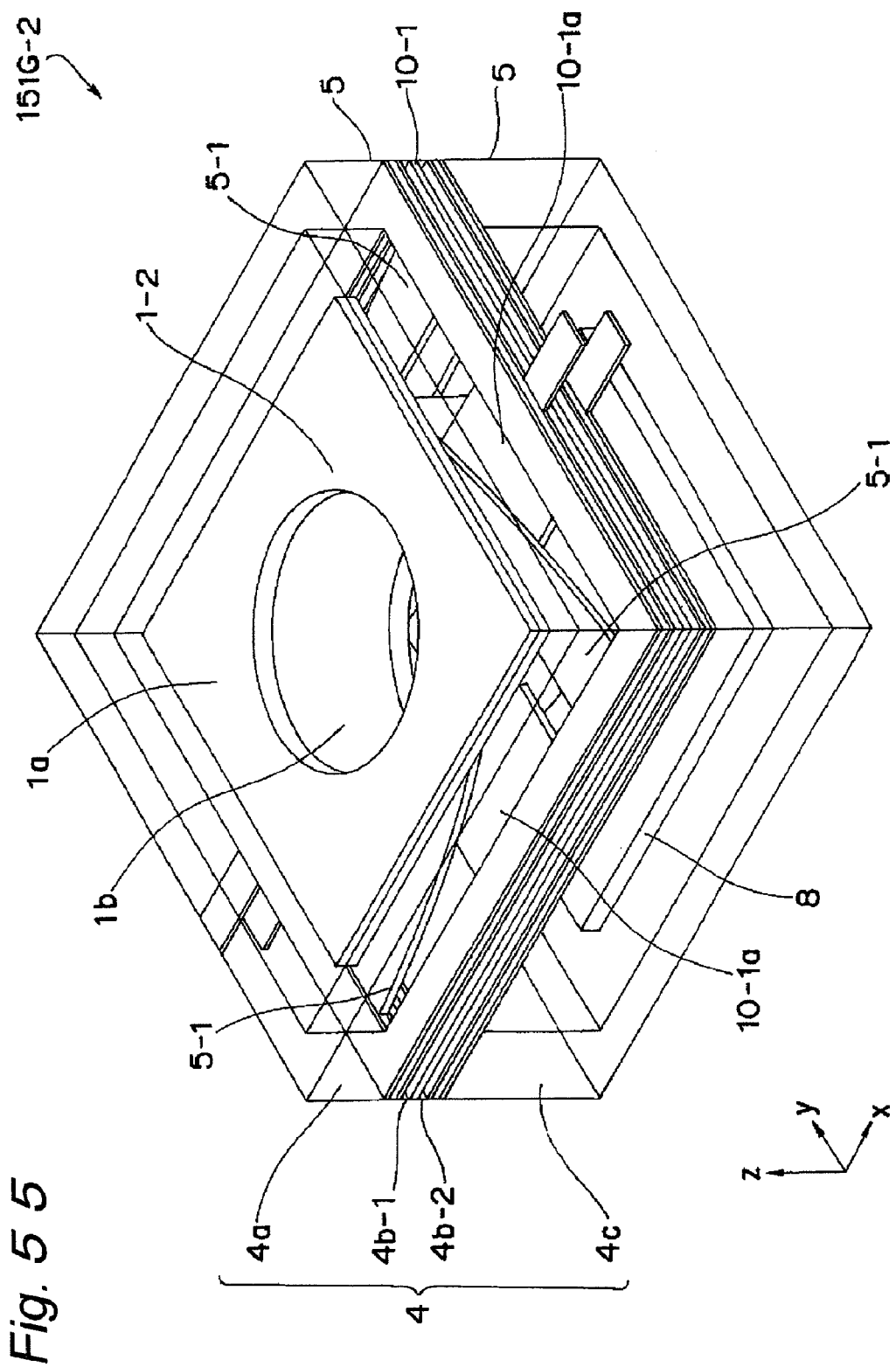
FIG. 55 is a perspective view of the lens holder driving device employing the planary-driven actuators which are the conductive polymer actuators according to the seventh embodiment of the present invention, in a state where the lens holder in FIG. 5B is applied thereto, and it incorporates an image pickup device therein and is viewed only through the fixing frame member.

FIG. 55 is a perspective view of a lens holder driving device 151G-2 according to an example of modification of the lens holder driving device 151G according to the seventh embodiment of the present invention. The lens holder driving device 151G-2 is structured to include the lens holder 1-2 in FIG. 5B, planary-driven actuators 5 which are a plurality of conductive polymer actuators, an intermediate plate 10-1, and a fixing frame member 4. FIG. 55 is a perspective view of an image pickup unit formed by incorporating an image pickup device 8 in the lower portion of the lens holder driving device 151G-2 within the fixing frame member 4. The lens holder 1-2 in FIG. 5B holds at least a single lens 9 for capturing images of objects, which is not illustrated, and has flange portions 1*a* at its opposite end portions along the optical axis. The planary-driven actuators 5, which are the plurality of conductive polymer actuators, are characterized in having driving arm portions 5-1 having free-end side contact portions 5-3 and lens holder support points 5-2 for holding the outer surface of the cylindrical body portion 1*b* of the lens holder 1-2 at a plurality of positions opposing to each other. The intermediate plate 10-1 functions as an example of a lens holder disengagement-prevention/contact-prevention member or a contact prevention member for preventing disengagement of the lens holder 1-2 and for preventing contact between the planary-driven actuators 5 which are the plurality of conductive polymer actuators placed in parallel with each other, similarly to that illustrated in the sixth embodiment. The fixing frame member 4 is constituted by an upper fixing frame 4*a*, a first and second middle fixing frames 4*b*-1 and 4*b*-2, and a lower fixing frame 4*c* which form the outer shape of the lens holder driving device 151G-2 and fix the respective components.

With this structure, it is possible to move the lens holder 1-2 only along the optical axis, while preventing the lens holder 1-2 from rotating in a plane intersecting with the direction of the optical axis. Further, it is possible to prevent, with the intermediate plate 10, disengagement of the lens holder 1-2 and to prevent contact between the planary-driven actuators 5 which are the plurality of conductive polymer actuators placed in parallel with each other. This realizes the lens holder driving device 151G-2 capable of offering these various advantages.

FIG. 56 is a perspective view of a lens holder driving device 151G-3 according to an example of modification of the lens holder driving device 1516 according to the seventh embodiment of the present invention. The lens holder driving device 151G-3 is structured to include the lens holder 1-3 in FIG. 5C, planary-driven actuators 5 which are a plurality of conductive polymer actuators, an intermediate plate 10-1, and a fixing frame member 4. FIG. 56 is a perspective view of an image pickup unit formed by incorporating an image pickup device 8 in the lower portion of the lens holder driving device 151G-3 within the fixing frame member 4. The lens holder 1-3 in FIG. 5C holds at least a single lens 9 for capturing images of objects, which is not illustrated, and has flange portions 1*a* at its opposite end portions along the optical axis. The planary-driven actuators 5, which are the plurality of conductive polymer actuators, are characterized in having driving arm portions 5-1 having free-end side contact portions 5-3 and lens holder support points 5-2 for holding the outer surface of the cylindrical body portion 1*b* of the lens holder 1-3 at a plurality of positions opposing to each other. The intermediate plate 10-1 functions as an example of a lens holder disengagement-prevention/contact-prevention member or contact prevention member for preventing disengagement of the lens holder 1-3 and for preventing contact between the planary-driven actuators 5 which are the plurality of conductive polymer actuators placed in parallel with each other, similarly to that described in the sixth embodiment. The fixing frame member 4 is constituted by an upper fixing frame 4*a*, a first and second middle fixing frames 4*b*-1 and 4*b*-2, and a lower fixing frame 4*c* which form the outer shape of the lens holder driving device 151G-3 and fix the respective components.

With the structure employing the lens holder 1-3, when the respective driving arm portions 5-1 of the planary-driven actuators 5 which are the conductive polymer actuators are bent, it is possible to reduce the interference thereof with the flange portions 1*a* of the lens holder 1-3. Further, it is possible to provide the advantage of an increase of the ranges within which the respective driving arm portions 5-1 of the planary-driven actuators 5, which are the conductive polymer actuators, are movable. With this structure, it is possible to move the lens holder 1-3 only along the optical axis, while preventing the lens holder 1-3 from rotating in a plane intersecting with the direction of the optical axis. Further, with the intermediate plate 10, it is possible to prevent disengagement of the lens holder 1-3 and to prevent contact between the planary-driven actuators 5 which are the plurality of conductive polymer actuators placed in parallel with each other. This realizes the lens holder driving device 151G-3 capable of offering these various advantages.

By properly combining the arbitrary embodiments of the aforementioned various embodiments, the effects possessed by the embodiments can be produced.

INDUSTRIAL APPLICABILITY

According to the present invention, it is possible to realize a lens holder driving device and an image pickup unit which employ planary-driven polymer actuators including actuators which allow a lens holder to move only along the optical axis, and also it is possible to realize a lens holder driving device and an image pickup unit which employ polymer actuators as a lens holder driving-power source, and thus are capable of driving with less power consumption. Accordingly, the present invention can be applied to small-sized camera modules and the like which are to be incorporated in mobile terminals and the like which have auto focus (AF) functions and zoom functions.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A lens holder driving device comprising:
a lens holder including a cylindrical body portion for holding a lens, placed along an optical axis and, protrusion portions which are placed at opposite end portions of the body portion along the optical axis and are protruded in a direction intersecting with the optical axis;
a planary-driven actuator including a plurality of driving arm portions having respective lens holder support points which come into contact with an outer surface of the body portion of the lens holder at a plurality of opposing positions for holding the lens holder, and having respective contact portions at free-end sides thereof for coming into contact with the protrusion portion at the end portion positioned at a side of one direction along the optical axis and then moving the lens holder in the one direction along the optical axis; and
a lens-holder restoration member for moving the lens holder in a direction opposite from the one direction along the optical axis of the lens holder in the planary-driven actuator and then restoring the lens holder to a position before being moved; wherein
the protrusion portions at the opposite end portions of the lens holder are held along the optical axis of the lens holder by the free-end side contact portions of the driving arm portions of the planary-driven actuator and by the lens-holder restoration member, so that the lens holder is restricted in position along the optical axis, while the outer surface of the body portion of the lens holder is restricted in position in a plane intersecting with the direction of the optical axis by the lens holder support points of the respective driving arm portions of the planary-driven actuator, and further, the driving arm portions are bent through application of a voltage to the planary-driven actuator while the free-end side contact portions of the driving arm portions of the planary-driven actuator are contacted with the protrusion portion of the lens holder so that the lens holder is moved in the one direction along the optical axis.

2. The lens holder driving device according to claim 1, wherein the lens-holder restoration member is a lens-holder retaining member having: a retaining portion for coming into contact with the protrusion portion of the lens holder which is positioned at a side in the direction opposite from the one direction along the optical axis of the lens holder; and spring-characteristic portions coupled to the retaining portion, for moving the lens holder in the direction opposite from the one direction along the optical axis of the lens holder in the planary-driven actuator and then restoring the lens holder to the position before being moved.

3. The lens holder driving device according to claim 1, wherein the lens-holder restoration member is a second planary-driven actuator including a plurality of driving arm portions having respective contact portions, placed at the free-end sides, for coming into contact with the protrusion portion of the lens holder which is positioned at a side in the direction opposite from the one direction along the optical axis of the lens holder and then moving the lens holder in the direction opposite from the one direction along the optical axis so as to generate a restoration force for restoring the lens holder to the position before being moved.

4. The lens holder driving device according to claim 1, wherein the planary-driven actuator is a conductive polymer actuator, which has a three-layer structure formed by sandwiching a separator impregnated with an ionic liquid between two conductive polymer films and bonding to one another.

5. The lens holder driving device according to claim 3, wherein
the two planary-driven actuators are conductive polymer actuators, each of which has a three-layer structure formed by sandwiching a separator impregnated with an ionic liquid between two conductive polymer films and bonding to one another,
the plurality of planary-driven actuators which are the conductive polymer actuators are placed in parallel with each other, initial voltages are applied to the driving arm portions of the respective planary-driven actuators for bending and displacing the driving arm portions until the driving arm portions come into contact with the protrusion portions at the opposite end portions of the lens holder, and then application of the initial voltages is stopped for holding bending states thereof, so that the lens holder is restricted in position along the optical axis by the free-end side contact portions of the plurality of driving arm portions placed in parallel with each other, while the outer surface of the body portion of the lens holder is restrained in a plane intersecting with the direction of the optical axis by the lens holder support points of the driving arm portions of the planary-driven actuators, and further, voltages are applied to the planary-driven actuators which are the conductive polymer actuators for bending the driving arm portions from the initial application state while the free-end side contact portions of the driving arm portions of the planary-driven actuators which are the conductive polymer actuators are contacted with the protruding portions of the lens holder, so that the lens holder is respectively moved in the one direction and in the direction opposite from the one direction along the optical axis.

6. The lens holder driving device according to claim 3, further comprising: between the two planary-driven actuators a contact prevention member having a contact prevention portion for preventing contact between the free-end side contact portions of the two planary-driven actuators.

7. The lens holder driving device according to claim 1, further comprising:
a power supply for applying a voltage to the planary-driven actuator, and
a control device for controlling the power supply so as to apply a voltage to the planary-driven actuator only when the driving arm portions of the planary-driven actuator are bent.

8. An image pickup unit comprising:
the lens holder driving device according to claim 1;
a lens held by the lens holder; and
an image pickup device for capturing an image of an object formed by the lens.

* * * * *